(12) United States Patent
Rahman et al.

(10) Patent No.: US 10,340,989 B2
(45) Date of Patent: Jul. 2, 2019

(54) CODEBOOK FOR CSI REPORTING IN ADVANCED WIRELESS COMMUNICATION SYSTEM

(71) Applicant: Samsung Electronics Co., Ltd., Suwon-si (KR)

(72) Inventors: Md Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/822,059

(22) Filed: Nov. 24, 2017

(65) Prior Publication Data
US 2018/0167116 A1    Jun. 14, 2018

Related U.S. Application Data

(60) Provisional application No. 62/570,943, filed on Oct. 11, 2017, provisional application No. 62/530,704,
(Continued)

(51) Int. Cl.
*H04B 7/04*   (2017.01)
*H04B 7/06*   (2006.01)
(Continued)

(52) U.S. Cl.
CPC .......... *H04B 7/0478* (2013.01); *H04B 7/04* (2013.01); *H04B 7/06* (2013.01); *H04B 7/0626* (2013.01);
(Continued)

(58) Field of Classification Search
CPC .. H04B 7/0408; H04B 7/0417; H04B 7/0478; H04B 7/0617; H04B 7/0632;
(Continued)

(56) References Cited

U.S. PATENT DOCUMENTS

2014/0003240 A1    1/2014  Chen et al.
2014/0328266 A1*  11/2014  Yu ................... H04L 5/0053
                                                              370/329
(Continued)

FOREIGN PATENT DOCUMENTS

KR      101668709 B1    11/2016
WO      2016076679 A1    5/2016
(Continued)

OTHER PUBLICATIONS

R1-1612504, "Codebook design framework for NR MIMO", Samsung, 3GPP TSG RAN WG1 #87, Reno, USA Nov. 14-18, 2016 (Year: 2016).*
(Continued)

*Primary Examiner* — Aristocratis Fotakis

(57) ABSTRACT

Methods and apparatuses for channel state information (CSI) reporting are provided. A UE capable of CSI reporting includes a transceiver configured to receive, from a base station (BS), CSI configuration information including a number (L) of beams and a number (T) of CSI reports. L and T are positive integers. The UE also includes at least one processor operably connected to the transceiver and configured to generate the T CSI reports. Each of the CSI reports is generated based on a subset of the L beams. The transceiver is further configured to transmit, to the BS, the T CSI reports in T CSI reporting instances, respectively. Each of the T CSI reports is independently decodable.

20 Claims, 26 Drawing Sheets

Related U.S. Application Data filed on Jul. 10, 2017, provisional application No. 62/489,811, filed on Apr. 25, 2017, provisional application No. 62/452,105, filed on Jan. 30, 2017, provisional application No. 62/432,414, filed on Dec. 9, 2016.

(51) Int. Cl.
 *H04B 7/0456* (2017.01)
 *H04L 5/00* (2006.01)

(52) U.S. Cl.
 CPC ......... *H04B 7/0639* (2013.01); *H04B 7/0645* (2013.01); *H04B 7/0695* (2013.01); *H04L 5/0048* (2013.01)

(58) Field of Classification Search
 CPC ... H04B 7/0626; H04B 7/0639; H04L 5/0057; H04W 72/046
 See application file for complete search history.

(56) References Cited

U.S. PATENT DOCUMENTS

| | | | |
|---|---|---|---|
| 2015/0341092 | A1 | 11/2015 | Park et al. |
| 2016/0323029 | A1* | 11/2016 | Cheng ................. H04B 7/0626 |
| 2016/0337056 | A1* | 11/2016 | Frenne ................. H04B 7/0695 |
| 2018/0076856 | A1* | 3/2018 | Tong ..................... H04W 16/28 |
| 2018/0132217 | A1* | 5/2018 | Stirling-Gallacher ...................... H04B 7/0417 |
| 2018/0254813 | A1* | 9/2018 | Gao ..................... H04B 7/0456 |
| 2019/0045386 | A1* | 2/2019 | Frenne ................. H04L 5/0048 |
| 2019/0045460 | A1* | 2/2019 | Muruganathan .... H04W 52/367 |

FOREIGN PATENT DOCUMENTS

| | | | |
|---|---|---|---|
| WO | 2016164073 | A1 | 10/2016 |
| WO | WO2018/029646 | * | 8/2017 |

OTHER PUBLICATIONS

Huawei et al.; "On the need for more flexible configurations related to CSI reporting"; 3GPP TSG RAN WG1 Meeting #87; Reno, USA; Nov. 14-18, 2016; 7 pages.

International Search Report for PCT Patent Application No. PCT/KR2017/014234 dated Mar. 22, 2018; 11 pages.

LTE; Evolved Universal Terrestrial Radio Access (E-UTRA); Physical Channels and Modulation (3GPP TS 36.211 Version 13.0.0 Release 13); ETSI TS 136.211, V13.0.0, Jan. 2016, 143 pages.

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.0.0, Dec. 2015, 121 pages.

LTE; Evolved Universal Terrestrial Radio Access (E-UTRA); Physical Layer Procedures (3GPP TS 36.213 Version 13.0.0 Release 13); ETSI TS 136.213, V13.0.0, May 2016, 328 pages.

LTE; Evolved Universal Terrestrial Radio Access (E-UTRA); Medium Access Control (MAC) Protocol Specification (3GPP TS 36.321 Version 13.0.0 Release 13); ETSI TS 136.321, V13.0.0, Feb. 2016, 84 pages.

LTE; Evolved Universal Terrestrial Radio Access (E-UTRA); Radio Resource Control (RRC) Protocol Specification (3GPP TS 36.321 Version 13.0.0 Release 13); ETSI TS 136.331, V13.0.0, Jan. 2016, 670 pages.

3rd Generation Partnership Project; Technical Specification Group Services and System Aspects; Feasibility Study on New Services and Markets Technology Enablers; Stage 1 (Release 14), 3GPP TR 22.891, V1.2.0, Nov. 2015, 96 pages.

* cited by examiner

| Basis Type | Port layouts, Number of ports | $N_1 \geq N_2$ | $N_1 < N_2$ | Number of beams (L) |
|---|---|---|---|---|
| Restricted | 1D, 4 ports | ■■ | - | 2 |
| | 1D, 8 ports | ■■■■ | - | 4 |
| | 1D, 12 ports | ■■■■■■ | - | 6 |
| | 1D, {16, 20, 24, 28, 32} ports | ■■■■■■■■ | - | 8 |
| | 2D, 8 ports | ■■ / ■■ | - | 4 |
| | 2D, 12 ports | ■■■ / ■■■ | ■■ / ■■ / ■■ | 6 |
| | 2D, {16, 20, 24, 28, 32} ports | ■■■■ / ■■■■ | ■■ / ■■ / ■■ / ■■ | 8 |
| Unrestricted | {4,8,12,16,20,24, 28, 32} ports | ■■ ■ / ■■ ■ / ■■ ■ | | $N_1 N_2$ |

CODEBOOK FOR CSI REPORTING IN ADVANCED WIRELESS COMMUNICATION SYSTEM

CROSS-REFERENCE TO RELATED APPLICATIONS AND CLAIM OF PRIORITY

The present application claims priority to U.S. Provisional Patent Application Ser. No. 62/432,414, filed on Dec. 9, 2016; U.S. Provisional Patent Application Ser. No. 62/452,105, filed on Jan. 30, 2017; U.S. Provisional Patent Application Ser. No. 62/489,811, filed on Apr. 25, 2017; and U.S. Provisional Patent Application Ser. No. 62/530,704, filed on Jul. 10, 2017; U.S. Provisional Patent Application Ser. No. 62/570,943, filed on Oct. 11, 2017. The content of the above-identified patent document is incorporated herein by reference.

TECHNICAL FIELD

The present application relates generally to CSI acquisition in advanced communication systems. More specifically, this disclosure relates to CSI acquisition using one or more CSI reporting instances in advanced wireless communication systems.

BACKGROUND

5th generation (5G) mobile communications, initial commercialization of which is expected around 2020, is recently gathering increased the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide CSI acquisition using one or more CSI reporting instances in advanced wireless communication systems.

In one embodiment, a user equipment (UE) capable of channel state information (CSI) reporting is provided. The UE includes a transceiver configured to receive, from a base station (BS), CSI configuration information including a number (L) of beams and a number (T) of CSI reports. L and T are positive integers. The UE also includes at least one processor operably connected to the transceiver and configured to generate the T CSI reports. Each of the CSI reports is generated based on a subset of the L beams. The transceiver is further configured to transmit, to the BS, the T CSI reports in T CSI reporting instances, respectively. Each of the T CSI reports is independently decodable.

In another embodiment, a BS capable of configuring CSI reporting is provided. The BS includes at least one processor and a transceiver operably connected to the at least one processor. The transceiver is configured to transmit, to a UE, CSI configuration information including a number (L) of beams and a number (T) of CSI reports. L and T are positive integers. The transceiver is also configured to receive the T CSI reports in T CSI reporting instances, respectively. Each of the CSI reports is generated based on a subset of the L beams. Each of the T CSI reports is independently decodable.

In another embodiment, a method for CSI reporting by a UE is provided. The method includes receiving, from a BS, CSI configuration information including a number (L) of beams and a number (T) of CSI reports. L and T are positive integers. The method further includes generating the T CSI reports. Each of the CSI reports is generated based on a subset of the L beams. Additionally, the method includes transmitting, to the BS, the T CSI reports in T CSI reporting instances, respectively. Each of the T CSI reports is independently decodable.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 11A and 11B illustrate an example non-orthogonal and orthogonal basis sets, respectively, according to embodiments of the present disclosure;

FIG. 12 illustrates an example fixed beam selection patterns according to embodiments of the present disclosure;

DETAILED DESCRIPTION

FIG. 1 through FIG. 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v14.2.0, "E-UTRA, Physical channels and modulation (REF 1);" 3GPP TS 36.212 v14.2.0, "E-UTRA, Multiplexing and Channel coding; (REF 2);" 3GPP TS 36.213 v14.2.0, "E-UTRA, Physical Layer Procedures (REF 3);" 3GPP TS 36.321 v14.2.0, "E-UTRA, Medium Access Control (MAC) protocol specification (REF 4);" 3GPP TS 36.331 v14.2.0, "Radio Resource Control (RRC) Protocol Specification (REF 5);" and 3GPP TR 22.891 v1.2.0, "Technical Specification Group Services and System Aspects; Feasibility Study on New Services and Markets Technology; Enablers; Stage 1; (Release 14)."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
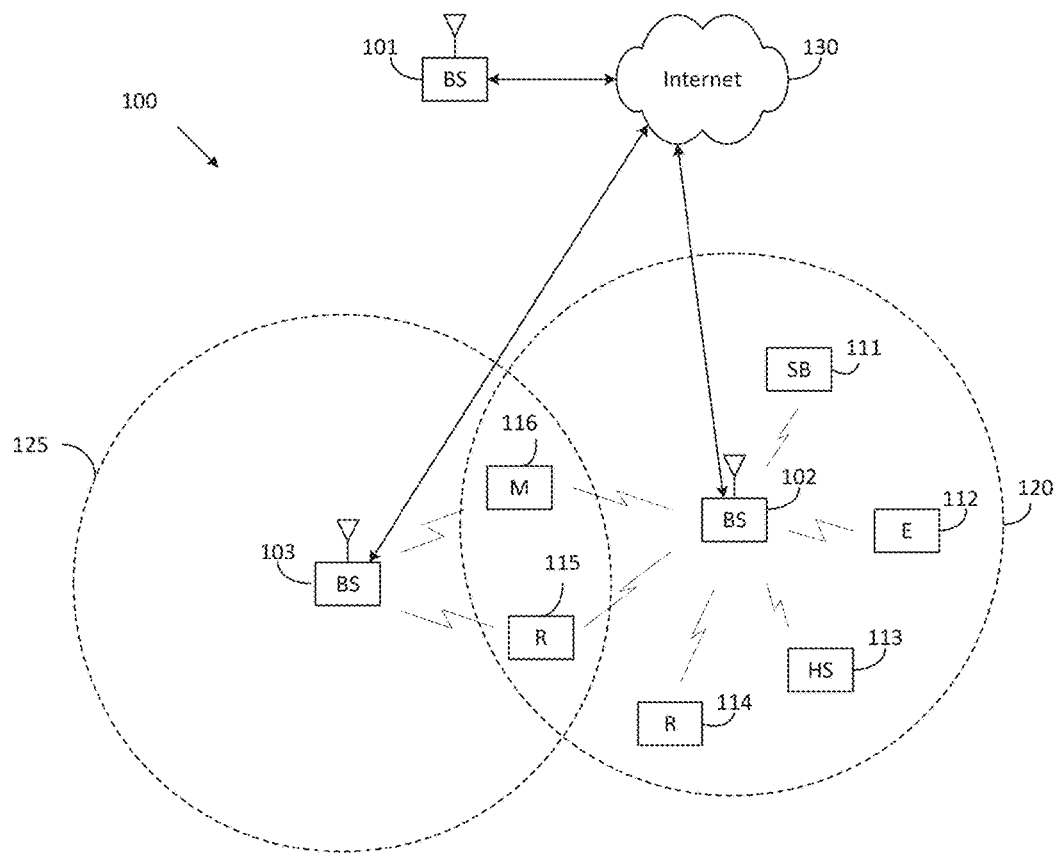
FIG. 1 illustrates an example wireless network according to embodiments of the present disclosure.
Figure 2:
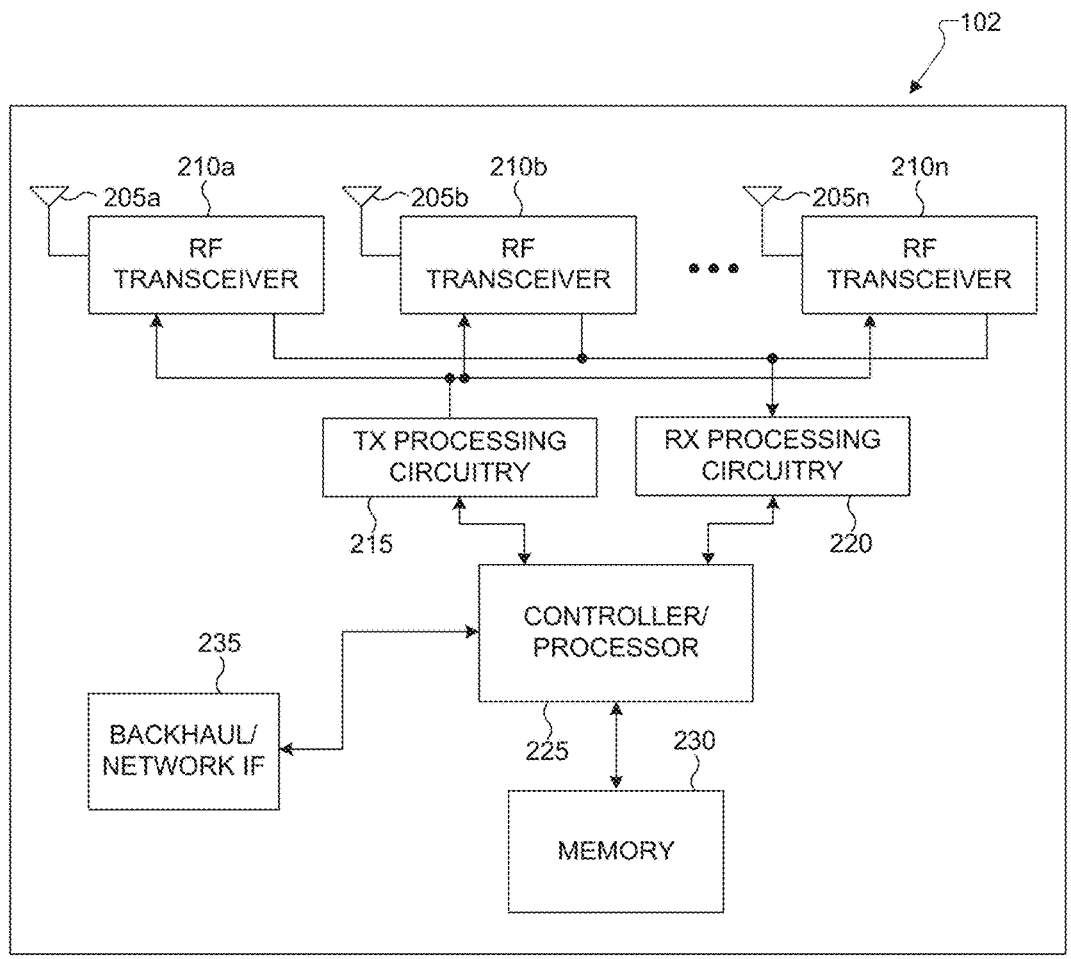
FIG. 2 illustrates an example eNB according to embodiments of the present disclosure.
Figure 3:
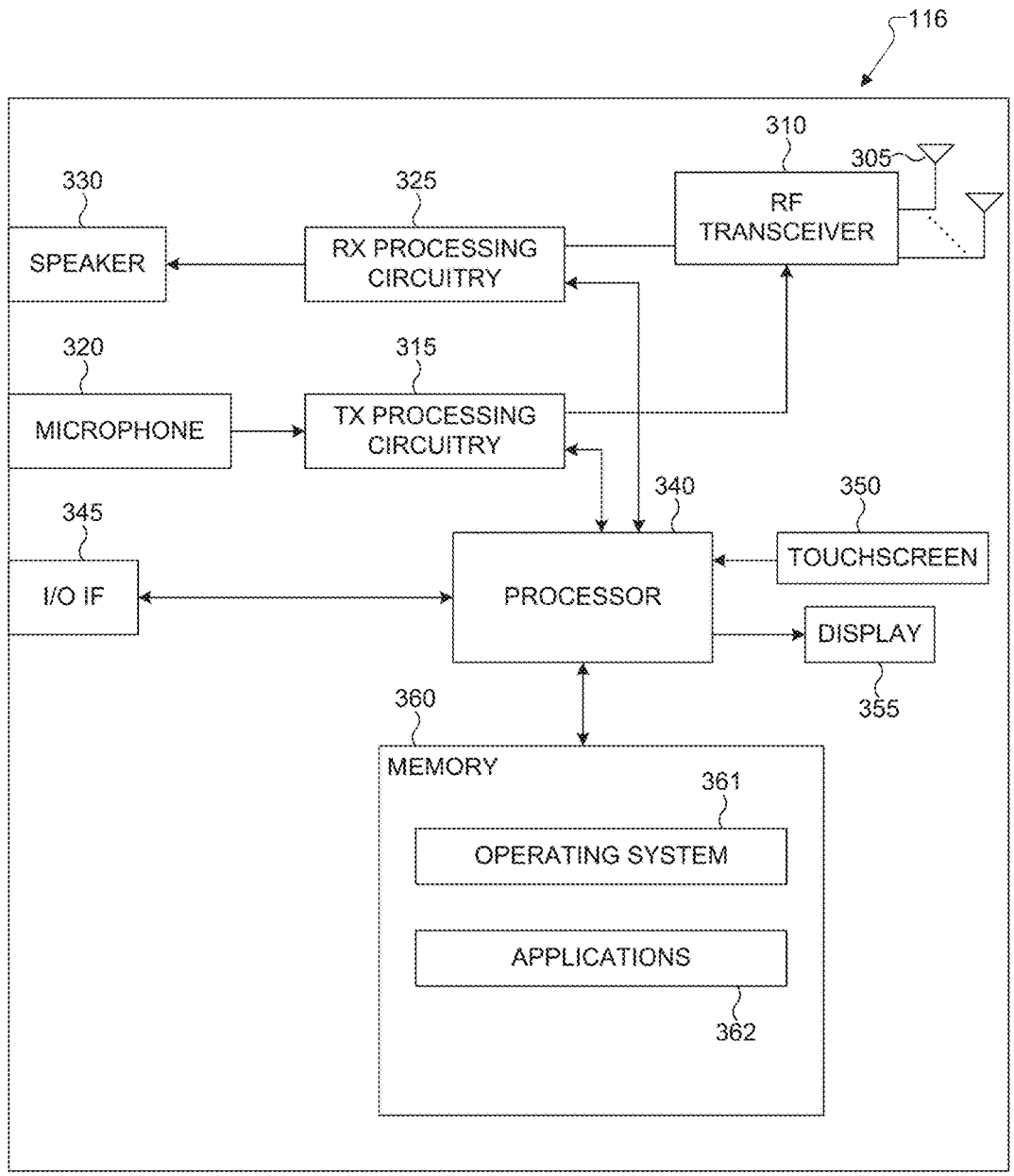
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a subband (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on uplink channel in an advanced wireless communication system. In certain embodiments, and one or more of the eNBs 101-103 includes circuitry, programing, or a combination thereof, for receiving efficient CSI reporting on uplink channel in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable transmitting, to a user equipment (UE), CSI configuration information including a number (L) of beams and a number (T) of CSI reports, wherein L and T are positive integers, and receiving the T CSI reports in T CSI reporting instances, respectively. In such embodiments, each of the CSI reports is generated based on a subset of the L beams, and each of the T CSI reports is independently decodable.

In some embodiments, the RF transceiver 210a-201n is capable receiving, in the T=1 CSI report, a rank indicator (RI)=2 and a corresponding PMI that includes $(i_{1,1}, i_{1,2})$ indicating the L beams for a first layer CSI reporting and $(i_{1,3})$ indicating an index pair $(k_1, k_2)$ associated with the L beams for a second layer CSI reporting. The index pair $(k_1, k_2)$ is identified based on $i_{1,3}$ and higher layer signaled parameters $N_1$ and $N_2$ according to:

|         | $N_1 > N_2 > 1$ |       | $N_1 = N_2$ |       | $N_1 = 2, N_2 = 1$ |       | $N_1 > 2, N_2 = 1$ |       |
|---------|-----------------|-------|-------------|-------|--------------------|-------|--------------------|-------|
| $i_{1,3}$ | $k_1$          | $k_2$ | $k_1$       | $k_2$ | $k_1$              | $k_2$ | $k_1$              | $k_2$ |
| 0       | 0               | 0     | 0           | 0     | 0                  | 0     | 0                  | 0     |
| 1       | $O_1$           | 0     | $O_1$       | 0     | $O_1$              | 0     | $O_1$              | 0     |
| 2       | 0               | $O_2$ | 0           | $O_2$ |                    |       | $2O_1$             | 0     |
| 3       | $2O_1$          | 0     | $O_1$       | $O_2$ |                    |       | $3O_1$             | 0,    | and $O_1$ and $O_2$ are oversampling factors in first and second dimensions, respectively.

the PMI codebook for RI=2 is given by:

L = 1 or Codebook-Config = 1
$i_{1,2} = 0, \ldots, N_2 O_2 - 1$

| $i_{1,1}$ | $i_2$ | |
|---|---|---|
| | 0 | 1 |
| $0, \ldots, N_1 O_1 - 1$ | $W^{(2)}_{i_{1,1}, i_{1,1}+k_1, i_{1,2}, i_{1,2}+k_2, 0}$ | $W^{(2)}_{i_{1,1}, i_{1,1}+k_1, i_{1,2}, i_{1,2}+k_2, 1}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

L = 4 or Codebook-Config = 2, $N_2 > 1$
$i_{1,2} = 0, \ldots, N_2 O_2/2 - 1$

| $i_{1,1}$ | $i_2$ | | |
|---|---|---|---|
| | 0 | 1 | 2 |
| $0, \ldots, \dfrac{N_1 O_1}{2} - 1$ | $W^{(2)}_{2i_{1,1}, 2i_{1,1}+k_1, 2i_{1,2}, 2i_{1,2}+k_2, 0}$ | $W^{(2)}_{2i_{1,1}, 2i_{1,1}+k_1, 2i_{1,2}, 2i_{1,2}+k_2, 1}$ | $W^{(2)}_{2i_{1,1}+1, 2i_{1,1}+1+k_1, 2i_{1,2}, 2i_{1,2}+k_2, 0}$ |

| $i_{1,1}$ | $i_2$ | | |
|---|---|---|---|
| | 3 | 4 | 5 |
| $0, \ldots, \dfrac{N_1 O_1}{2} - 1$ | $W^{(2)}_{2i_{1,1}+1, 2i_{1,1}+1+k_1, 2i_{1,2}, 2i_{1,2}+k_2, 1}$ | $W^{(2)}_{2i_{1,1}, 2i_{1,1}+k_1, 2i_{1,2}+1, 2i_{1,2}+1+k_2, 0}$ | $W^{(2)}_{2i_{1,1}, 2i_{1,1}+k_1, 2i_{1,2}+1, 2i_{1,2}+1+k_2, 1}$ |

| $i_{1,1}$ | $i_2$ | |
|---|---|---|
| | 6 | 7 |
| $0, \ldots, \dfrac{N_1 O_1}{2} - 1$ | $W^{(2)}_{2i_{1,1}+1, 2i_{1,1}+1+k_1, 2i_{1,2}+1, 2i_{1,2}+1+k_2, 0}$ | $W^{(2)}_{2i_{1,1}+1, 2i_{1,1}+1+k_1, 2i_{1,2}+1, 2i_{1,2}+1+k_2, 1}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

L = 4 or Codebook-Config = 2, $N_2 = 1$
$i_{1,2} = 0$

| $i_{1,1}$ | $i_2$ | | |
|---|---|---|---|
| | 0 | 1 | 2 |
| $0, \ldots, \dfrac{N_1 O_1}{2} - 1$ | $W^{(2)}_{2i_{1,1}, 2i_{1,1}+k_1, 0, 0, 0}$ | $W^{(2)}_{2i_{1,1}, 2i_{1,1}+k_1, 0, 0, 1}$ | $W^{(2)}_{2i_{1,1}+1, 2i_{1,1}+1+k_1, 0, 0, 0}$ |

| $i_{1,1}$ | $i_2$ | | |
|---|---|---|---|
| | 3 | 4 | 5 |
| $0, \ldots, \frac{N_1 O_1}{2} - 1$ | $W^{(2)}_{2i_{1,1}+1, 2i_{1,1}+1+k_1, 0, 0, 1}$ | $W^{(2)}_{2i_{1,1}+2, 2i_{1,1}+2+k_1, 0, 0, 0}$ | $W^{(2)}_{2i_{1,1}+2, 2i_{1,1}+2+k_1, 0, 0, 1}$ |

| $i_{1,1}$ | $i_2$ | |
|---|---|---|
| | 6 | 7 |
| $0, \ldots, \frac{N_1 O_1}{2} - 1$ | $W^{(2)}_{2i_{1,1}+3, 2i_{1,1}+3+k_1, 0, 0, 0}$ | $W^{(2)}_{2i_{1,1}+3, 2i_{1,1}+3+k_1, 0, 0, 1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

$\varphi_n = e^{j\pi n/2}$, where $u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$.

$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$ The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of indicating to the UE whether to perform a single CSI reporting (T=1) or multiple CSI reportings (T>1) based on whether L≤v or L>v, respectively, where v is a fixed value, for example, greater or equal to 4.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), CSI configuration information including a number (L) of beams and a number (T) of CSI reports, wherein L and T are positive integers, and transmitting, to the BS, the T CSI reports in T CSI reporting instances, respectively, wherein each of the T CSI reports is independently decodable.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of generating the T CSI reports, wherein each of the CSI reports is generated based on a subset of the L beams and determining whether to perform a single CSI reporting (T=1) or multiple CSI reportings (T>1) based on whether L≤v or L>v, respectively, where v is a fixed value, for example, greater or equal to 4.

In some embodiments, the processor 340 is also capable of generating one or more precoding matrix indicators (PMIs) and one or more rank indicators (RIs) for the T CSI reports, and each of the T CSI reports includes at least one of the PMIs and only a first in time of the T CSI reports includes at least one of the RIs.

In some embodiments, the processor 340 is also capable of generating one or more precoding matrix indicators (PMIs) and one or more channel quality indicators (CQIs) for the T CSI reports, and each of the T CSI reports includes at least one of the PMIs and only one of the T CSI reports includes at least one of the CQIs.

In some embodiments, the processor 340 is also capable of generating one or more precoding matrix indicators (PMIs) and multiple channel quality indicator (CQIs) for the T CSI reports, and each of the T CSI reports includes at least one of the PMIs and multiple of the T CSI reports include at least one of the CQIs.

In some embodiments, the processor 340 is also capable of generating, for the T=1 CSI report, a rank indicator (RI)=2 and a corresponding PMI that includes ($i_{1,1}$, $i_{1,2}$) indicating the L beams for a first layer CSI reporting and ($i_{1,3}$) an index pair ($k_1$, $k_2$) associated with indicating the L beams for a second layer CSI reporting. The index pair ($k_1$, $k_2$) is identified based on $i_{1,3}$ and higher layer signaled parameters $N_1$ and $N_2$ according to:

| | $N_1 > N_2 > 1$ | | $N_1 = N_2$ | | $N_1 = 2, N_2 = 1$ | | $N_1 > 2, N_2 = 1$ | |
|---|---|---|---|---|---|---|---|---|
| $i_{1,3}$ | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ | | | $2O_1$ | 0 |
| 3 | $2O_1$ | 0 | $O_1$ | $O_2$ | | | $3O_1$ | 0, | and $O_1$ and $O_2$ are oversampling factors in first and second dimensions, respectively.

the PMI codebook for RI=2 is given by:

$$
\begin{array}{c}
L = 1 \text{ or Codebook-Config} = 1 \\
i_{1,2} = 0, \ldots, N_2 O_2 - 1
\end{array}
$$

| $i_{1,1}$ | $i_2$ | |
|---|---|---|
| | 0 | 1 |
| $0, \ldots, N_1 O_1 - 1$ | $W^{(2)}_{i_{1,1}, i_{1,1}+k_1, i_{1,2}, i_{1,2}+k_2, 0}$ | $W^{(2)}_{i_{1,1}, i_{1,1}+k_1, i_{1,2}, i_{1,2}+k_2, 1}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

-continued

| L = 4 or Codebook-Config = 2, $N_2 > 1$ |
|---|
| $i_{1,2} = 0, \ldots, N_2 O_2/2 - 1$ |

| $i_{1,1}$ | $i_2$ | | |
|---|---|---|---|
| | 0 | 1 | 2 |
| $0, \ldots, \dfrac{N_1 O_1}{2} - 1$ | $W^{(2)}_{2i_{1,1},2i_{1,1}+k_1,2i_{1,2},2i_{1,2}+k_2,0}$ | $W^{(2)}_{2i_{1,1},2i_{1,1}+k_1,2i_{1,2},2i_{1,2}+k_2,1}$ | $W^{(2)}_{2i_{1,1}+1,2i_{1,1}+1+k_1,2i_{1,2},2i_{1,2}+k_2,0}$ |

| $i_{1,1}$ | $i_2$ | | |
|---|---|---|---|
| | 3 | 4 | 5 |
| $0, \ldots, \dfrac{N_1 O_1}{2} - 1$ | $W^{(2)}_{2i_{1,1}+1,2i_{1,1}+1+k_1,2i_{1,2},2i_{1,2}+k_2,1}$ | $W^{(2)}_{2i_{1,1},2i_{1,1}+k_1,2i_{1,2}+1,2i_{1,2}+1+k_2,0}$ | $W^{(2)}_{2i_{1,1},2i_{1,1}+k_1,2i_{1,2}+1,2i_{1,2}+1+k_2,1}$ |

| $i_{1,1}$ | $i_2$ | |
|---|---|---|
| | 6 | 7 |
| $0, \ldots, \dfrac{N_1 O_1}{2} - 1$ | $W^{(2)}_{2i_{1,1}+1,2i_{1,1}+1+k_1,2i_{1,2}+1,2i_{1,2}+1+k_2,0}$ | $W^{(2)}_{2i_{1,1}+1,2i_{1,1}+1+k_1,2i_{1,2}+1,2i_{1,2}+1+k_2,1}$ | where $W^{(2)}_{l,l',m,m',n} = \dfrac{1}{\sqrt{2 P_{CSI-RS}}} \begin{bmatrix} v_{l,m} & v_{l',m'} \\ \varphi_n v_{l,m} & -\varphi_n v_{l',m'} \end{bmatrix}$.

| L = 4 or Codebook-Config = 2, $N_2 = 1$ |
|---|
| $i_{1,2} = 0$ |

| $i_{1,1}$ | $i_2$ | | |
|---|---|---|---|
| | 0 | 1 | 2 |
| $0, \ldots, \dfrac{N_1 O_1}{2} - 1$ | $W^{(2)}_{2i_{1,1},2i_{1,1}+k_1,0,0,0}$ | $W^{(2)}_{2i_{1,1},2i_{1,1}+k_1,0,0,1}$ | $W^{(2)}_{2i_{1,1}+1,2i_{1,1}+1+k_1,0,0,0}$ |

| $i_{1,1}$ | $i_2$ | | |
|---|---|---|---|
| | 3 | 4 | 5 |
| $0, \ldots, \dfrac{N_1 O_1}{2} - 1$ | $W^{(2)}_{2i_{1,1}+1,2i_{1,1}+1+k_1,0,0,1}$ | $W^{(2)}_{2i_{1,1}+2,2i_{1,1}+2+k_1,0,0,0}$ | $W^{(2)}_{2i_{1,1}+2,2i_{1,1}+2+k_1,0,0,1}$ |

| $i_{1,1}$ | $i_2$ | |
|---|---|---|
| | 6 | 7 |
| $0, \ldots, \dfrac{N_1 O_1}{2} - 1$ | $W^{(2)}_{2i_{1,1}+3,2i_{1,1}+3+k_1,0,0,0}$ | $W^{(2)}_{2i_{1,1}+3,2i_{1,1}+3+k_1,0,0,1}$ | where $W^{(2)}_{l,l',m,m',n} = \dfrac{1}{\sqrt{2 P_{CSI-RS}}} \begin{bmatrix} v_{l,m} & v_{l',m'} \\ \varphi_n v_{l,m} & -\varphi_n v_{l',m'} \end{bmatrix}$.

$\varphi_n = e^{j\pi n/2}$, where $u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$.

$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$ In some embodiments, the processor 340 is also capable of identifying one of two subband sizes configured via higher layer signaling for the UE for the CSI reporting per subband based in part on a number of physical resource blocks (PRBs) included in a carrier bandwidth part according to:

| Carrier bandwidth part (PRBs) | Subband Size (PRBs) |
| --- | --- |
| 24-60 | 4, 8 |
| 61-100 | 8, 16 |
| 101-200 | 12, 24 |
| 201-275 | 16, 32, | and the subband size=N which corresponds to N contiguous PRBs in the carrier bandwidth part.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
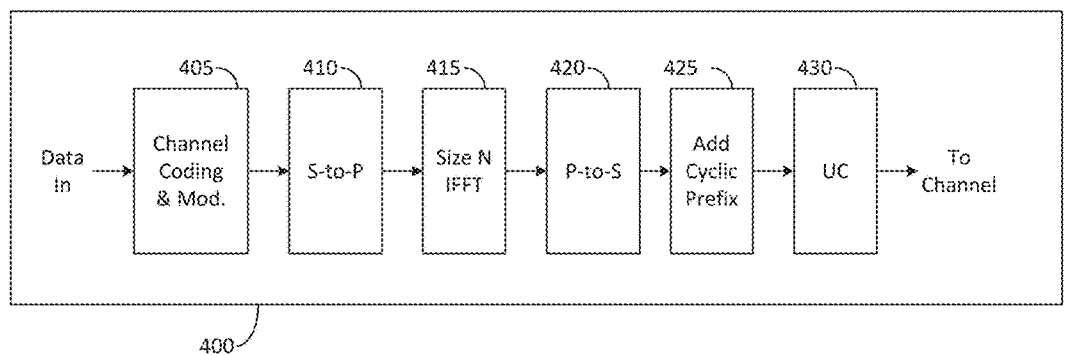
FIG. 4A illustrates an example high-level diagram of an orthogonal frequency division multiple access transmit path according to embodiments of the present disclosure.
Figure 4B:
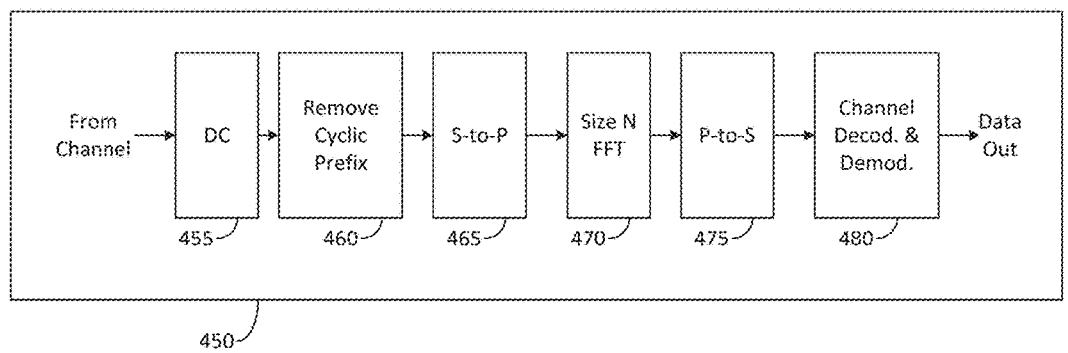
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the fast Fourier transform and the inverse fast Fourier transform, this is by way of illustration only and may not be construed to limit the scope of the disclosure. It will be appreciated that in an alternate embodiment of the disclosure, the fast Fourier transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE specification precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission scheme wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE"s data transmission/reception.

Figure 5:
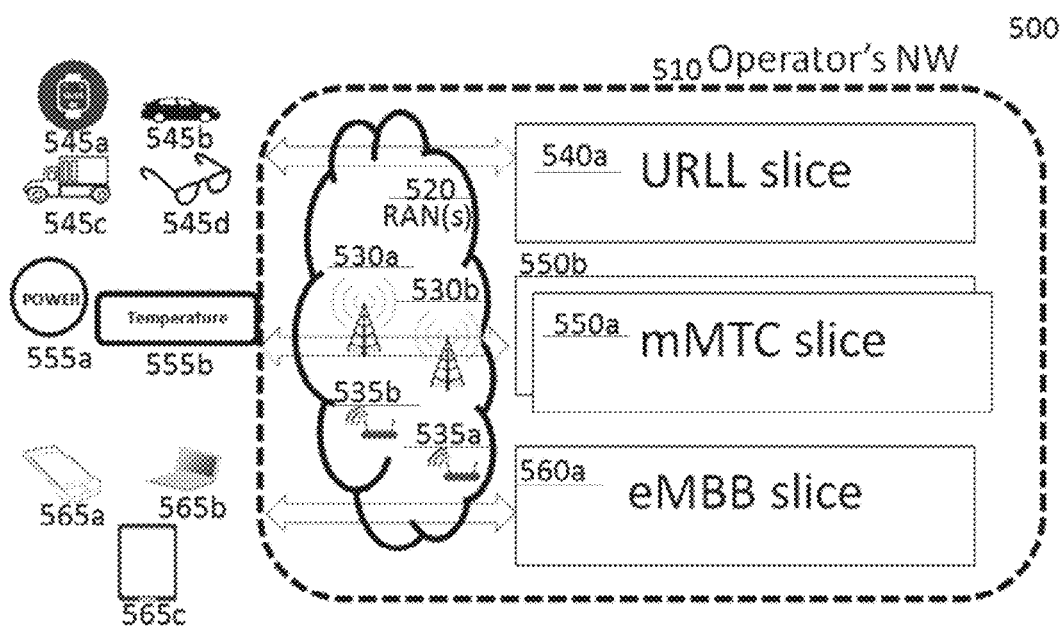
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a method to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
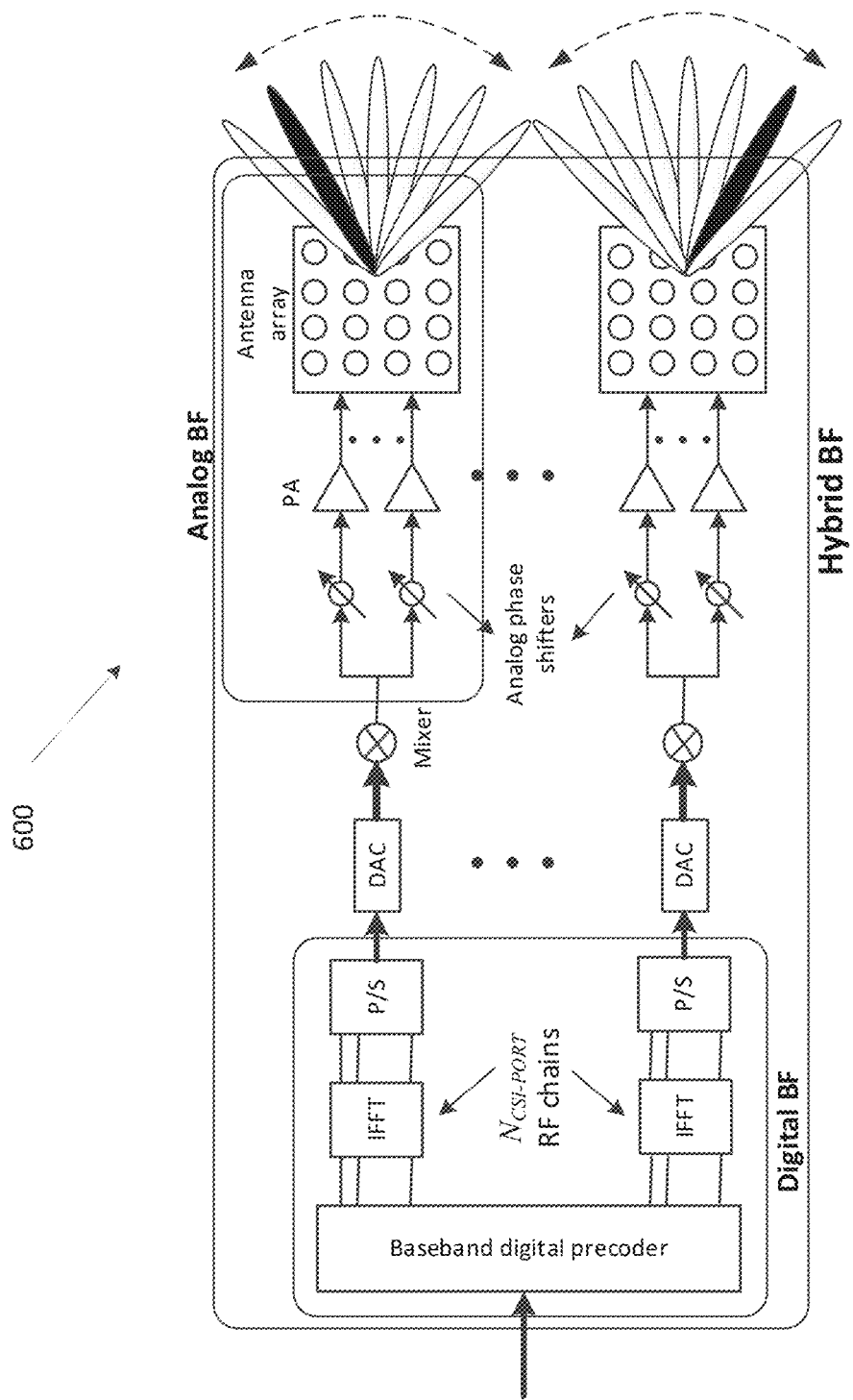
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, an efficient design of CSI-RS is a crucial factor. For this reason, three types of CSI reporting mechanism corresponding to three types of CSI-RS measurement behavior are supported in LTE specification) "CLASS A" CSI reporting which corresponds to non-precoded CSI-RS, 2) "CLASS B" reporting with K=1 CSI-RS resource which corresponds to UE-specific beamformed CSI-RS, 3) "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation of the DL-long-term channel statistics). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE specification for eFD-MIMO, MIMO has been identified as an essential feature in order to achieve high system throughput requirements and MIMO may continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB, and CSI acquisition and feedback from UE. In legacy (up to LTE specification) FDD systems, the CSI feedback framework is "implicit" in the form of CQI/PMI/RI (and CRI in the LTE specification) derived from a codebook assuming SU transmission from eNB. Because of the inherent SU assumption while deriving CSI, this implicit CSI feedback is inadequate for MU transmission.

Since future (e.g. NR) systems are likely to be more MU-centric, this SU-MU CSI mismatch may be a bottleneck in achieving high MU performance gains. Another issue with implicit feedback is the scalability with larger number of antenna ports at eNB. For large number of antenna ports, the codebook design for implicit feedback is quite complicated (for example, in the LTE specification, the total number of Class A codebooks=44), and the designed codebook is not guaranteed to bring justifiable performance benefits in practical deployment scenarios (for example, only a small percentage gain can be shown at the most). Realizing aforementioned issues, RAN1 has agreed to provide specification support to advanced CSI reporting in the LTE specification of eFD-MIMO, which, at the very least, can serve as a good starting point to design advanced CSI scheme in NR MIMO.

Figure 7:
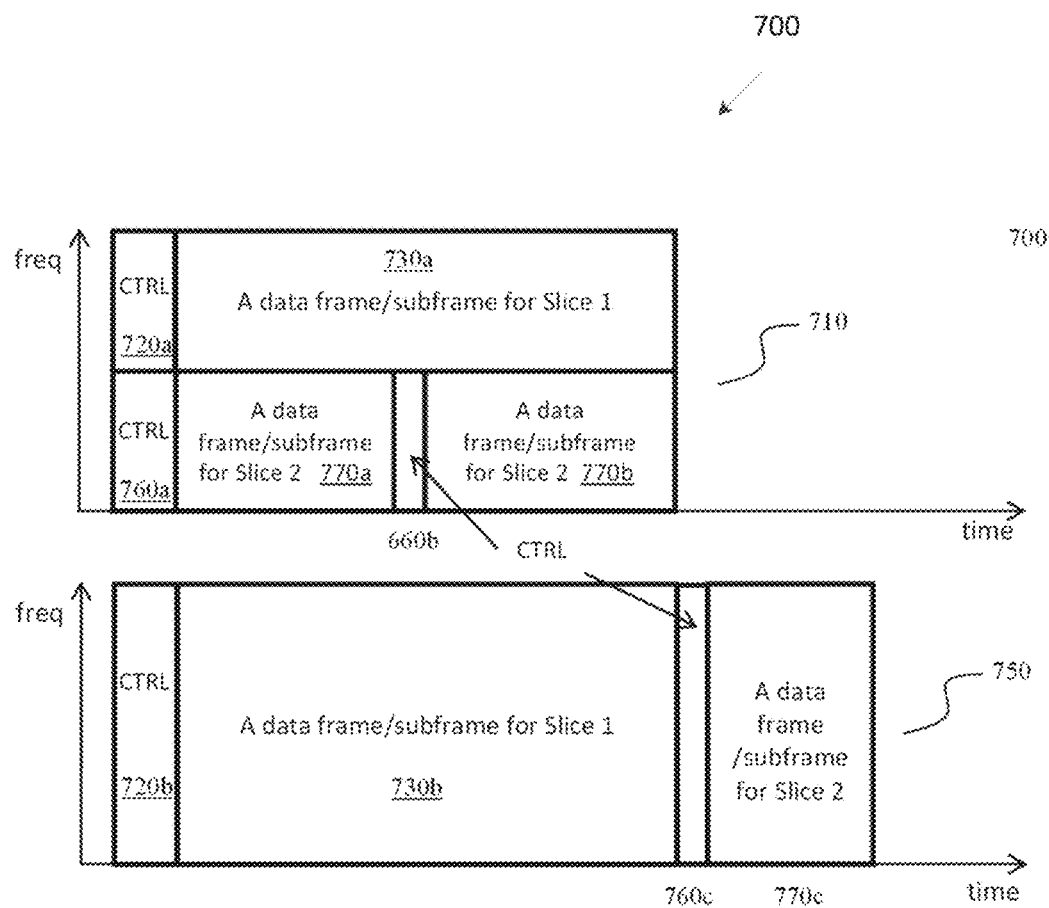
FIG. 7 illustrates an example multiplexing two slices according to embodiments of the present disclosure.

FIG. 7 illustrates an example multiplexing two slices 700 according to embodiments of the present disclosure. An embodiment of the multiplexing two slices 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

To utilize PHY resources efficiently and multiplex various slices (with different resource allocation schemes, numerologies, and scheduling strategies) in DL-SCH, a flexible and self-contained frame or subframe design is utilized. Two exemplary instances of multiplexing two slices within a common subframe or frame are depicted in FIG. 7. In FIG. 7, a slice can be composed of one or two transmission instances where one transmission instance includes a control (CTRL) component (720a, 760a, 760b, 720b, and 760c) and a data component (730a, 770a, 770b, 730b, and 770c). In FIG. 7, the two slides (e.g., 710) are multiplexed in frequency domain whereas slices are multiplexed in time domain (e.g., 750).

In some embodiments of flexibility CSI reporting framework, CSI reporting in NR may be flexible to support users with different CSI reporting capabilities. For example, some users may only be capable of reporting implicit CSI in the form of PMI/CQI/RI as in LTE and some other users may be capable of reporting both implicit as well as explicit channel reporting. In addition, UE motilities in NR can range from 0 kmph to 500 kmph. So, CSI reporting framework should be able to support such diverse use cases and UE capabilities.

In some embodiments of increased number of antenna port in NR MIMO, the number of antenna elements at the eNB can be up to 256, which means that the total number of antenna ports can be more than 32, which is the maximum number of antenna ports supported in LTE eFD-MIMO. Although this can be accommodated with partial-port CSI-RS mapping where each subset includes at most 32 ports, the total number of ports across time can be extended to a much larger number. As the number of ports increases, meaningful system gain can only be obtained in a MU-centric system.

In some embodiments of increased throughput requirement, the system throughput requirements (e.g. for eMBB in NR) is several times more than that for LTE eFD-MIMO. Such high throughput requirements can only met with a mechanism to provide very accurate CSI to the eNB.

In some embodiments of beamforming, following the trend established in FD-MIMO, NR MIMO system may be beam-formed either cell-specifically or UE-specifically, where the beams can either be of analog (RF) or digital or hybrid type. For such a beam-formed system, a mechanism is needed to obtain accurate beam-forming information at the eNB.

In some embodiments of unified design, since NR includes both above and below 6 GHz frequency bands, a unified MIMO framework working for both frequency regimes may be preferable. In view of the above-mentioned issues with the implicit feedback paradigm in up to LTE systems, and the additional differentiating factors specific with NR MIMO, it can make the observation that the implicit CSI feedback scheme alone is not enough for NR MIMO, and hence advanced CSI is needed. The main driver, as mentioned above, is MU-MIMO.

Figure 8:
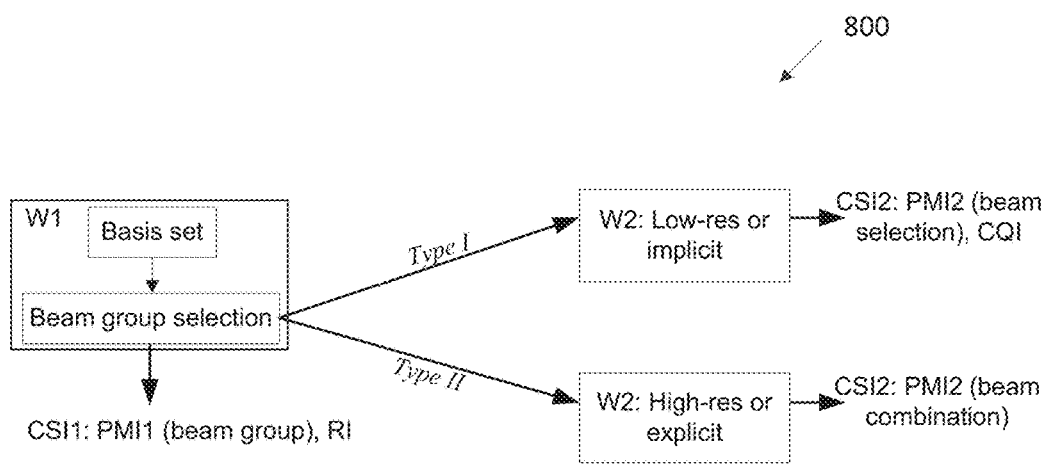
FIG. 8 illustrates an example dual-resolution CSI reporting framework according to embodiments of the present disclosure.

FIG. 8 illustrates an example dual-resolution CSI reporting framework 800 according to embodiments of the present disclosure. An embodiment of the dual-resolution CSI reporting framework 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A dual-resolution CSI reporting framework in communication systems such as 5G NR is shown in FITURE 8, in which two types of CSI resolution, namely Type I CSI and Type II CSI, can be reported. Each of the two CSI types has at least two CSI components: the first CSI component (i.e., CSI1) is common to both resolution types and indicates the selection of a beam group (comprising of L beams), e.g. using the first PMI (PMI1). CSI1 may also include a rank indicator (i.e., RI in Type I CSI) associated with the selected beam group. The second CSI component (i.e., CSI2) is specific to the configured CSI resolution type.

In one example of Type I Low-resolution CSI reporting, CSI2 is derived based on implicit CSI reporting framework (e.g. up to LTE Class A codebook based CSI reporting) and includes CSI components such as the second PMI (PMI2) and CQI, where PMI2 indicates beam selection from the beam group indicated by PMI1 and co-phase for two polarizations. This CSI type can be configured to users who are not capable of reporting high-resolution Type II CSI or users who are scheduled for SU transmission. Also, this CSI reporting type can be the default CSI reporting type for NR UEs.

In another example of Type II high-resolution CSI reporting, CSI2 is derived to report a form of quantized DL channel explicitly in order to facilitate more accurate CSI to the gNB, where the quantized explicit CSI is reported based on combination of beams in the beam group indicated by PMI1. This CSI type can be configured to users who are capable of reporting high-resolution Type II CSI or/and can be scheduled for MU transmission.

The focus of the present disclosure is on the codebook design for this dual-resolution CSI reporting framework. In particular, similar to LTE specification, the proposed codebook is a dual-stage codebook: $W=W_1W_2$, where the first stage $W_1$ codebook is used to report a beam group for both Type I and Type II CSI using the first PMI (PMI1), and the second stage $W_2$ codebook is used to report beam selection for implicit feedback (Type I CSI) and beam combination for explicit feedback (Type II CSI) using the second PMI (PMI2).

In the following, it assumes that $N_1$ and $N_2$ are the number of antenna ports with the same polarization in the first and second dimensions, respectively. For 2D antenna port layouts, it may have $N_1>1$, $N_2>1$, and for 1D antenna port layouts, it may be either have $N_1>1$ and $N_2=1$ or $N_2>1$ and $N_1=1$. In the rest of the present disclosure, 1D antenna port layouts with $N_1>1$ and $N_2=1$ is considered. The present disclosure, however, is applicable to the other 1D port layouts with $N_2>1$ and $N_1=1$. For a dual-polarized antenna port layout, the total number of antenna ports is $2N_1N_2$.

Figure 9:
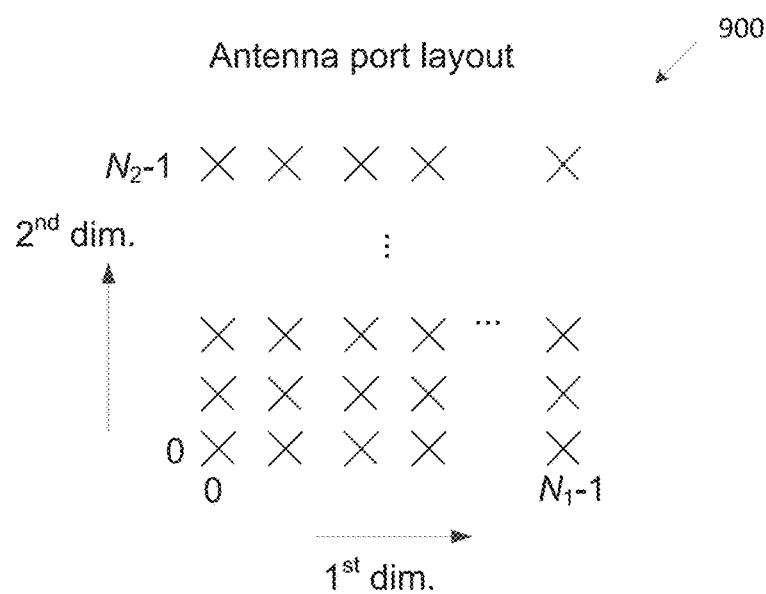
FIG. 9 illustrates an example 2D antenna port layout according to embodiments of the present disclosure.

FIG. 9 illustrates an example 2D antenna port layout 900 according to embodiments of the present disclosure. An embodiment of the 2D antenna port layout 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In some embodiments, a $W_1$ codebook of the dual-stage codebook is proposed, which comprises of at least the following components: basis set, which comprises of ($L_1$, $L_2$) beams for 2D antenna port layouts and ($L_1$, 1) for 1D antenna port layouts; and beam selection, which is for L beam selection from $L_1L_2$ beams in a basis set. The purpose of basis set and beam selection is dimension reduction in spatial domain, from $2N_1N_2$ antenna ports to L spatial beams. The basis set is a 2×2 block diagonal matrix $$B = \begin{bmatrix} W & 0 \\ 0 & W \end{bmatrix},$$

where W is $N_1N_2 \times L_1L_2$, $L_1 \in \{1,2,\ldots,N_1-1\}$, and $L_2 \in \{1,2,\ldots,N_2-1\}$ for 2D port layouts, and $L_2=1$ for 1D port layouts. For beam selection, L out of $L_1L_2$ beams in W are selected according to one of the two alternatives: fixed beam selection based on pre-defined beam patterns and unrestricted (free) beam selection. The details of the two beam selection alternatives are proposed later in the present disclosure.

Figure 10:
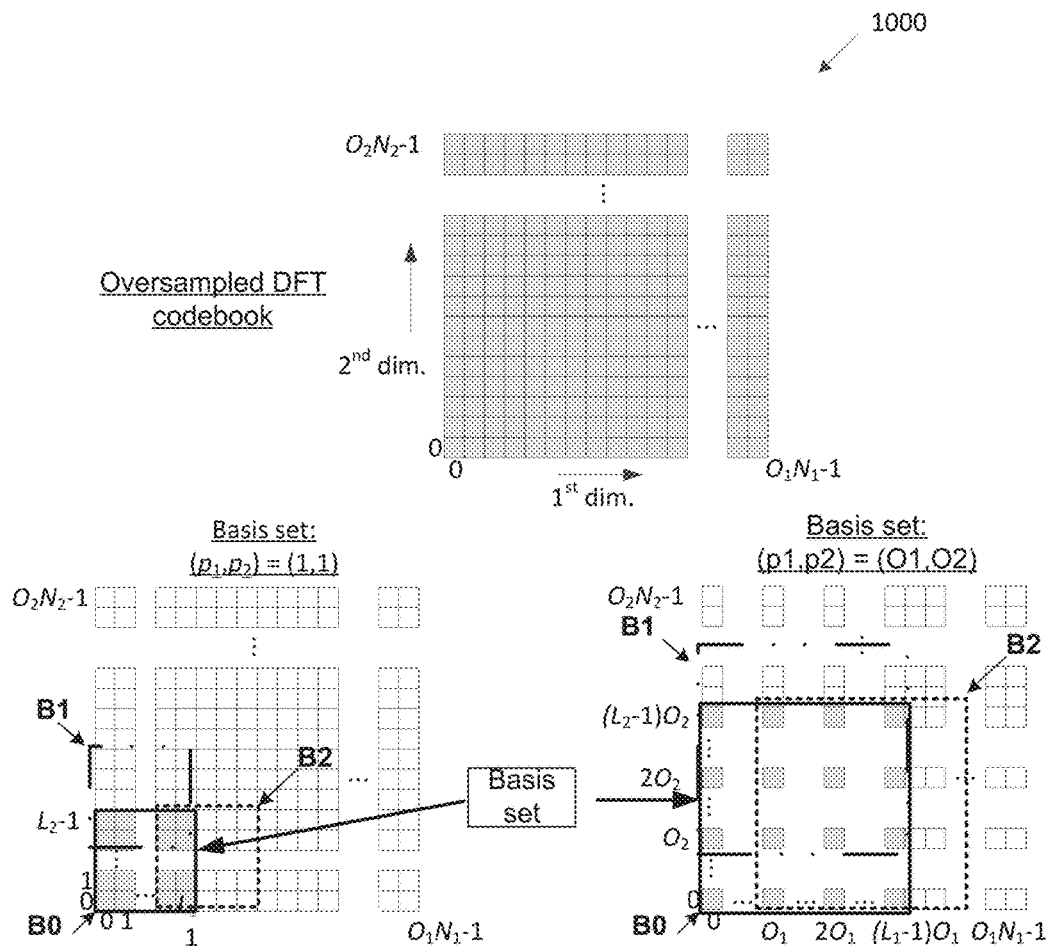
FIG. 10 illustrates an example basis set for dimension reduction according to embodiments of the present disclosure.

FIG. 10 illustrates an example basis set for dimension reduction 1000 according to embodiments of the present disclosure. An embodiment of the basis set for dimension reduction 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

An illustration of the basis set construction is shown in FIG. 10. An oversampled DFT codebook serves as the basis set comprising of $O_1 N_1 \times O_2 N_2$ DFT beams, where $O_1$ and $O_2$ are oversampling factors in first and second dimensions, respectively. A basis set comprises of $L_1$ and $L_2$ uniformly spaced beams in the two dimensions. The basis set is further parameterized by beam spacing parameters $(p_1, p_2)$ which represent spacing between two adjacent beams in two dimensions. A few example values for $L_d$ and $p_d$, where d=1, 2 belong to $\{1, 2, 4, \ldots, N_d\}$ and $\{1, 2, 4, \ldots, O_d\}$, respectively. An illustration of two types of basis set is shown in FIG. 10, where each small square represents a 2D DFT beam. When $(p_1, p_2)=(1, 1)$, the basis set corresponds to $L_1 L_2$ closely spaced beams, and when $(p_1, p_2)=(O_1, O_2)$, it corresponds to $L_1 L_2$ orthogonal beams. A UE is configured with one of the basis set types by configuring $(L_1, L_2)$ and $(p_1, p_2)$.

In one embodiment 0, the possible $(N_1, N_2)$ combinations for $\{2, 4, 8, 12, 16, 20, 24, 28, 32\}$ CSI-RS antenna ports are tabulated in TABLE 1.

TABLE 1

| Supported configurations of $(N_1, N_2)$ | |
|---|---|
| Number of CSI-RS antenna ports, P | $(N_1, N_2)$ |
| 2 | (1, 1) |
| 4 | (2, 1) |
| 8 | (2, 2), (4, 1) |
| 12 | (2, 3), (3, 2), (6, 1) |
| 16 | (2, 4), (4, 2), (8, 1) |
| 20 | (2, 5), (5, 2), (10, 1) |
| 24 | (2, 6), (3, 4), (4, 3), (6, 2), (12, 1) |
| 28 | (2, 7), (7, 2), (14, 1) |
| 32 | (2, 8), (4, 4), (8, 2), (12, 1) |

A few alternatives to configure codebook parameters $(N_1, N_2, O_1, O_2)$ are as follows. In one example of Alt 0-0, a single $(O_1, O_2)$ for all $(N_1, N_2)$ values is supported. For example, $(O_1, O_2)$ is either (4,4) or (8,8) or (8,4) or (4,8) for 2D port layouts ($N_1$ and $N_2>1$), and (8,-) or (4,-) for 1D layouts ($N_1$ or $N_2=1$). In another example of Alt 0-1, a single $(O_1, O_2)$ for each $(N_1, N_2)$ value is supported. For example, $(O_1, O_2)$ is either (4,4) or (8,8) or (8,4) or (4,8) for 2D port layouts ($N_1$ and $N_2>1$), and (8,-) or (4,-) for 1D layouts ($N_1$ or $N_2=1$). In yet another example of Alt 0-2, multiple $(O_1, O_2)$ values for each $(N_1, N_2)$ values is supported. For example, $(O_1, O_2)=\{(4,4), (8,8)\}$ or $\{(4,4), (8,4)\}$ for 2D, and $\{(4,-), (8,-)\}$ for 1D layouts. In yet another example of Alt 3, the supported $(N_1, N_2, O_1, O_2)$ combinations are according to LTE specification.

In one alternative, the supported $(N_1, N_2, O_1, O_2)$ combinations for both Type I and Type II CSIs can be the same. In another alternative, they are different for Type I and II CSIs. For example, Type I CSI supports multiple $(O_1, O_2)$ (Alt 0-2 above), but Type II supports only one, e.g. $(O_1, O_2)=(4, 4)$ (Alt 0-0 or Alt 0-1).

Similar to LTE specification, a UE is configured with one $(N_1, N_2, O_1, O_2)$ combination via higher layer RRC signaling. Alternatively, it is configured via MAC CE signaling or together with the CSI reporting setting configuration.

In one embodiment 1, for Type I or Type II CSI reporting, the basis set is non-orthogonal and has the following parameters. In one example, the basic set has $(L_1, L_2)$. In such example, there are B beams in each basis set, where B=4 or 8. In such example, 1D port layouts, $(L_1, L_2)=(B, 1)$ if $N_2=1$, and (1, B) if $N_1=1$, and 2D port layouts, $(L_1, L_2)=(B/2, 2)$ if $N_1 \geq N_2>1$, and (2, B/2) if $N_2>N_1>1$. In another example, the basic set has $p_1$ and $p_2$ can take values from $\{1, 2\}$, i.e., beams are closely spaced.

Figure 11A:
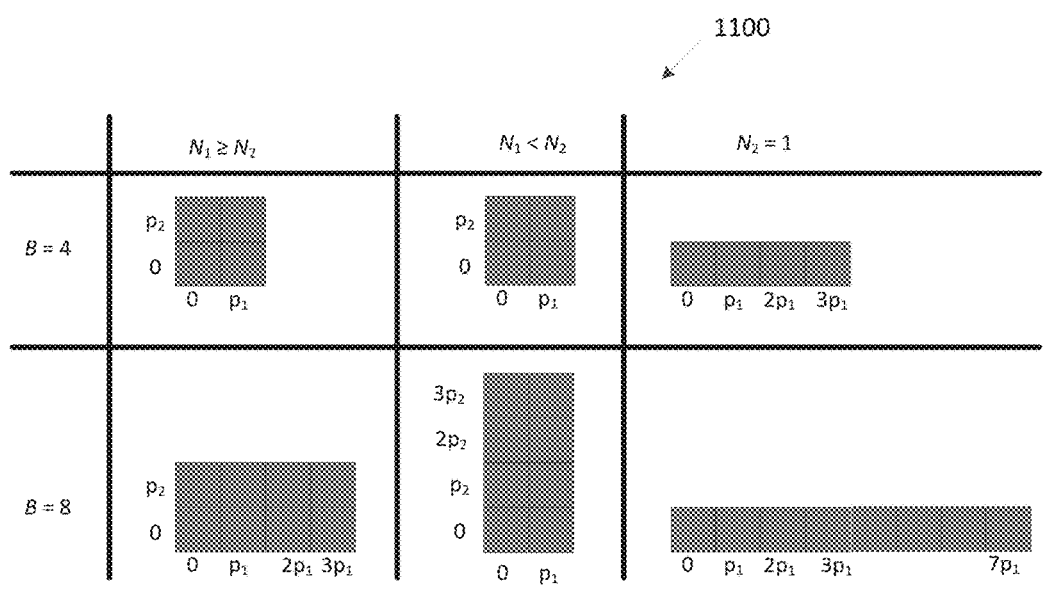

FIGS. 11A and 11B illustrate an example non-orthogonal basis set 1100 and corresponding table 1150 according to embodiments of the present disclosure. An embodiment of the non-orthogonal basis set 1100 shown in FIGS. 11A and 11B are for illustration only. One or more of the components illustrated in FIGS. 11A and 11B can be implemented in specialized circuitry configured to perform the noted functions or one or more of the components can be implemented by one or more processors executing instructions to perform the noted functions. Other embodiments are used without departing from the scope of the present disclosure.

In one embodiment of 2, for Type II CSI reporting, the basis set is orthogonal and has the following parameters. In one example, the basis set has $(L_1, L_2)$. In such example, it is according to one of the following basis types. In restricted basis set, each basis set has up to 8 beams. In such set, 1D: $(L_1, L_2)=(\min(8, N_1), 1)$ if $N_2=1$, and $(1, \min(8, N_2))$ if $N_1=1$, and 2D: $(L_1, L_2)=(\min(4, N_1), 2)$ if $N_1 \geq N_2>1$, and $(2, \min(4, N_2))$ if $N_2>N_1>1$. In unrestricted basis set, $(L_1, L_2)=(N_1, N_2)$. Each basis set has $N_1 N_2$ beams. In another example, the basis set has $(p_1, p_2)=(O_1, O_2)$, i.e., beams are orthogonal. An illustration of orthogonal basis set of two types is shown in FIG. 11B.

In one embodiment 3, a UE is configured with the number of beams (L) for the configured CSI type (Type I or Type II) from a set S. A few examples of set S are as follows. In one example of maximum 2 beams, S is a subset of $S0=\{\{1\}, \{2\},\{1, 2\}\}$, for example, $S=\{1\}, \{2\}$, or $\{1, 2\}$. In another example of maximum 3 beams, S is a subset of $S1=\{\{1\}, \{2\}, \{3\}, \{1, 2\}, \{1, 3\}, \{2, 3\}, \{1, 2, 3\}\}$, for example, $S=\{1\}, \{2\}, \{3\}$, or $\{1, 2, 3\}$. In yet another example of maximum 4 beams, S is a subset of $S2=\{\{1\}, \{2\}, \{3\}, \{4\}, \{1, 2\},\{1, 3\}, \{1, 4\}, \{2, 3\}, \{2, 4\}, \{3, 4\}, \{1, 2, 3\},\{1, 2, 4\}, \{1, 3, 4\}, \{2, 3, 4\},\{1, 2, 3, 4\}\}$, for example, $S=\{1\}, \{2\}, \{3\}, \{4\}$, or $\{1, 2, 3, 4\}$. In yet another example of maximum 8 beams, $S=\{1, 2, 3, 4, 5, 6, 7, 8\}$.

If S is a singleton set, i.e., comprises of a single L value, then the UE reports the CSI corresponding to the L value in the configured S. For instance, if $S=\{1\}$, then the UE reports the CSI corresponding to a single beam.

If S is not a singleton set, and comprises of multiple L values, then the UE reports both a preferred L value from the configured number of multiple L values, and the corresponding CSI in the CSI report. For instance, if $S=\{1, 2\}$, then the UE reports a preferred L value between 1 and 2, and reports the CSI corresponding to the reported L value.

A few examples of set S for Type I and Type II CSIs are as follows. In one example of Type I CSI, S is singleton, e.g., $S=\{1\}, \{2\}$, or $\{4\}$, one of which is configured. In another example of Type II CSI, S is singleton, e.g. $S=\{2\}, \{3\}, \{4\}$, {8}, one of which is configured. In yet another example of Type II CSI, S is non-singleton and has multiple L values, e.g., L={1, 2}, {2, 4},{1, 2, 4}, one of which is configured. In one alternative, the reporting of a preferred L value is WB or is common to SBs for which the UE is configured to report CSI. In another alternative, this reporting is for each SB for which the UE is configured to report CSI. In yet another alternative, this is partial band, where partial band corresponds to k SBs and 1<k≤total number of SBs for which the UE is configured to report CSI.

The UE can be configured with the CSI reporting granularity of L value (WB, SB, or partial band) in the CSI reporting setting. Alternatively, the CSI reporting granularity of L value is fixed in the specification, for example, to WB.

Figure 12:
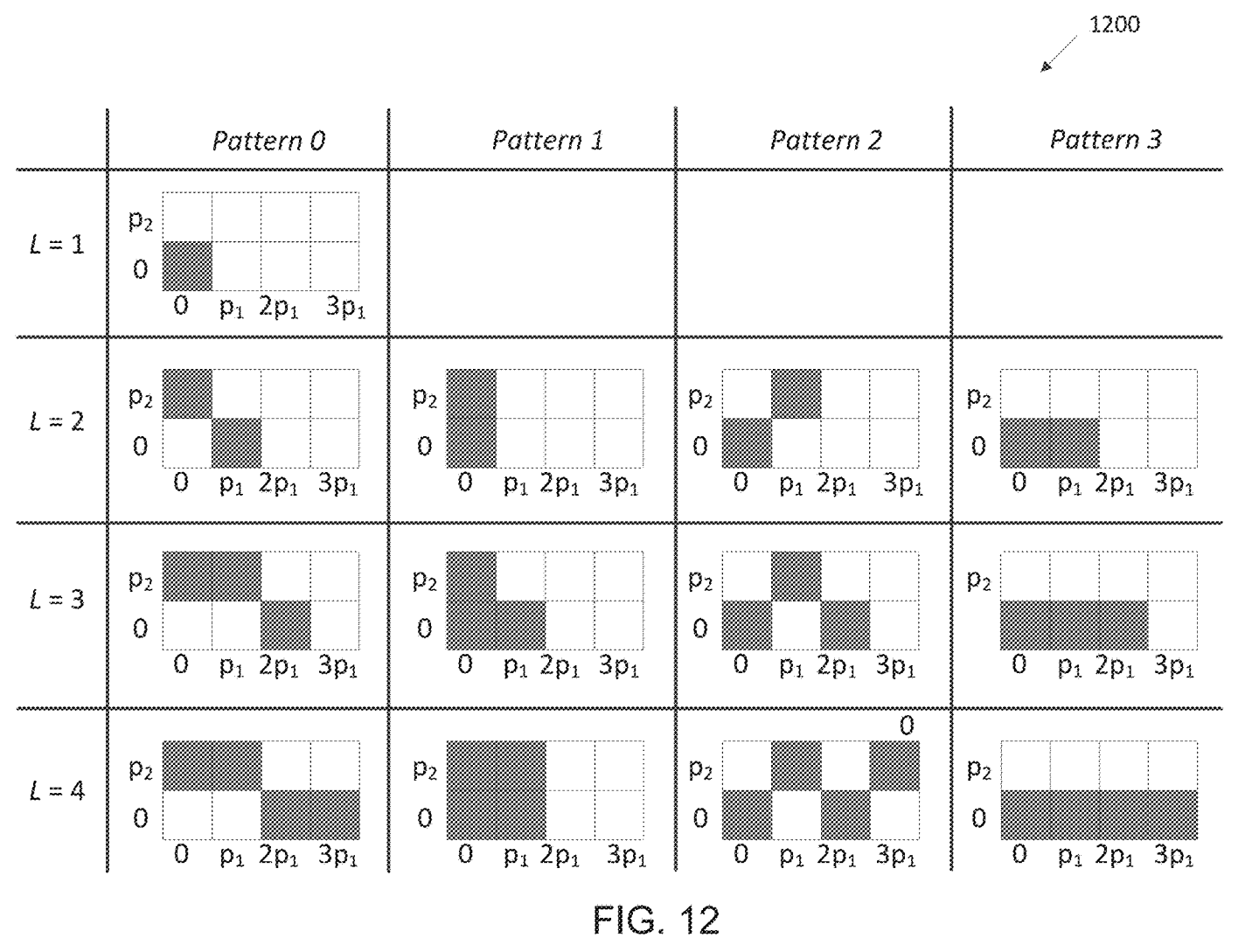

FIG. 12 illustrates an example fixed beam selection patterns 1200 according to embodiments of the present disclosure. An embodiment of the fixed beam selection patterns 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In one embodiment 4, in one alternative of beam selection in $W_1$ codebook, L beam selection is based on fixed beam selection patterns. A few examples of beam patterns for L=1, 2, 3, and 4 beams for $N_1 \geq N_2$ are shown in FIG. 12 where the basis set is non-orthogonal and is of size $(L_1, L_2)=(4,2)$ i.e., has B=8 beams. For $N_1<N_2$, the beam selection patterns can be constructed similarly by considering 4 beams in the $2^{nd}$ (i.e. longer) dimension and 2 beams in the $1^{st}$ (i.e. shorter) dimension. The selected beams are shown in dark grey squares. In the figure, the parameter pair $(p_1, p_2)$ represents the inter-beam-spacing in two dimensions. The value of $(p_1, p_2)$ is either fixed, for example, to (1, 1), or configurable by gNB, for example, via higher-layer signaling.

Figure 13:
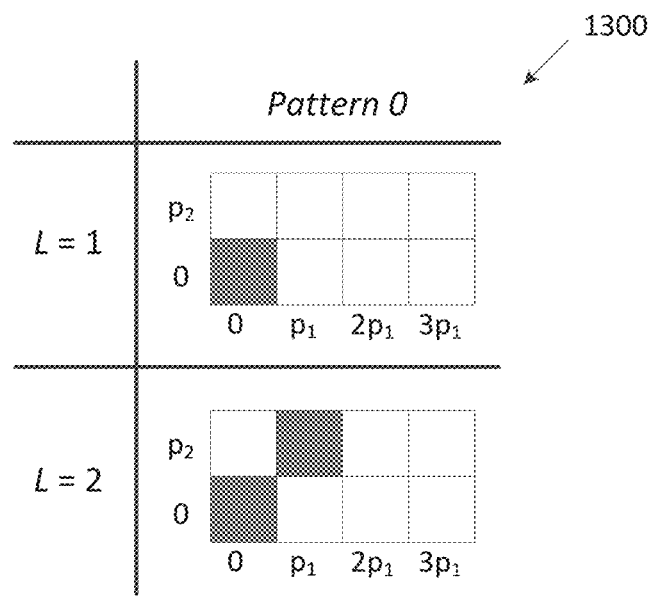
FIG. 13 illustrates an example fixed beam patterns according to embodiments of the present disclosure.

FIG. 13 illustrates an example fixed beam patterns 1300 according to embodiments of the present disclosure. An embodiment of the fixed beam patterns 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

In the following sub-embodiments (0-5), $N_1 \geq N_2$ is assumed. For $N_1<N_2$, the beam selection patterns can be constructed similarly by considering 4 beams in the $2^{nd}$ (i.e. longer) dimension and 2 beams in the $1^{st}$ (i.e. shorter) dimension. In sub-embodiment 0, only two L values, L=1 and L=2, are supported for fixed beam patterns, and for both L values, only one beam pattern is supported. An example of beam patterns in this case is shown in FIG. 13.

Figure 14:
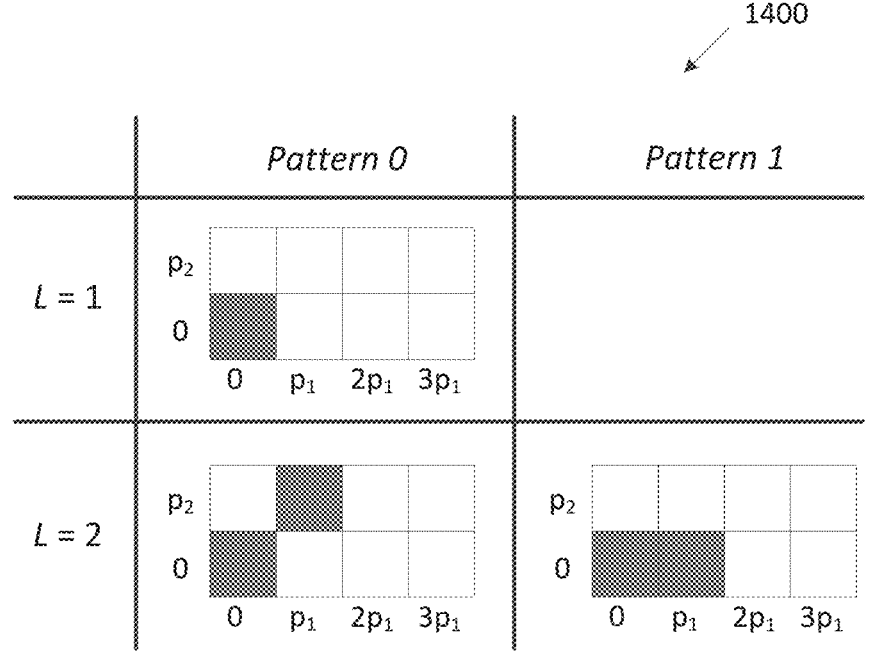
FIG. 14 illustrates another example fixed beam patterns according to embodiments of the present disclosure.

FIG. 14 illustrates another example fixed beam patterns 1400 according to embodiments of the present disclosure. An embodiment of the fixed beam patterns 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In sub-embodiment 1, only two L values, L=1 and L=2, are supported for fixed beam patterns, and for L=2, two beam patterns are supported. An example of beam patterns in this case is shown in FIG. 14.

Figure 15:
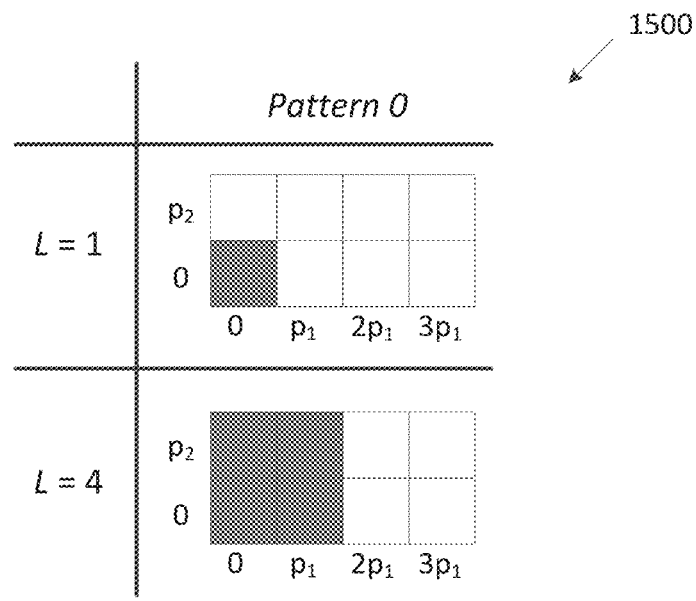
FIG. 15 illustrates yet another example fixed beam patterns according to embodiments of the present disclosure.

FIG. 15 illustrates yet another example fixed beam patterns 1500 according to embodiments of the present disclosure. An embodiment of the fixed beam patterns 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In sub-embodiment 2, only two L values, L=1 and L=4, are supported for fixed beam patterns, and for both L values, only one beam pattern is supported. An example of beam patterns in this case is shown in FIG. 15.

Figure 16:
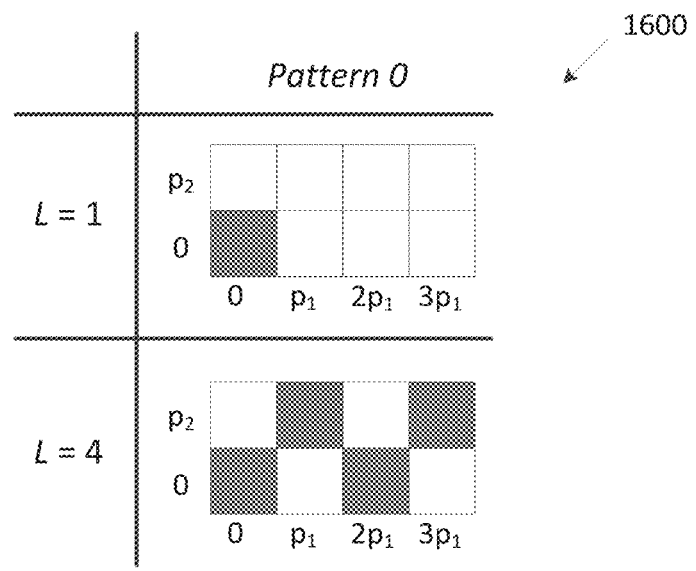
FIG. 16 illustrates yet another example fixed beam patterns according to embodiments of the present disclosure.

FIG. 16 illustrates yet another example fixed beam patterns 1600 according to embodiments of the present disclosure. An embodiment of the fixed beam patterns 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

In sub-embodiment 3, only two L values, L=1 and L=4, are supported for fixed beam patterns, and for both L values, only one beam pattern is supported. An example of beam patterns in this case is shown in FIG. 16.

Figure 17:
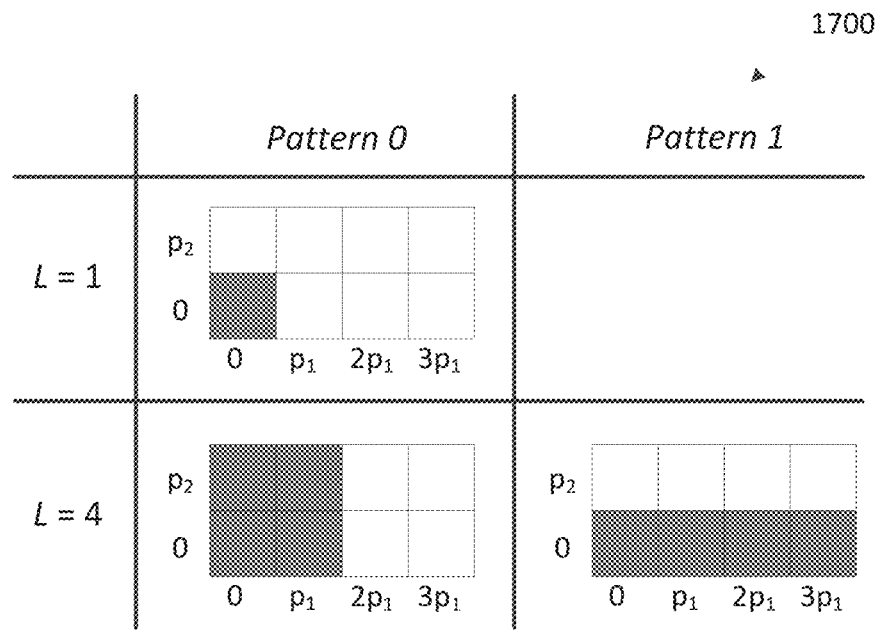
FIG. 17 illustrates yet another example fixed beam patterns according to embodiments of the present disclosure.

FIG. 17 illustrates yet another example fixed beam patterns 1700 according to embodiments of the present disclosure. An embodiment of the fixed beam patterns 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

In sub-embodiment 4, only two L values, L=1 and L=4, are supported for fixed beam patterns, and for L=4, two beam patterns are supported. An example of beam patterns in this case is shown FIG. 17. For L=4, either both patterns are supported for all antenna port layouts, i.e., the supported $(N_1, N_2)$ values. Alternatively, Pattern 0 is supported only for 2D antenna port layouts $(N_1, N_2>1)$, and Pattern 1 is supported only to 1D antenna port layouts $((N_1>1, N_2=1)$.

Figure 18:
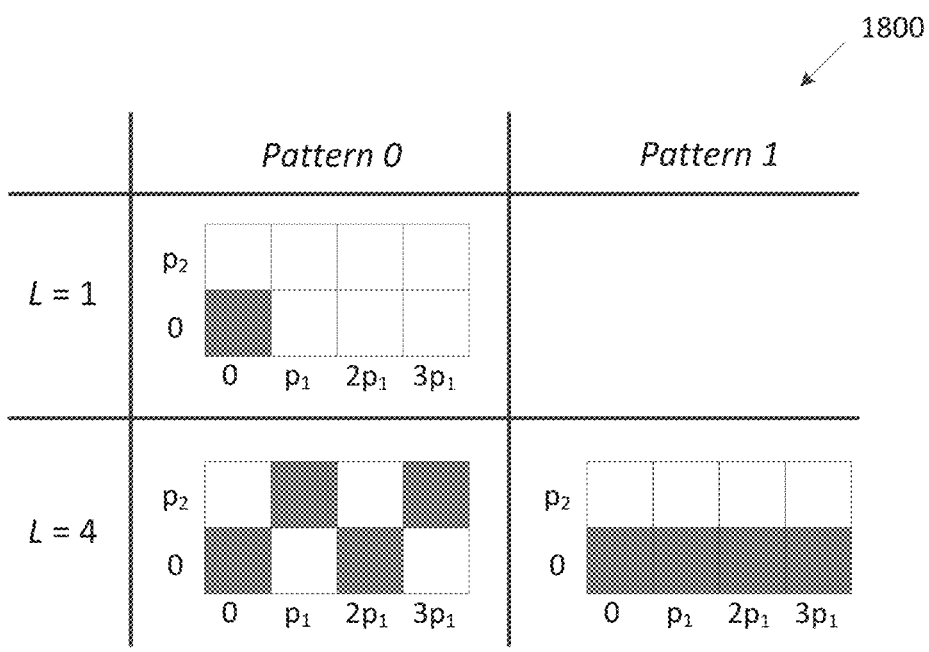
FIG. 18 illustrates yet another example fixed beam patterns according to embodiments of the present disclosure.

FIG. 18 illustrates yet another example fixed beam patterns 1800 according to embodiments of the present disclosure. An embodiment of the fixed beam patterns 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

In sub-embodiment 5, only two L values, L=1 and L=4, are supported for fixed beam patterns, and for L=4, two beam patterns are supported. An example of beam patterns in this case is shown in FIG. 18. For L=4, either both patterns are supported for all antenna port layouts, i.e., the supported $(N_1, N_2)$ values. Alternatively, Pattern 0 is supported only for 2D antenna port layouts $(N_1, N_2>1)$, and Pattern 1 is supported only to 1D antenna port layouts (($N_1>1$, $N_2=1$). In one alternative, beam selection based on fixed beam selection patterns (for any of the above sub-embodiments) is used for Type I CSI only. In another alternative, it is used for both Type I and II CSIs. In yet another alternative, it is configurable to either of the two CSI Types via higher layer signaling such as RRC or MAC CE.

A few alternatives of fixed beam patterns for higher rank are as follows. In one example of Alt 4-0, for rank>1, orthogonal fixed beam patterns are considered in which the leading beams of the fixed beam patterns are located at orthogonal positions such as (0, 0), ($O_1$, 0), (0, $O_2$), ($O_1$, $O_2$), and so on.

Figure 19:
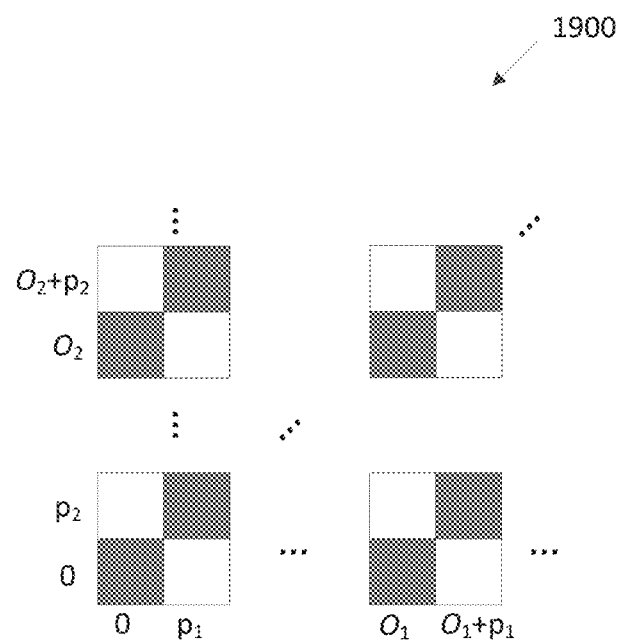
FIG. 19 illustrates an example orthogonal fixed beam patterns according to embodiments of the present disclosure.

FIG. 19 illustrates an example orthogonal fixed beam patterns 1900 according to embodiments of the present disclosure. An embodiment of the fixed beam patterns 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

An illustration of orthogonal fixed beam patterns is shown in FIG. 19. For a given rank r>1, the fixed beam patterns located at orthogonal positions are the same and beams for layers 0, 1, ..., r−1 are selected from different orthogonal fixed beam patterns. For example, layer 0 beam is selected from the fixed beam pattern located at (0, 0), layer 1 beam is selected from the fixed beam pattern located at ($O_1$, 0), and so on. For two different ranks $r_1 \neq r_2 > 1$, the fixed beam patterns are according to one of the two alternatives. In one alternative, the fixed beam patterns for both ranks are the same. In another alternative, the fixed beam patterns for both ranks are different.

In one example of Alt 4-1, similar to LTE Class A codebook for higher ranks, the nested property between two ranks is considered. For instance, the fixed beam pattern(s) for rank 1-2 are the same, that for rank 3-4 are the same, that for rank 5-6 are the same, and so on. In one example of Alt 4-2, the fixed beam patterns are only for up to a fixed rank, for example, for up to rank 4. For rank>4, the fixed beam pattern corresponds to a single beam (L=1). In one example of Alt 4-3, the number of beams in the fixed beam patters, i.e., the L value, decreases with increasing rank. For example, for rank 1-2, the number of beams is four (L=4), for rank 3-4, the number of beams is two (L=2), and for rank 5-8, the number of beam is one (L=1).

In one embodiment 5, in another alternative of beam selection in $W_1$ codebook, L beam selection is unrestricted, and hence L beams are selected freely. Three sub-alternatives of unrestricted (free) beam selection are as follows. In one alternative of Alt 5-0, any L beams can be selected, and power levels for L beams are selected freely. In one alternative of Alt 5-1, beam (0, 0) is selected, remaining L−1 beams are selected freely from remaining $L_1 L_2 - 1$ beams, and power levels for L beams are selected freely. In one alternative of Alt 5-2, beam (0, 0) is selected, remaining L−1 beams are selected freely from remaining $L_1 L_2 - 1$ beams, Beam (0,0) has the strongest power level, and power levels for L−1 beams are selected freely.

In an alternative, the unrestricted (free) beam selection is used for Type II CSI only. In another alternative, it is used for both Type I and II CSIs. In yet another alternative, it is configurable to either of the two CSI Types via higher layer signaling such as RRC or MAC CE.

Let $$B_I = \begin{bmatrix} W_I & 0 \\ 0 & W_I \end{bmatrix}$$

be the $W_1$ beam group after beam selection, where I={($i_l$, $j_l$): l=0,1, ..., L−1} is the index set of L selected beams, $i_l \in \{0, 1, \ldots, L_1 - 1\}$ and $j_l \in \{0, 1, \ldots, L_2 - 1\}$.

In one embodiment 5, the $W_2$ codebook for Type I CSI (i.e. beam selection based CSI) is as follows. In Rank 1, it performs a single beam selection from the selected L beams, and a co-phase selection from the co-phase alphabet such as $\{1, j, -1, -j\}$. The resultant rank-1 pre-coder is given by $$p = \frac{B_I c}{\|B_I c\|},$$

where $c = [e_k \; \phi_n e_k]^T$, $e_k$ is the beam selection vector whose k-th entry is 1 and rest of the entries are zero, and $\phi_n$ is the co-phase value. In Rank 2, it selects a pair of beams from the selected L beams, and a co-phase pair selection from the co-phase alphabet such as $\{1, j, -1, -j\}$. The resultant rank-2 pre-coder is given by $$[p_0, p_1] = \frac{1}{\sqrt{2}} \left[ \frac{B_I c_0}{\|B_I c_0\|} \quad \frac{B_I c_1}{\|B_I c_2\|} \right],$$

where $c_0 = [e_{k_0} \; \phi_{n_0} e_{k_0}]^T$ and $c_1 = [e_{k_1} \; \phi_{n_1} e_{k_1}]^T$. In Rank r, the resultant rank-r pre-coder is given by $$[p_0, \ldots, p_{r-1}] = \frac{1}{\sqrt{r}} \left[ \frac{B_I c_0}{\|B_I c_0\|} \quad \cdots \quad \frac{B_I c_{r-1}}{\|B_I c_{r-1}\|} \right].$$

In one embodiment 6, the $W_2$ codebook is used to quantize precoders as Type II CSI (i.e. beam combination based CSI). The linear combination based quantization of precoder is given by $$p = \frac{B_I c}{\|B_I c\|},$$

where $c = [1 \; c_1 \ldots c_{L-1} \; c_L \; c_{L+1} \ldots c_{2L-1}]^T$, and $c_i$ is a complex coefficient for i-th beam in basis $B_I$. To report rank r CSI, r dominant precoders are reported independently using linear combination of L beams. In one alternative, for r layers, r PMIs are reported. Alternatively, a single PMI is reported for all r layers. The quantized precoder can be an estimate of channel eigenvector or any general beamforming vector.

In one embodiment 7, the same $W_2$ codebook is used to quantize a matrix, a $2N_1 N_2 \times 2N_1 N_2$ matrix, as Type II CSI, where the linear combination based quantization is given by $P = B_I C B_I^H$, where C is a $2L \times 2L$ Hermitian matrix. The matrix is therefore Hermitian and non-negative definite. An example is an estimate of channel covariance matrix $E(H^H H)$.

If both precoder and matrix quantization are supported, then the UE receives configuration information about one of the two quantization types via higher-layer signaling such as RRC and MAC CE. Alternatively, the UE receives a more dynamic configuration in a DL-related or an UL-related DCI. In yet another alternative, the UE reports the quantization type (precoder vs. matrix, or eigenvectors vs. channel covariance) to the gNB/network as part of the CSI.

For quantization of linear combination coefficients, c, the amplitude and phase of each complex coefficient is quantized separately using respective codebooks. So, $W_2$ can have two separate components, e.g., $W_2=W_{21}W_{22}$, $W_{21}$ for amplitude quantization and $W_{22}$ for phase quantization or vice-versa. Alternatively, $W_2$ is a single joint codebook for scalar quantization of both amplitude and phase.

The CSI report includes a PMI derived using a full set of pre-coders (for pre-coder or matrix quantization) in codebook. This is an example of CSI reporting in which the CSI is reported in a single CSI reporting instance. Alternatively, the CSI report includes a PMI derived using a strict subset of pre-coders (for pre-coder or matrix quantization) in codebook. This is an example of CSI reporting in which the differential CSI (defined later in the present disclosure) is reported in multiple CSI reporting instances, where the differential CSI report is derived using a strict subset of pre-coders, and the strict subsets of pre-coders may be the same or may be different in multiple CSI reporting instances.

In either alternative, the CSI report is according to at least one of the following alternatives: PMI only, or PMI and RI, or PMI/RI/CQI.

TABLE 3

W2 payload for Type II CSI: 8PSK coefficients

| Number of beams (L) | Rank 1 (number of bits) | Rank 2 (number of bits) | Rank r (number of bits) |
|---|---|---|---|
| 2 | 9 | 9 × 2 = 18 | 9 × r |
| 3 | 15 | 15 × 2 = 30 | 15 × r |
| 4 | 21 | 21 × 2 = 42 | 21 × r |
| 8 | 45 | 45 × 2 = 90 | 45 × r |

TABLE 4

W2 payload for Type II CSI: L = 4 beams

| $2^K$-PSK for coefficients, K | Rank 1 (number of bits) | Rank 2 (number of bits) | Rank r (number of bits) |
|---|---|---|---|
| 1 (BPSK) | 7 | 7 × 2 = 14 | 7 × r |
| 2 (QPSK) | 14 | 14 × 2 = 28 | 14 × r |
| 3 (8PSK) | 21 | 21 × 2 = 42 | 21 × r |
| 4 (16PSK) | 28 | 28 × 2 = 56 | 28 × r |

For layer-by-layer (independent) reporting of Type II CSI, assuming $2^K$-PSK alphabet for phase quantization of the LC coefficients, the number of bits (for coefficients) to report rank r $W_2$ is $(2L-1)*K*r$. A summary of $W_2$ payload bits for a fixed 8PSK phase quantization codebook and varying number of beams (L values) and rank r is shown in TABLE 3. Similarly, another summary for a fixed L=4 beams and varying phase quantization codebook (K values) and rank r is shown in TABLE 4. It can be observed the $W_2$ reporting payload increases significantly for higher layer (e.g. rank 2) Type II CSI reporting as the number of beams increases (e.g. L=8) or resolution of the phase quantization codebook increases (e.g. K=4). Such significant increase in $W_2$ payload may not be supported even in future communication systems such as 5G NR. It is therefore desired to reduce the $W_2$ payload for Type II CSI reporting, but keep the CSI resolution still high (which is the main motivation of Type II CSI).

In one embodiment 8, the $W_2$ payload can be reduced by breaking it into T>1 CSI reporting instances. One way to break $W_2$ payload is based on differential CSI reporting in which a base or coarse Type II CSI is reported in the $1^{st}$ CSI reporting instance (t=0), and refinements are reported in later CSI reporting instances (t=1, 2, . . . , T−1), where refinements correspond to the differential Type II CSI which, for example, corresponds to the difference between the un-quantized Type II CSI and quantized Type II CSI reported in earlier CSI reporting instances: Differential Type II CSI(t)<u>def</u>Unquantied Type II CSI−Quantized Type II CSI(t−1), where Quantized Type II CSI(−1)=0.

As explained above, the differential CSI (both coarse and refinements) are derived using a strict subset of pre-coders (for pre-coder or matrix quantization) in codebook. For this, the codebook W can be decomposed into multiple parts, where each part comprises of different values of L or/and different alphabet subsets/$W_2$. For simplicity, it can be assumed that the codebook W can be decomposed into T parts, $W^{(0)}$, $W^{(1)}$, . . . , $W^{(T-1)}$, one for each of T CSI reporting instances. Each of codebooks $W^{(0)}$, $W^{(1)}$, . . . , $W^{(T-1)}$ has a "label" (indicator) associated with it.

The signaling alternatives for the codebook labels associated with T CSI reports are as follows. In one example, the codebook labels are signaled as a part of A-CSI trigger in DCI. In another example, the codebook labels are reported by the UE as part of the CSI either in each CSI report or together in one CSI report (e.g. the CSI report at t=0). In yet another example, the codebook labels are configured or predetermined sequence via higher-layer signaling such as RRC or MAC CE.

In addition, the signaling of the T CSI reporting instances in terms of sub-frames or slot indices or frame indices are according to at least one of the following alternatives. In one example, the CSI reporting instances are signaled as a part of A-CSI trigger in DCI. In another example, the CSI reporting instances are configured or predetermined sequence via higher-layer signaling such as RRC or MAC CE.

In one alternative, the gNB derives the pre-coder by performing joint decoding of the current and previous CSI reports (e.g. using the above differential formula). In another alternative, it decodes each report separately.

The number of CSI reporting instances T can be the same for all ranks. Alternatively, it can be different for different ranks, i.e., T can more for a higher rank CSI because its $W_2$ overhead is larger when compared with a lower rank CSI. For example, T for rank r can be r times more than T for rank 1. The T CSI reports may be independent in the sense that each of them corresponds to a coarser resolution Type II CSI, and all of them together constitute a higher resolution Type II CSI. For example, each of T CSI reports corresponds to $2^{K_1}$-PSK phase quantitation, and their aggregate corresponds to $2^{K_2}$-PSK phase quantitation, where $K_1<K_2$. In another example, each of T CSI reports corresponds to $L^{(1)}$ beams, and their aggregate corresponds to $L^{(2)}$ beams, where $L^{(1)}<L^{(2)}$. Alternatively, the T CSI reports may be dependent. For example, the CSI reported in later CSI reporting instances depends on the CSI reported in earlier CSI reporting instances.

A few schemes for differential CSI reporting are provided next. In one embodiment of scheme 0, the differential CSI is considered in the number of beams (L) of CSI reporting. In particular, the CSI corresponding to a subset of L beams, ($L_t<L$ beams), are reported in the t-th CSI reporting instances, where $\Sigma_{t=0}^{T-1}L_t \geq L$, according to the following steps. In step 0, L beams are selected using the $W_1$ codebook. For t-th CSI reporting instance, in step 1, $L_t$ beams are selected from the selected L beams, in step 2, The CSI is reported for the selected $L_t$ beams, and in step 3, the relative CSI such as amplitude or/and phase w.r.t. to a reference CSI such as CSI reported in t=0 CSI reporting instance is also reported.

The beam selection ($L_t$ values) in Step 1 may either be fixed (hence not reported) or dynamically reported. When reported, $L_t$ values for all T CSI reporting instances can be determined and reported in Step 0 or the t=0 CSI reporting instance. Alternatively, they are determined and reported in their respective CSI reporting instances.

Figure 20:
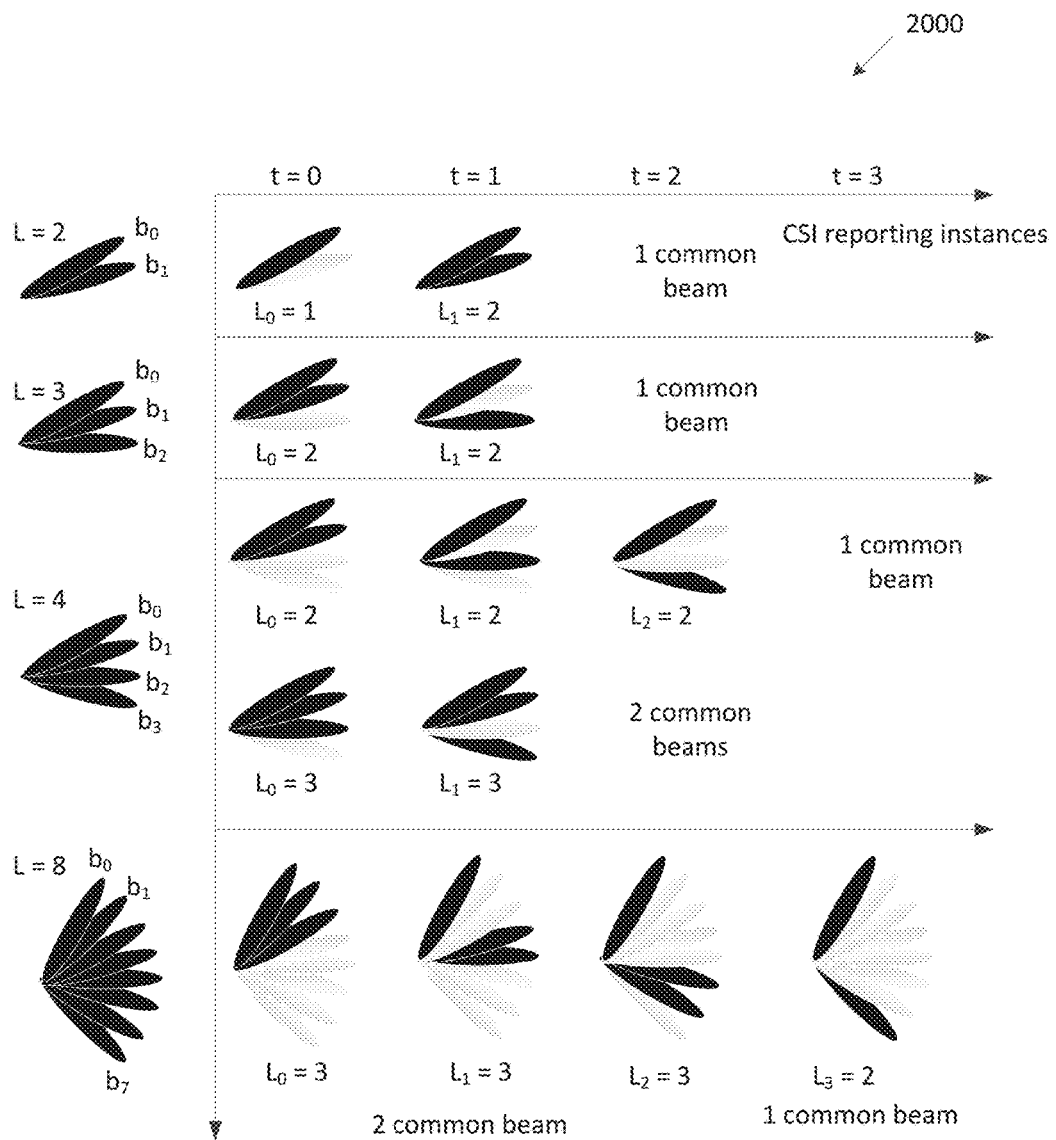
FIG. 20 illustrates an example subsets of beams for differential CSI reporting according to embodiments of the present disclosure.

FIG. 20 illustrates an example beam changes 2000 according to embodiments of the present disclosure. An embodiment of the beam changes 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

In one example 0 of scheme 0, at least one beam can be common in two consecutive CSI reporting instances, which implies that $\Sigma_{t=0}^{T-1} L_t > L$. The common beam(s) may or may not change between T CSI reporting instances. When the common beam(s) does not change, then they may correspond to the beams with larger power levels. A few examples are illustrated in FIG. 20, in which the common beam(s) does not change between CSI reporting instances. The details of these examples are as follows. In one example of L=2 beams, $L_0$=1 beam ($b_0$) and $L_1$=2 beams ($b_0$ and $b_1$) are reported in CSI reporting instances t=0 and t=1, respectively, where beam $b_0$ is common in two CSI reporting instances. In another example of L=3 beams, $L_0$=2 beams ($b_0$ and $b_1$) and $L_1$=2 beams ($b_0$ and $b_2$) are reported in CSI reporting instances t=0 and t=1, respectively, where beam $b_0$ is common in two CSI reporting instances. In yet another example of L=4 beams, $L_0$=2 beams ($b_0$ and $b_1$), $L_1$=2 beams ($b_0$ and $b_2$), and $L_2$=2 beams ($b_0$ and $b_3$) are reported in CSI reporting instances t=0, t=1, and t=2, respectively, where beams $b_0$ is common in three CSI reporting instances. In yet another example of L=4 beams, $L_0$=3 beams ($b_0$, $b_1$, and $b_2$) and $L_1$=3 beams ($b_0$, $b_1$, and $b_3$) are reported in CSI reporting instances t=0 and t=1, respectively, where beams $b_0$ and $b_1$ are common in two CSI reporting instances. In yet another example of L=8 beams, $L_0$=3 beams ($b_0$, $b_1$, and $b_2$), $L_1$=3 beams ($b_0$, $b_3$, and $b_4$), $L_2$=3 beams ($b_0$, $b_5$, and $b_6$), and $L_3$=2 beams ($b_0$, $b_7$) are reported in CSI reporting instances t=0, t=1, t=2, and t=1, respectively, where beam $b_0$ is common in four CSI reporting instances.

The examples in which the common beam(s) changes between CSI reporting instances can be constructed similarly.

Figure 21:
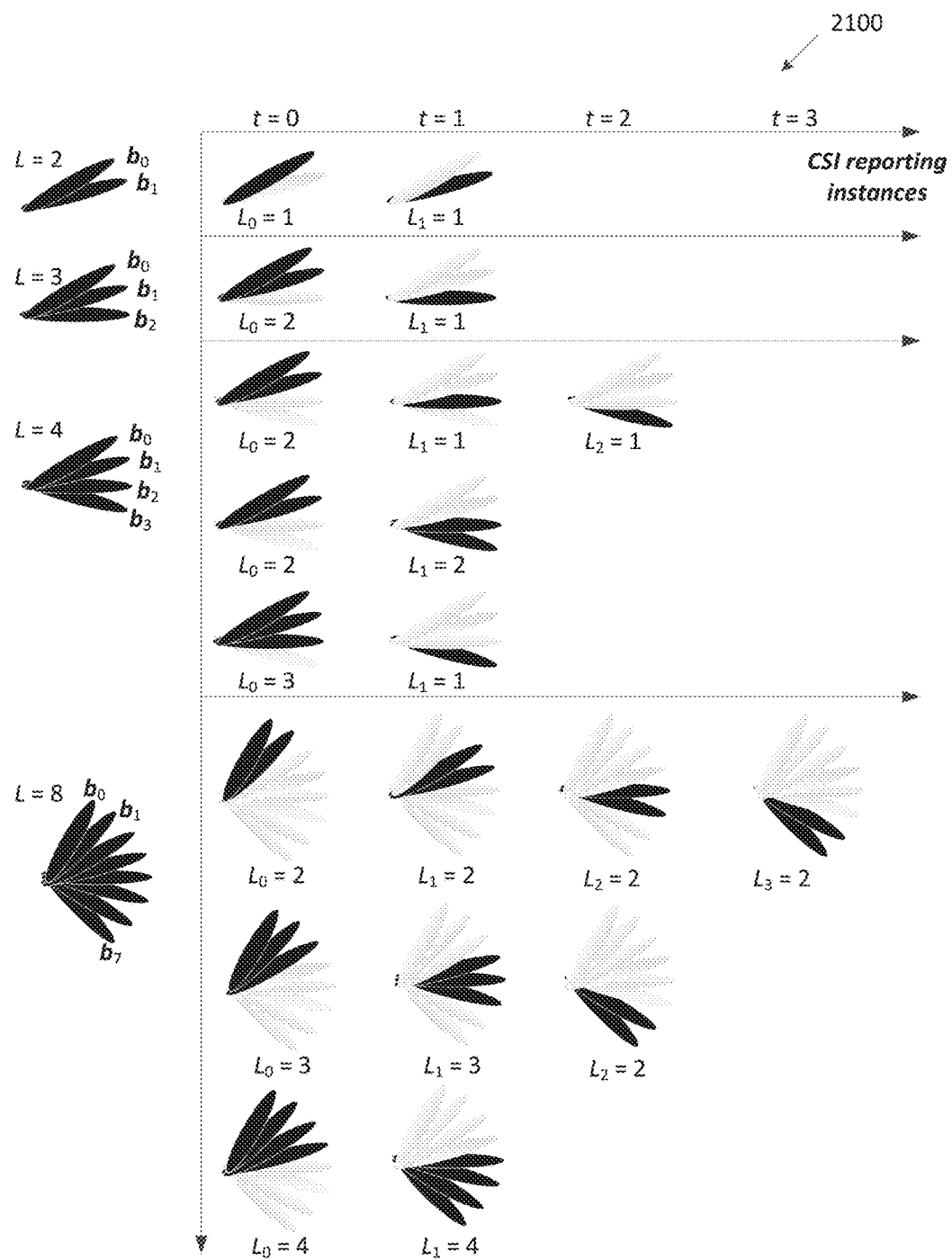
FIG. 21 illustrates another example subsets of beams for differential CSI reporting according to embodiments of the present disclosure.

FIG. 21 illustrates another example beam changes 2100 according to embodiments of the present disclosure. An embodiment of the beam changes 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

In one example 1 of scheme 0, there are no common beams in any CSI reporting instances, which implies that $\Sigma_{t=0}^{T-1} L_t = L$. A few examples are illustrated in FIG. 21. The details of these examples are as follows. In one example of L=2 beams, $L_0$=1 beam ($b_0$) and $L_1$=1 beam ($b_1$) are reported in CSI reporting instances t=0 and t=1, respectively. In another example of L=3 beams, $L_0$=2 beams ($b_0$ and $b_1$) and $L_1$=1 beam ($b_2$) are reported in CSI reporting instances t=0 and t=1, respectively. In yet another example of L=4 beams, $L_0$=2 beams ($b_0$ and $b_1$), $L_1$=1 beam ($b_2$) and $L_2$=1 beam ($b_3$) are reported in CSI reporting instances t=0, t=1, and t=2 respectively. In yet another example of L=4 beams, $L_0$=2 beams ($b_0$ and $b_1$), $L_1$=2 beams ($b_2$ and $b_3$) are reported in CSI reporting instances t=0 and t=1 respectively. In yet another example of L=4 beams, $L_0$=3 beams ($b_0$, $b_1$, and $b_2$), $L_1$=1 beam ($b_3$) are reported in CSI reporting instances t=0 and t=1 respectively. In yet another example of L=8 beams, $L_0$=2 beams ($b_0$ and $b_1$), $L_1$=2 beams ($b_2$ and $b_3$), $L_2$=2 beams ($b_4$ and $b_5$), and $L_3$=2 beams ($b_6$ and $b_7$) are reported in CSI reporting instances t=0, t=1, t=2, and t=3 respectively. In yet another example of L=8 beams: $L_0$=3 beams ($b_0$, $b_1$, and $b_2$), $L_1$=3 beams ($b_3$, $b_4$, and $b_5$) and $L_2$=2 beams ($b_6$ and $b_7$) are reported in CSI reporting instances t=0, t=1, and t=2 respectively. In yet another example of L=8 beams, $L_0$=4 beams ($b_0$, $b_1$, $b_2$, and $b_3$), $L_1$=4 beam ($b_4$, $b_5$, $b_6$, and $b_7$) are reported in CSI reporting instances t=0 and t=1 respectively.

Figure 22:
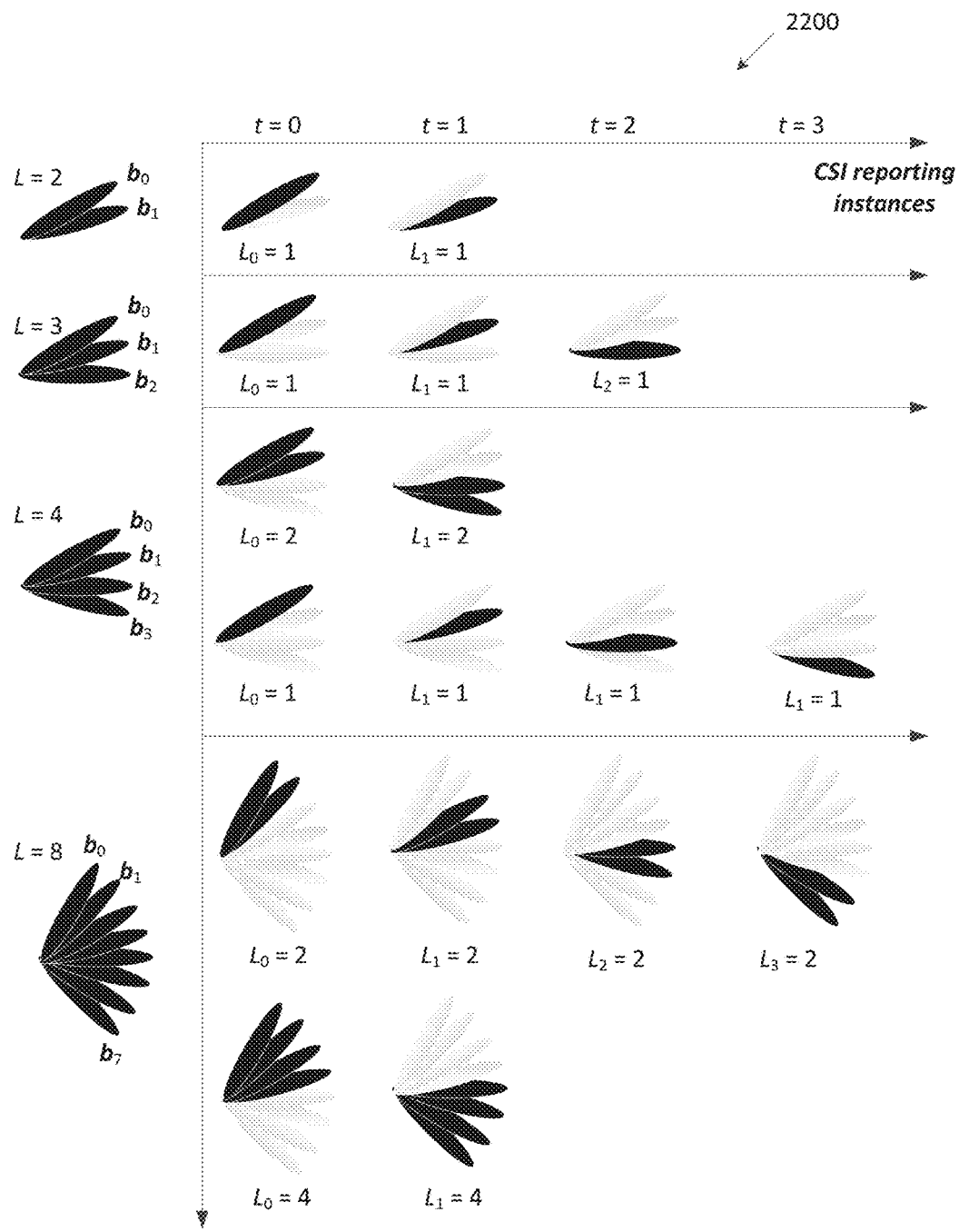
FIG. 22 illustrates yet another example subsets of beams for differential CSI reporting according to embodiments of the present disclosure.

FIG. 22 illustrates yet another example beam changes 2200 according to embodiments of the present disclosure. An embodiment of the beam changes 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

In one example 2 of scheme 0, the same number of beams are reported in different CSI reporting instances, which implies that L is an integer multiple of $L_t$. In this example, the CSI reporting overhead is the same in each CSI reporting instance. Note that beam(s) may or may not be common in two CSI reporting instances. A few examples are illustrated in FIG. 22.

In one example 3 of scheme 0, a different number of beams is reported in different CSI reporting instances. Examples can be constructed similar to previous examples.

In one example 4 of Scheme 0, combination(s) of Example 0-Example 3 can be considered to report different CSI according to Scheme 0.

In one example of scheme 1, the differential CSI is considered in the $W_2$ codebook for the Type II CSI reporting for a given number of beams (L). In particular, the differential CSI using a $W_2^{(t)}$ codebook is reported in the t-th CSI reporting instances, where $W_2^{(0)}$, $W_2^{(1)}$, ..., $W_2^{(T-1)}$, constitute the overall $W_2$ codebook.

If the $W_2$ codebook quantizes amplitude and phase of coefficients separately using corresponding scalar codebooks, then the differential CSI is considered in at least one of them, and if considered in both of them, then it can be considered separately or jointly. In case of separate differential for amplitude and phase, the number of CSI reporting instances for the two may be different. For explanation, it may consider separate differential for amplitude and phase in the present disclosure. The extension to joint differential is straightforward for the skilled in the art.

Let $K_t$ be the number of bits for phase quantization in t-th CSI reporting instance. For the first CSI reporting instance, i.e., t=0, the phase quantization codebook is given by:

$$\Phi_0 = \left\{ e^{j\theta_n}, \text{ where } n = 0, 1, \ldots, 2^{K_0} - 1, \text{ and } \theta_n = \frac{2\pi n}{2^{K_0}} \right\}.$$

For the next T−2 CSI reporting instances, i.e., t=1, . . . , T−2, the phase quantization codebook is given by:

$$\Phi_t = \left\{ e^{j\theta_n}, \right.$$
$$\text{where } n \in \{-2^{K_t} + 1, -2^{K_t} + 3, \ldots, -1, 1, 2^{K_t} - 3, 2^{K_t} - 1\} \text{ and } \theta_n =$$
$$\left. \frac{\alpha_t n}{2^{K_t}} \right\},$$
$$\text{where } \alpha_t = \frac{2\pi}{2\sum_{i=0}^{t-1} K_i}.$$

For the last CSI reporting instance, i.e., t=T−1, the phase quantization codebook is according to one of the following alternatives. In one example Alt 0, $\Phi_{T-1} = \{e^{j\theta_n}, \text{ where } n \in \{-2^{K_r-1}+1, \ldots, -1,0,1,2, \ldots, 2^{K_r-1}\}$ and $$\theta_n = \frac{\alpha_t n}{2^{K_t}} \},$$

requires $K_t$ bits to report CSI in the last reporting instance. In one example of Alt 1, $\Phi_{T-1} = \{e^{j\theta_n}, \text{ where } n \in \{-2^{K_r-1}, \ldots, 1,0,1,2, \ldots, 2^{K_r-1}-1\}$ and $$\theta_n = \frac{\alpha_t n}{2^{K_t}} \},$$

requires $K_t$ bits to report CSI in the last reporting instance. In one example of Alt 2, $\Phi_{T-1} = \{e^{j\theta_n}, \text{ where } n \in \{-2^{K_r-1}+1, \ldots, -1,0,1,2, \ldots, 2^{K_r-1}-1\}$ and $$\theta_n = \frac{\alpha_t n}{2^{K_t}} \},$$

requires $K_t+1$ bits to report CSI in the last reporting instance.

The overall phase after the t-th CSI reporting instance is given by: $\phi = \phi_0 \times \phi_1 \times \ldots \times \phi_t$, where $\phi_t$ corresponds to the phase reported from codebook $\Phi_t$ in the t-th CSI reporting instance.

Figure 23:
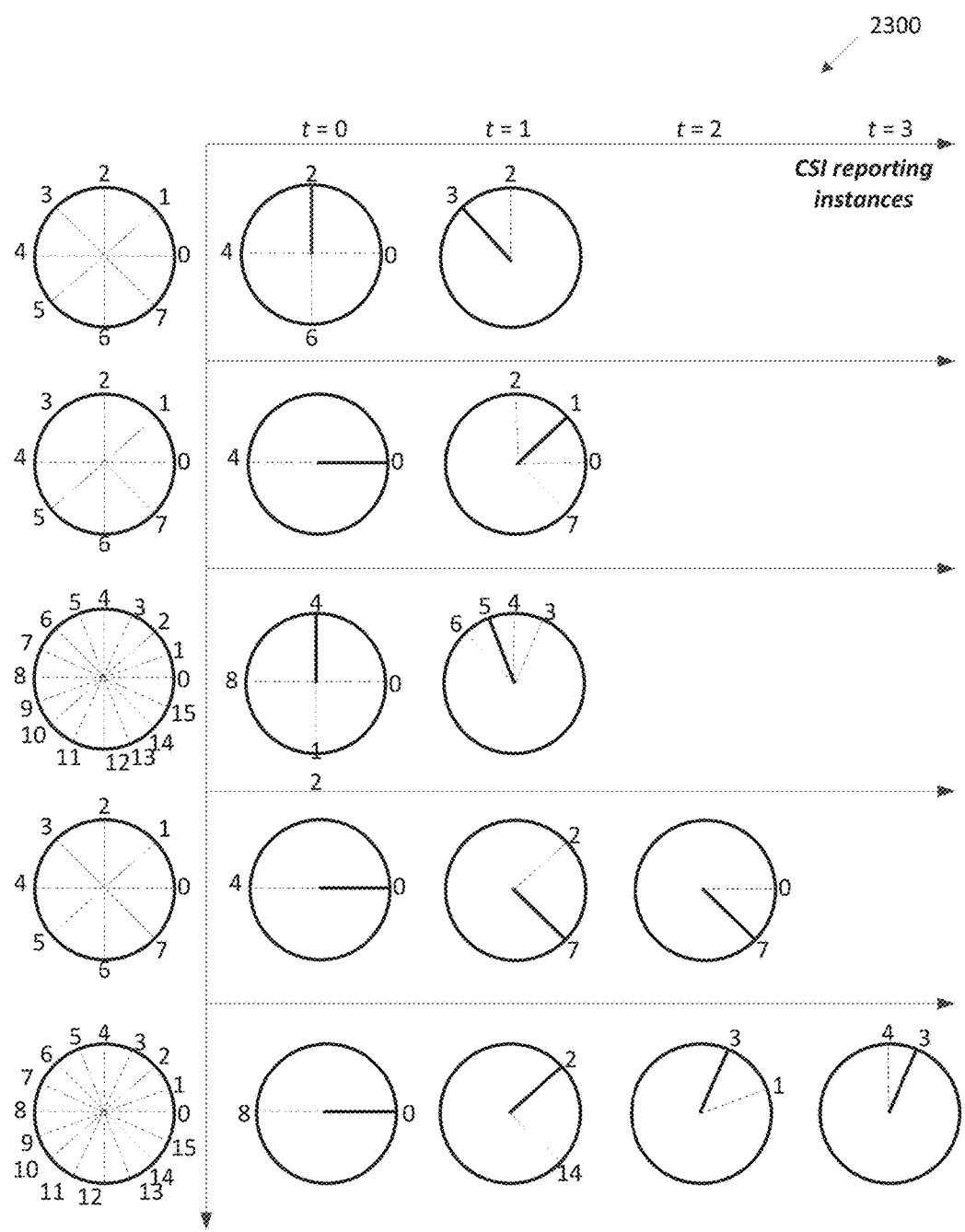
FIG. 23 illustrates an example differential phase reporting according to embodiments of the present disclosure.

FIG. 23 illustrates an example differential phase reporting 2300 according to embodiments of the present disclosure. An embodiment of the differential phase reporting 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

A few examples of differential phase reporting are shown in FIG. 23 (assuming Alt 0 of last CSI reporting). The details of these examples are as follows. In one example of T=2 reporting instances: $W_2^{(0)}$ and $W_2^{(1)}$ correspond to $K_0=2$ and $K_1=1$ phase codebooks, which results in overall (K=3) 8PSK phase quantization after 2 CSI reporting instances; $W_2^{(0)}$ and $W_2^{(1)}$ correspond to $K_0=1$ and $K_1=2$ phase codebooks, which results in overall (K=3) 8PSK phase quantization after 2 CSI reporting instances; and $W_2^{(0)}$ and $W_2^{(1)}$ correspond to $K_0=2$ and $K_1=2$ phase codebooks, which results in overall (K=4) 16PSK phase quantization after 2 CSI reporting instances.

In one example of T=3 reporting instances, $W_2^{(0)}$, $W_2^{(1)}$, and $W_2^{(2)}$ correspond to $K_0=K_1=K_2=1$ phase codebooks, which results in overall (K=3) 8PSK phase quantization after 3 CSI reporting instances.

In one example of T=4 reporting instances, $W_2^{(0)}$, $W_2^{(1)}$, $W_2^{(2)}$, and $W_2^{(3)}$ correspond $K_0=K_1=K_2=K_3=1$ phase codebooks, which results in overall (K=4) 16PSK phase quantization after 4 CSI reporting instances.

The amplitude of each coefficient can also be reported differentially in multiple CSI reporting instances. The number of bits (A) for amplitude quantization can be divided equally in T CSI reporting instances, i.e. A/T bits are used to report differential amplitude in each amplitude reporting. Alternatively, A bits can be divided unequally in T CSI reporting instances.

If each of 2L−1 coefficients are quantized separately (i.e. scalar quantization), then the number of bits to report each one of them may not be the same. In other words, some coefficients may be quantized using larger number of $W_2$ bits than other coefficients. For example, the phase quantization of some coefficients may be based on 16PSK alphabet, and that for the remaining coefficients may be based on 8PSK alphabet.

In one example of scheme 2, a combination of scheme 0 and scheme 1 can be considered. In other words, the differential CSI is considered in both in number of beams (CSIs of subsets of L beams are reported in multiple CSI reporting instances) and in $W_2$ codebook (phase or/and amplitude of coefficients are reported in multiple CSI reporting instances).

In one embodiment 9, in addition to the differential CSI according to some embodiments of the present disclosure, the CSI may have components with different granularities in frequency domain, for example, the CSI may have both WB (or partial band) and SB components. In such cases, the WB component of the CSI may only be reported in the t=0 CSI reporting instance in case of differential CSI reporting. Alternatively, it is reported in all of the T CSI reporting instances.

In one alternative, the differential CSI is enabled for Type II CSI, and hence does not require additional configuration. In another alternative, the differential CSI is higher layer configured, e.g., via RRC or MAC CE based signaling. In yet another alternative, the differential CSI is configured only when the CSI reporting payload in a single CSI reporting instance is larger than a threshold, where the threshold may depend on factors such as gNB CSI processing complexity, UE complexity in CSI derivation, UL CSI reporting BW, and other network related factors. In yet another alternative, the differential CSI is configured only for rank>r, for example r=1 or 2.

When configured, the number of CSI reporting instances (T) can be fixed. Alternatively, T is also configured. In this latter case, a single T value for all ranks or different T values for some or all ranks can be configured.

In one embodiment 10, the UE is configured with a PMI codebook (via higher layer RRC signaling) for CSI reporting for P=$2N_1N_2$ CSI-RS antenna ports as follows. In one example of P=2 antenna ports, the PMI codebook is given by:

$$W \in \left\{ \frac{1}{\sqrt{2}} \begin{bmatrix} 1 \\ e^{j\frac{\pi n}{2}} \end{bmatrix} \right\},$$

n=0,1,2,3} for 1 layer CSI reporting; and $$\left\{ \frac{1}{2} \begin{bmatrix} 1 & 1 \\ j^n & -j^n \end{bmatrix} \right\},$$

n=0,1} for 1 layer CSI reporting. In one example of P≥4 antenna ports, the PMI codebook assumes $W=W_1W_2$ precoder structure for rank 1 to 8 (1 layer to 8 layers), where $$W_1 = \begin{bmatrix} B & 0 \\ 0 & B \end{bmatrix},$$

B is composed to L oversampled 2D DFT beams. In such example, the value of L is configurable: $L \in \{1,4\}$ via higher layer RRC signaling. In such example, $W_2$ performs beam selection (only for L=4) and co-phasing between two polarizations.

In one example of L=4, only one beam group (B) pattern is supported for each antenna port layouts. Two examples are shown in FIG. 24 and FIG. 25.

Figure 24:
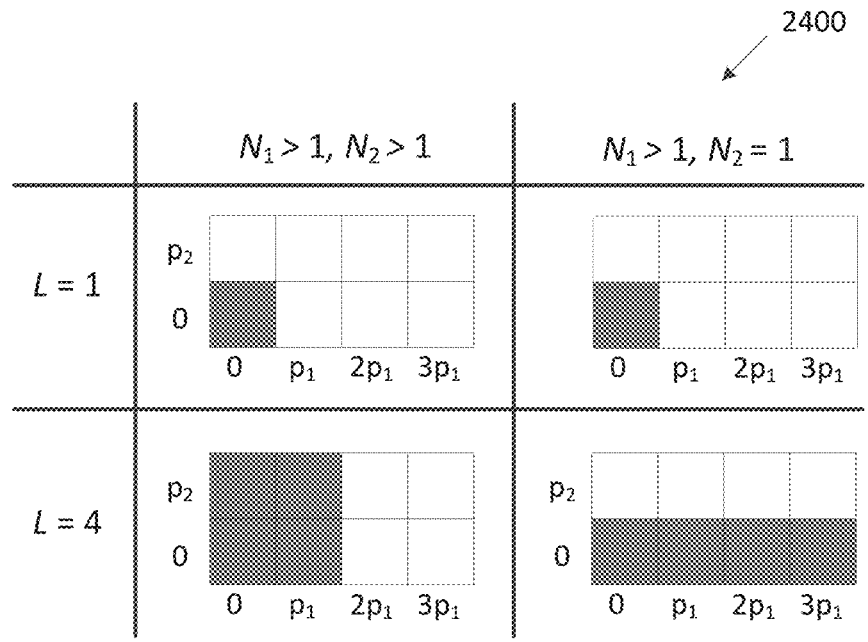
FIG. 24 illustrates an example beam group patterns according to embodiments of the present disclosure.

FIG. 24 illustrates an example beam group patterns 2400 according to embodiments of the present disclosure. An embodiment of the beam group patterns 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

Figure 25:
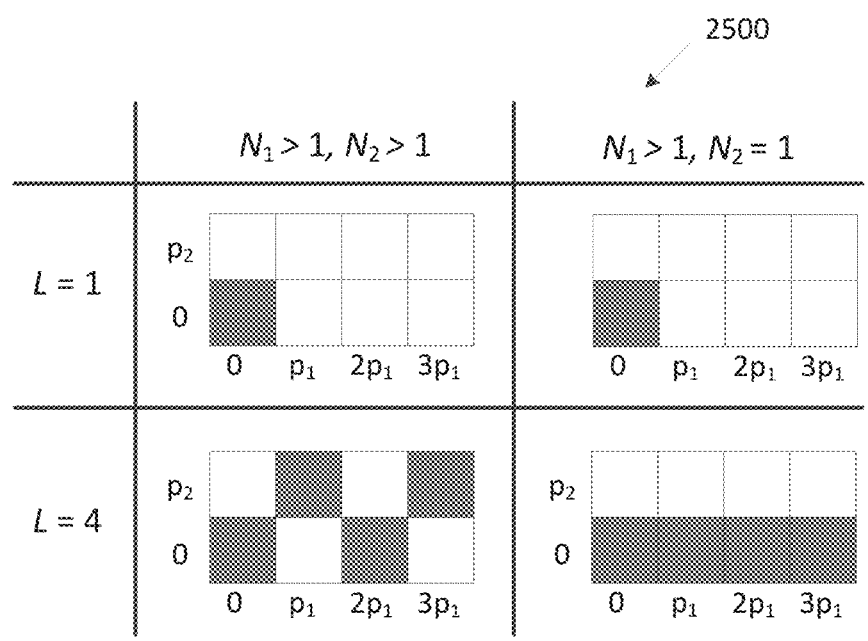
FIG. 25 illustrates another example beam group patterns according to embodiments of the present disclosure.

FIG. 25 illustrates another example beam group patterns 2500 according to embodiments of the present disclosure. An embodiment of the beam group patterns 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

The supported combinations of ($N_1$, $N_2$, $O_1$, $O_2$) are tabulated in TABLE 5. The UE is configured with higher-layer parameters codebook-Config-N1, and codebook-Config-N2, to configure the codebook parameters $N_1$ and $N_2$, respectively. Note that there is no need to signal (configure) ($O_1$,$O_2$) since only one ($O_1$,$O_2$) is supported for each ($N_1$, $N_2$).

TABLE 5

| Number of CSI-RS ports (P) | ($N_1$, $N_2$) | ($O_1$, $O_2$) |
|---|---|---|
| | Supported configurations of ($O_1$, $O_2$) and ($N_1$, $N_2$) | |
| 4 | (2, 1) | (4, —) |
| 8 | (2, 2) | (4, 4) |
| | (4, 1) | (4, —) |
| 12 | (3, 2), (2, 3) | (4, 4) |
| | (6, 1) | (4, —) |
| 16 | (4, 2), (2, 4) | (4, 4) |
| | (8, 1) | (4, —) |
| 24 | (6, 2), (4, 3), (3, 4), (2, 6) | (4, 4) |
| | (12, 1) | (4, —) |
| 32 | (8, 2), (4, 4), (2, 8) | (4, 4) |
| | (16, 1) | (4, —) |

If multiple ($O_1$,$O_2$) pairs are supported for any ($N_1$,$N_2$) pair, then the UE is further configured with higher-layer parameters codebook-Over-Sampling-RateConfig-O1 and codebook-Over-Sampling-RateConfig-O2, to configure $O_1$ and $O_2$, respectively.

The codebook details for rank 1 and rank 2 CSI reporting are as follows. 2D DFT beam index ($k_1$, $k_2$) is defined where $k_1=i_{1,1}s_1+p_1$, $k_2=i_{1,2}s_2+p_2$. Some parameters are defined as following. In one example, the beam group offset ($s_1$, $s_2$)=(1,1) for L=1 and (2,2) for L=4. In another example, the leading beam index ($i_{1,1}$,$i_{1,2}$) is reported wideband, where $i_{1,1}=0, 1,$ $$\ldots \frac{N_1 O_1}{s_1} - 1$$

and $i_{1,2}=0,1,$ $$\ldots \frac{N_2 O_2}{s_2} - 1,$$

hence it requires $$\left\lceil \log_2\left( \frac{N_1 O_1}{s_1} \times \frac{N_2 O_2}{s_2} \right) \right\rceil$$

bits. In one example, for L=4, the parameter ($p_1$, $p_2$) for beam selection (from the beam group) can be subband (which requires 2 bits/subband). For example as shown in FIG. 24, $N_1$>1 and $N_2$>1: $p_1$=0, 1; $p_2$=0,1, $N_2$=1: $p_1$=0, 1, 2, 3; $p_2$=0, and note that for L=1, $p_1=p_2=0$ (hence no beam selection is reported).

For 1 layer CSI reporting (rank 1), the pre-coding vector is given by $$W = \frac{1}{\sqrt{P}} \begin{bmatrix} w_{0,0} \\ w_{1,0} \end{bmatrix},$$

where $w_{r,0}=b_{k_1,k_2} \cdot c_{r,0}$ and r=0,1 (for two polarizations) where $b_{k_1,k_2}$ is an oversampled 2D DFT beam and $c_{r,0}$ is a co-phasing coefficient (between two polarizations) with $c_{0,0}=1$ and $c_{1,0}=\{1, j, -1, -j\}$, where the calculation and reporting of $c_{1,0}$ can be subband (which requires 2 bits/subband).

For 2 layer CSI reporting (rank 2), the pre-coding matrix is given by $$\frac{1}{\sqrt{2P}}\begin{bmatrix} w_{0,0} & w_{0,1} \\ w_{1,0} & w_{1,1} \end{bmatrix},$$

where $w_{r,l}=b_{k_1-k'_{1,l},k_2+k'_{2,l}} \cdot c_{r,l}$, r=0,1 (for two polarizations), and l=0,1 (for two layers). In such instance, $b_{k_1+k'_{1,l},k_2+k'_{2,l}}$ is an oversampled 2D DFT beam. In such instance, for the leading 2D DFT beam (layer 0), the index pair $(k'_{1,0}, k'_{2,0})=(0,0)$/. In such instance, for the second 2D DFT beam (layer 1), the index pair $(k'_{1,1}, k'_{2,1})$ is calculated and reported in a wideband manner according to at least one of the following alternatives.

In one example of Alt 10-0, the same as in LTE specification Class A rank 3-4 codebook for Codebook-Config=1, i.e., $(k'_{1,1}, k'_{2,1}) \in \{(1,0), (0,1)\}$ for 2D antenna port layouts ($N_1>1, N_2>1$), and $(k'_{1,1}, k'_{2,1}) \in \{(1,0), (2,0), (3,0)\}$ for 1D antenna port layouts ($N_1>1, N_2=1$).

In another example of Alt 10-1: $(k'_{1,1}, k'_{2,1}) \in \{(1,0), (0,1)\}$ for 2D antenna port layouts ($N_1>1, N_2>1$), and $(k'_{1,1}, k'_{2,1}) \in \{(1,0), (2,0)\}$ for 1D antenna port layouts ($N_1>1, N_2=1$).

In yet another example of Alt 10-2: for $N_1>1$ and $N_2>2$ and $N_2>(k'_{1,1}, k'_{2,1})=\{(0,0), (O_1, 0), (0, O_2), (0, 2O_2)\}$: for $N_2>1$ and $N_1>2$ and $N_2>N_1$: $(k'_{1,1}, k'_{2,1})=\{(0,0), (O_1, 0), (0, O_2), (2O_1, 0)\}$; for $N_2>1$ and $N_1>1$ and $N_1=N_2$: $(k'_{1,1}, k'_{2,1})=\{(0,0), (O_1, 0), (0, O_2), (O_1, O_2)\}$; and for $N_2=1$: $(k'_{1,1}, k'_{2,1})=\{(0,0), (O_1, 0), (2O_1, 0), (3O_1, 0)\}$. In such instance, the last two values are not applicable for 4 ports (i.e., $N_1=2$).

In yet another example of Alt 10-3: for $N_1>1$ and $N_2>2$ and $N_2>N_1$: $(k'_{1,1}, k'_{2,1})=\{(0,0), (O_1, 0), (0, O_2), (0, (N_2-1)O_2)\}$; for $N_2>1$ and $N_1>2$ and $N_1>N_2$: $(k'_{1,1}, k'_{2,1})=\{(0,0), (O_1, 0), (0, O_2), ((N_1-1)O_1, 0)\}$; for $N_2>1$ and $N_1>1$ and $N_1=N_2$: $(k'_{1,1}, k'_{2,1})=\{(0,0), (O_1, 0), (0, O_2), (O_1, O_2)\}$; and for $N_2=1$: $(k'_{1,1}, k'_{2,1})=\{(0,0), (O_1, 0), (2O_1, 0), ((N_1-1)O_1, 0)\}$. In such instance, the last two values are not applicable for 4 ports (i.e., $N_1=2$).

In yet another example of Alt 10-4: for $N_2>1$ and $N_1>1$: $(k'_{1,1}, k'_{2,1})=\{(0,0), (O_1, 0), (0, O_2), (O_1, O_2)\}$ and for $N_2=1$: $(k'_{1,1}, k'_{2,1})=\{(0,0), (O_1, 0), (2O_1, 0), (3O_1, 0)\}$. In such instance, the last two values are not applicable for 4 ports (i.e., $N_1=2$).

In yet another example of Alt 10-5: for $N_2>1$ and $N_1>1$: $(k'_{1,1}, k'_{2,1})=\{(0,0), (O_1, 0), (0, O_2), (O_1, O_2)\}$ and for $N_2=1$: $(k'_{1,1}, k'_{2,1})=\{(0,0), (O_1, 0), (2O_1, 0), ((N_1-1)O_1, 0)\}$. In such instance, the last two values are not applicable for 4 ports (i.e., $N_1=2$). $c_{r,l}$ is co-phase coefficients with $c_{0,l}=1$, $c_{1,0}=-c_{1,1}$, and $c_{1,0} \in \{1, j\}$, where the calculation and reporting of $c_{1,0}$ can be subband (which requires 1 bit/subband).

In sub-embodiment 10A, a UE is configured with a 1 layer and a 2 layer codebooks for rank 1 and rank 2 PMI reporting as follows. For 2 antenna ports (e.g. {15, 16}), each PMI value corresponds to a codebook index given in TABLE 6. For 4 antenna ports (e.g. {15, 16, 17, 18}), 8 antenna ports (e.g. {15, 16, . . . , 22}), 12 antenna ports (e.g. {15, 16, . . . , 26}), 16 antenna ports (e.g. {15, 16, . . . , 30}), 24 antenna ports (e.g. {15, 16, . . . , 38}), 32 antenna ports (e.g. {15, 16, . . . 46}), each PMI value corresponds to three codebook indices $i_{1,1}, i_{1,2}, i_2$ given in TABLE 8 for 1-layer and TABLE 9 for 2-layers. The quantities $\varphi_n$, $u_m$, and $v_{l,m}$ are given by:

$$\varphi_n = e^{j\pi n/2}$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

where, the values of $N_1$ and $N_2$ are configured $$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

with the higher-layer parameters CodebookConfig-N1 and CodebookConfig-N2, respectively. The supported configurations of $(N_1, N_2)$ for a given number of CSI-RS ports and the corresponding values of $(O_1, O_2)$ are given in TABLE 7. The number of CSI-RS ports, $P_{CSI-RS}$, is $2N_1N_2$. A UE may only use $i_{1,2}=0$ and may not report $i_{1,2}$ if the value of CodebookConfig-N2 is set to 1.

TABLE 6

Codebook for CSI reporting on 2 antenna ports

| Codebook index | Number of layers υ | |
|---|---|---|
| | 1 | 2 |
| 0 | $\frac{1}{\sqrt{2}}\begin{bmatrix} 1 \\ 1 \end{bmatrix}$ | $\frac{1}{2}\begin{bmatrix} 1 & 1 \\ 1 & -1 \end{bmatrix}$ |
| 1 | $\frac{1}{\sqrt{2}}\begin{bmatrix} 1 \\ j \end{bmatrix}$ | $\frac{1}{2}\begin{bmatrix} 1 & 1 \\ j & -j \end{bmatrix}$ |
| 2 | $\frac{1}{\sqrt{2}}\begin{bmatrix} 1 \\ -1 \end{bmatrix}$ | — |
| 3 | $\frac{1}{\sqrt{2}}\begin{bmatrix} 1 \\ -j \end{bmatrix}$ | — |

TABLE 7

Supported configurations of $(N_1, N_2)$ and $(O_1, O_2)$

| Number of CSI-RS antenna ports, $P_{CSI-RS}$ | $(N_1, N_2)$ | $(O_1, O_2)$ |
|---|---|---|
| 4 | (2, 1) | (4, 4) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |
| 32 | (4, 4) | (4, 4) |
|  | (8, 2) | (4, 4) |
|  | (16, 1) | (4, 1) |

TABLE 8

Codebook for 1-layer CSI reporting using antenna ports [15 to 14 + $P_{CSI-RS}$]

Codebook-Config = 1

| $i_{1,1}$ | $i_{1,2}$ | $i_2$ | | | |
|---|---|---|---|---|---|
| | | 0 | 1 | 2 | 3 |
| $0, \ldots, N_1O_1 - 1$ | $0, \ldots, N_2O_2 - 1$ | $W_{i_{1,1},i_{1,2},0}^{(1)}$ | $W_{i_{1,1},i_{1,2},1}^{(1)}$ | $W_{i_{1,1},i_{1,2},2}^{(1)}$ | $W_{i_{1,1},i_{1,2},3}^{(1)}$ | where $W_{l,m,n}^{(1)} = \frac{1}{\sqrt{P_{CSI-RS}}} \begin{bmatrix} v_{l,m} \\ \varphi_n v_{l,m} \end{bmatrix}$ Codebook-Config = 2, $N_2 > 1$

| $i_{1,1}$ | $i_{1,2}$ | $i_2$ | | | |
|---|---|---|---|---|---|
| | | 0 | 1 | 2 | 3 |
| $0, 1, \ldots, \frac{N_1O_1}{2} - 1$ | $0, 1, \ldots, \frac{N_2O_2}{2} - 1$ | $W_{2i_{1,1},2i_{1,2},0}^{(1)}$ | $W_{2i_{1,1},2i_{1,2},1}^{(1)}$ | $W_{2i_{1,1},2i_{1,2},2}^{(1)}$ | $W_{2i_{1,1},2i_{1,2},3}^{(1)}$ |

| $i_{1,1}$ | $i_{1,2}$ | $i_2$ | | | |
|---|---|---|---|---|---|
| | | 4 | 5 | 6 | 7 |
| $0, 1, \ldots, \frac{N_1O_1}{2} - 1$ | $0, 1, \ldots, \frac{N_2O_2}{2} - 1$ | $W_{2i_{1,1}+1,2i_{1,2},0}^{(1)}$ | $W_{2i_{1,1}+1,2i_{1,2},1}^{(1)}$ | $W_{2i_{1,1}+1,2i_{1,2},2}^{(1)}$ | $W_{2i_{1,1}+1,2i_{1,2},3}^{(1)}$ |

| $i_{1,1}$ | $i_{1,2}$ | $i_2$ | | | |
|---|---|---|---|---|---|
| | | 8 | 9 | 10 | 11 |
| $0, 1, \ldots, \frac{N_1O_1}{2} - 1$ | $0, 1, \ldots, \frac{N_2O_2}{2} - 1$ | $W_{2i_{1,1},2i_{1,2}+1,0}^{(1)}$ | $W_{2i_{1,1},2i_{1,2}+1,1}^{(1)}$ | $W_{2i_{1,1},2i_{1,2}+1,2}^{(1)}$ | $W_{2i_{1,1},2i_{1,2}+1,3}^{(1)}$ |

| $i_{1,1}$ | $i_{1,2}$ | $i_2$ | | | |
|---|---|---|---|---|---|
| | | 12 | 13 | 14 | 15 |
| $0, 1, \ldots, \frac{N_1O_1}{2} - 1$ | $0, 1, \ldots, \frac{N_2O_2}{2} - 1$ | $W_{2i_{1,1}+1,2i_{1,2}+1,0}^{(1)}$ | $W_{2i_{1,1}+1,2i_{1,2}+1,1}^{(1)}$ | $W_{2i_{1,1},2i_{1,2}+1,2}^{(1)}$ | $W_{2i_{1,1},2i_{1,2}+1,3}^{(1)}$ | where $W_{l,m,n}^{(1)} = \frac{1}{\sqrt{P_{CSI-RS}}} \begin{bmatrix} v_{l,m} \\ \varphi_n v_{l,m} \end{bmatrix}$ Codebook-Config = 2, $N_2 = 1$

| $i_{1,1}$ | $i_{1,2}$ | $i_2$ | | | |
|---|---|---|---|---|---|
| | | 0 | 1 | 2 | 3 |
| $0, 1, \ldots, \frac{N_1O_1}{2} - 1$ | 0 | $W_{2i_{1,1},0,0}^{(1)}$ | $W_{2i_{1,1},0,1}^{(1)}$ | $W_{2i_{1,1},0,2}^{(1)}$ | $W_{2i_{1,1},0,3}^{(1)}$ |

| $i_{1,1}$ | $i_{1,2}$ | $i_2$ | | | |
|---|---|---|---|---|---|
| | | 4 | 5 | 6 | 7 |
| $0, 1, \ldots, \frac{N_1O_1}{2} - 1$ | 0 | $W_{2i_{1,1}+1,0,0}^{(1)}$ | $W_{2i_{1,1}+1,0,1}^{(1)}$ | $W_{2i_{1,1}+1,0,2}^{(1)}$ | $W_{2i_{1,1}+1,0,3}^{(1)}$ |

| $i_{1,1}$ | $i_{1,2}$ | $i_2$ | | | |
|---|---|---|---|---|---|
| | | 8 | 9 | 10 | 11 |
| $0, 1, \ldots, \frac{N_1O_1}{2} - 1$ | 0 | $W_{2i_{1,1}+2,0,0}^{(1)}$ | $W_{2i_{1,1}+2,0,1}^{(1)}$ | $W_{2i_{1,1}+2,0,2}^{(1)}$ | $W_{2i_{1,1}+2,0,3}^{(1)}$ |

| $i_{1,1}$ | $i_{1,2}$ | $i_2$ | | | |
|---|---|---|---|---|---|
| | | 12 | 13 | 14 | 15 |
| $0, 1, \ldots, \frac{N_1O_1}{2} - 1$ | 0 | $W_{2i_{1,1}+3,0,0}^{(1)}$ | $W_{2i_{1,1}+3,0,1}^{(1)}$ | $W_{2i_{1,1}+3,0,2}^{(1)}$ | $W_{2i_{1,1}+3,0,3}^{(1)}$ |

TABLE 8-continued

Codebook for 1-layer CSI reporting using antenna ports [15 to 14 + $P_{CSI-RS}$]

where $W^{(1)}_{l,m,n} = \dfrac{1}{\sqrt{P_{CSI-RS}}} \begin{bmatrix} v_{l,m} \\ \varphi_n v_{l,m} \end{bmatrix}$.

TABLE 9

Codebook for 2-layer CSI reporting using antenna ports [15 to 14 + $P_{CSI-RS}$]

Codebook-Config = $N_1 > N_2 > 1$
$i_{1,2} = 0, \ldots, N_2 O_2 - 1$

| $i_{1,1}$ | $i_2$ | |
|---|---|---|
| | 0 | 1 |
| $0, \ldots, N_1 O_1 - 1$ | $W^{(2)}_{i_{1,1}, i_{1,1}, i_{1,2}, i_{1,2}, 0}$ | $W^{(2)}_{i_{1,1}, i_{1,1}, i_{1,2}, i_{1,2}, 1}$ |
| $N_1 O_1, \ldots, 2N_1 O_1 - 1$ | $W^{(2)}_{i_{1,1}, i_{1,1}+O_1, i_{1,2}, i_{1,2}, 0}$ | $W^{(2)}_{i_{1,1}, i_{1,1}+O_1, i_{1,2}, i_{1,2}, 1}$ |
| $2N_1 O_1, \ldots, 3N_1 O_1 - 1$ | $W^{(2)}_{i_{1,1}, i_{1,1}, i_{1,2}, i_{1,2}+O_2, 0}$ | $W^{(2)}_{i_{1,1}, i_{1,1}, i_{1,2}, i_{1,2}+O_2, 1}$ |
| $3N_1 O_1, \ldots, 4N_1 O_1 - 1$ | $W^{(2)}_{i_{1,1}, i_{1,1}+2O_1, i_{1,2}, i_{1,2}, 0}$ | $W^{(2)}_{i_{1,1}, i_{1,1}+2O_1, i_{1,2}, i_{1,2}, 1}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$ Codebook-Config = 1, $N_1 = N_2$
$i_{1,2} = 0, \ldots, N_2 O_2 - 1$

| $i_{1,1}$ | $i_2$ | |
|---|---|---|
| | 0 | 1 |
| $0, \ldots, N_1 O_1 - 1$ | $W^{(2)}_{i_{1,1}, i_{1,1}, i_{1,2}, i_{1,2}, 0}$ | $W^{(2)}_{i_{1,1}, i_{1,1}, i_{1,2}, i_{1,2}, 1}$ |
| $N_1 O_1, \ldots, 2N_1 O_1 - 1$ | $W^{(2)}_{i_{1,1}, i_{1,1}+O_1, i_{1,2}, i_{1,2}, 0}$ | $W^{(2)}_{i_{1,1}, i_{1,1}+O_1, i_{1,2}, i_{1,2}, 1}$ |
| $2N_1 O_1, \ldots, 3N_1 O_1 - 1$ | $W^{(2)}_{i_{1,1}, i_{1,1}, i_{1,2}+O_2, i_{1,2}, 0}$ | $W^{(2)}_{i_{1,1}, i_{1,1}, i_{1,2}+O_2, i_{1,2}, 1}$ |
| $3N_1 O_1, \ldots, 4N_1 O_1 - 1$ | $W^{(2)}_{i_{1,1}, i_{1,1}+O_1, i_{1,2}+O_2, i_{1,2}, 0}$ | $W^{(2)}_{i_{1,1}, i_{1,1}+O_1, i_{1,2}+O_2, i_{1,2}, 1}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$ Codebook-Config = 1, $N_1 = 2$, $N_2 = 1$
$i_{1,2} = 0$

| $i_{1,1}$ | $i_2$ | |
|---|---|---|
| | 0 | 1 |
| $0, \ldots, N_1 O_1 - 1$ | $W^{(2)}_{i_{1,1}, i_{1,1}, 0, 0, 0}$ | $W^{(2)}_{i_{1,1}, i_{1,1}, 0, 0, 1}$ |
| $N_1 O_1, \ldots, 2N_1 O_1 - 1$ | $W^{(2)}_{i_{1,1}, i_{1,1}+O_1, 0, 0, 0}$ | $W^{(2)}_{i_{1,1}, i_{1,1}+O_1, 0, 0, 1}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$ Codebook-Config = 1, $N_1 > 2$, $N_2 = 1$
$i_{1,2} = 0$

| $i_{1,1}$ | $i_2$ | |
|---|---|---|
| | 0 | 1 |
| $0, \ldots, N_1 O_1 - 1$ | $W^{(2)}_{i_{1,1}, i_{1,1}, 0, 0, 0}$ | $W^{(2)}_{i_{1,1}, i_{1,1}, 0, 0, 1}$ |
| $N_1 O_1, \ldots, 2N_1 O_1 - 1$ | $W^{(2)}_{i_{1,1}, i_{1,1}+O_1, 0, 0, 0}$ | $W^{(2)}_{i_{1,1}, i_{1,1}+O_1, 0, 0, 1}$ |
| $2N_1 O_1, \ldots, 3N_1 O_1 - 1$ | $W^{(2)}_{i_{1,1}, i_{1,1}+2O_1, 0, 0, 0}$ | $W^{(2)}_{i_{1,1}, i_{1,1}+2O_1, 0, 0, 1}$ |
| $3N_1 O_1, \ldots, 4N_1 O_1 - 1$ | $W^{(2)}_{i_{1,1}, i_{1,1}+3O_1, 0, 0, 0}$ | $W^{(2)}_{i_{1,1}, i_{1,1}+3O_1, 0, 0, 1}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$ TABLE 9-continued Codebook for 2-layer CSI reporting using antenna ports [15 to 14 + $P_{CSI-RS}$]

Codebook-Config = 2, $N_1 > 2 > 1$
$i_{1,2} = 0, \ldots, N_2O_2/2 - 1$

| $i_{1,1}$ | $i_2$ | | |
|---|---|---|---|
| | 0 | 1 | 2 |
| $0, \ldots, \frac{N_1O_1}{2} - 1$ | $W^{(2)}_{2i_{1,1},2i_{1,1},2i_{1,2},2i_{1,2},0}$ | $W^{(2)}_{2i_{1,1},2i_{1,1},2i_{1,2},2i_{1,2},1}$ | $W^{(2)}_{2i_{1,1}+1,2i_{1,1}+1,2i_{1,2},2i_{1,2},0}$ |
| $\frac{N_1O_1}{2}, \ldots, N_1O_1 - 1$ | $W^{(2)}_{2i_{1,1},2i_{1,1}+O_1,2i_{1,2},2i_{1,2},0}$ | $W^{(2)}_{2i_{1,1},2i_{1,1}+O_1,2i_{1,2},2i_{1,2},1}$ | $W^{(2)}_{2i_{1,1}+1,2i_{1,1}+1+O_1,2i_{1,2},2i_{1,2},0}$ |
| $N_1O_1, \ldots, \frac{3N_1O_1}{2} - 1$ | $W^{(2)}_{2i_{1,1},2i_{1,1},2i_{1,2},2i_{1,2}+O_2,0}$ | $W^{(2)}_{2i_{1,1},2i_{1,1},2i_{1,2},2i_{1,2}+O_2,1}$ | $W^{(2)}_{2i_{1,1}+1,2i_{1,1}+1,2i_{1,2},2i_{1,2}+O_2,0}$ |
| $\frac{3N_1O_1}{2}, \ldots, 2N_1O_1 - 1$ | $W^{(2)}_{2i_{1,1},2i_{1,1}+2O_1,2i_{1,2},2i_{1,2},0}$ | $W^{(2)}_{2i_{1,1},2i_{1,1}+2O_1,2i_{1,2},2i_{1,2},1}$ | $W^{(2)}_{2i_{1,1}+1,2i_{1,1}+1+2O_1,2i_{1,2},2i_{1,2},0}$ |

| $i_{1,1}$ | $i_2$ | | |
|---|---|---|---|
| | 3 | 4 | 5 |
| $0, \ldots, \frac{N_1O_1}{2} - 1$ | $W^{(2)}_{2i_{1,1}+1,2i_{1,1}+1,2i_{1,2},2i_{1,2},1}$ | $W^{(2)}_{2i_{1,1},2i_{1,1},2i_{1,2}+1,2i_{1,2}+1,0}$ | $W^{(2)}_{2i_{1,1},2i_{1,1},2i_{1,2}+1,2i_{1,2}+1,1}$ |
| $\frac{N_1O_1}{2}, \ldots, N_1O_1 - 1$ | $W^{(2)}_{2i_{1,1}+1,2i_{1,1}+1+O_1,2i_{1,2},2i_{1,2},1}$ | $W^{(2)}_{2i_{1,1},2i_{1,1}+O_1,2i_{1,2}+1,2i_{1,2}+1,0}$ | $W^{(2)}_{2i_{1,1},2i_{1,1}+O_1,2i_{1,2}+1,2i_{1,2}+1,1}$ |
| $N_1O_1, \ldots, \frac{3N_1O_1}{2} - 1$ | $W^{(2)}_{2i_{1,1}+1,2i_{1,1}+1,2i_{1,2},2i_{1,2}+O_2,1}$ | $W^{(2)}_{2i_{1,1},2i_{1,1},2i_{1,2}+1,2i_{1,2}+1+O_2,0}$ | $W^{(2)}_{2i_{1,1},2i_{1,1},2i_{1,2}+1,2i_{1,2}+1+O_2,1}$ |
| $\frac{3N_1O_1}{2}, \ldots, 2N_1O_1 - 1$ | $W^{(2)}_{2i_{1,1}+1,2i_{1,1}+1+2O_1,2i_{1,2},2i_{1,2},1}$ | $W^{(2)}_{2i_{1,1},2i_{1,1}+2O_1,2i_{1,2}+1,2i_{1,2}+1,0}$ | $W^{(2)}_{2i_{1,1},2i_{1,1}+2O_1,2i_{1,2}+1,2i_{1,2}+1,1}$ |

| $i_{1,1}$ | $i_2$ | |
|---|---|---|
| | 6 | 7 |
| $0, \ldots, \frac{N_1O_1}{2} - 1$ | $W^{(2)}_{2i_{1,1}+1,2i_{1,1}+1,2i_{1,2}+1,2i_{1,2}+1,0}$ | $W^{(2)}_{2i_{1,1}+1,2i_{1,1}+1,2i_{1,2}+1,2i_{1,2}+1,1}$ |
| $\frac{N_1O_1}{2}, \ldots, N_1O_1 - 1$ | $W^{(2)}_{2i_{1,1}+1,2i_{1,1}+1+O_1,2i_{1,2}+1,2i_{1,2}+1,0}$ | $W^{(2)}_{2i_{1,1}+1,2i_{1,1}+1+O_1,2i_{1,2}+1,2i_{1,2}+1,1}$ |
| $N_1O_1, \ldots, \frac{3N_1O_1}{2} - 1$ | $W^{(2)}_{2i_{1,1}+1,2i_{1,1}+1,2i_{1,2}+1,2i_{1,2}+1+O_2,0}$ | $W^{(2)}_{2i_{1,1}+1,2i_{1,1}+1,2i_{1,2}+1,2i_{1,2}+1+O_2,1}$ |
| $\frac{3N_1O_1}{2}, \ldots, 2N_1O_1 - 1$ | $W^{(2)}_{2i_{1,1}+1,2i_{1,1}+1+2O_1,2i_{1,2}+1,2i_{1,2}+1,0}$ | $W^{(2)}_{2i_{1,1}+1,2i_{1,1}+1+2O_1,2i_{1,2}+1,2i_{1,2}+1,1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$ Codebook-Config = 2, $N_1 = N_2$
$i_{1,2} = 0, \ldots, N_2O_2/2 - 1$

| $i_{1,1}$ | $i_2$ | | |
|---|---|---|---|
| | 0 | 1 | 2 |
| $0, \ldots, \frac{N_1O_1}{2} - 1$ | $W^{(2)}_{2i_{1,1},2i_{1,1},2i_{1,2},2i_{1,2},0}$ | $W^{(2)}_{2i_{1,1},2i_{1,1},2i_{1,2},2i_{1,2},1}$ | $W^{(2)}_{2i_{1,1}+1,2i_{1,1}+1,2i_{1,2},2i_{1,2},0}$ |
| $\frac{N_1O_1}{2}, \ldots, N_1O_1 - 1$ | $W^{(2)}_{2i_{1,1},2i_{1,1}+O_1,2i_{1,2},2i_{1,2},0}$ | $W^{(2)}_{2i_{1,1},2i_{1,1}+O_1,2i_{1,2},2i_{1,2},1}$ | $W^{(2)}_{2i_{1,1}+1,2i_{1,1}+1+O_1,2i_{1,2},2i_{1,2},0}$ |
| $N_1O_1, \ldots, \frac{3N_1O_1}{2} - 1$ | $W^{(2)}_{2i_{1,1},2i_{1,1},2i_{1,2},2i_{1,2}+O_2,0}$ | $W^{(2)}_{2i_{1,1},2i_{1,1},2i_{1,2},2i_{1,2}+O_2,1}$ | $W^{(2)}_{2i_{1,1}+1,2i_{1,1}+1,2i_{1,2},2i_{1,2}+O_2,0}$ |

TABLE 9-continued

Codebook for 2-layer CSI reporting using antenna ports [15 to 14 + $P_{CSI-RS}$]

| $i_{1,1}$ | | | |
|---|---|---|---|
| $\frac{3N_1O_1}{2}, \ldots, 2N_1O_1 - 1$ | $W^{(2)}_{2i_{1,1},2i_{1,1}+O_1,2i_{1,2},2i_{1,2}+O_2,0}$ | $W^{(2)}_{2i_{1,1},2i_{1,1}+O_1,2i_{1,2},2i_{1,2}+O_2,1}$ | $W^{(2)}_{2i_{1,1}+1,2i_{1,1}+1+O_1,2i_{1,2},2i_{1,2}+O_2}$ |

| $i_{1,1}$ | $i_2$ | | |
|---|---|---|---|
| | 3 | 4 | 5 |
| $0, \ldots, \frac{N_1O_1}{2} - 1$ | $W^{(2)}_{2i_{1,1}+1,2i_{1,1}+1,2i_{1,2},2i_{1,2},1}$ | $W^{(2)}_{2i_{1,1},2i_{1,1},2i_{1,2}+1,2i_{1,2}+1,0}$ | $W^{(2)}_{2i_{1,1},2i_{1,1},2i_{1,2}+1,2i_{1,2}+1,1}$ |
| $\frac{N_1O_1}{2}, \ldots, N_1O_1 - 1$ | $W^{(2)}_{2i_{1,1}+1,2i_{1,1}+1+O_1,2i_{1,2},2i_{1,2},1}$ | $W^{(2)}_{2i_{1,1},2i_{1,1}+O_1,2i_{1,2}+1,2i_{1,2}+1,0}$ | $W^{(2)}_{2i_{1,1},2i_{1,1}+O_1,2i_{1,2}+1,2i_{1,2}+1,1}$ |
| $N_1O_1, \ldots, \frac{3N_1O_1}{2} - 1$ | $W^{(2)}_{2i_{1,1}+1,2i_{1,1}+1,2i_{1,2},2i_{1,2}+O_2,1}$ | $W^{(2)}_{2i_{1,1},2i_{1,1},2i_{1,2}+1,2i_{1,2}+1+O_2,0}$ | $W^{(2)}_{2i_{1,1},2i_{1,1},2i_{1,2}+1,2i_{1,2}+1+O_2,1}$ |
| $\frac{3N_1O_1}{2}, \ldots, 2N_1O_1 - 1$ | $W^{(2)}_{2i_{1,1}+1,2i_{1,1}+1+O_1,2i_{1,2},2i_{1,2}+O_2,1}$ | $W^{(2)}_{2i_{1,1},2i_{1,1}+O_1,2i_{1,2}+1,2i_{1,2}+1+O_2,0}$ | $W^{(2)}_{2i_{1,1},2i_{1,1}+O_1,2i_{1,2}+1,2i_{1,2}+1+O_2,1}$ |

| $i_{1,1}$ | $i_2$ | |
|---|---|---|
| | 6 | 7 |
| $0, \ldots, \frac{N_1O_1}{2} - 1$ | $W^{(2)}_{2i_{1,1}+1,2i_{1,1}+1,2i_{1,2}+1,2i_{1,2}+1,0}$ | $W^{(2)}_{2i_{1,1}+1,2i_{1,1}+1,2i_{1,2}+1,2i_{1,2}+1,1}$ |
| $\frac{N_1O_1}{2}, \ldots, N_1O_1 - 1$ | $W^{(2)}_{2i_{1,1}+1,2i_{1,1}+1+O_1,2i_{1,2}+1,2i_{1,2}+1,0}$ | $W^{(2)}_{2i_{1,1}+1,2i_{1,1}+1+O_1,2i_{1,2}+1,2i_{1,2}+1,1}$ |
| $N_1O_1, \ldots, \frac{3N_1O_1}{2} - 1$ | $W^{(2)}_{2i_{1,1}+1,2i_{1,1}+1,2i_{1,2}+1,2i_{1,2}+1+O_2,0}$ | $W^{(2)}_{2i_{1,1}+1,2i_{1,1}+1,2i_{1,2}+1,2i_{1,2}+1+O_2,1}$ |
| $\frac{N_1O_1}{2}, \ldots, N_1O_1 - 1$ | $W^{(2)}_{2i_{1,1}+1,2i_{1,1}+1+O_1,2i_{1,2}+1,2i_{1,2}+1+O_2,0}$ | $W^{(2)}_{2i_{1,1}+1,2i_{1,1}+1+O_1,2i_{1,2}+1,2i_{1,2}+1+O_2,1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$ Codebook-Config = 2, $N_1 = 2$, $N_2 = 1$
$i_{1,2} = 0$

| $i_{1,1}$ | $i_2$ | |
|---|---|---|
| | 0 | 1 |
| $0, \ldots, \frac{N_1O_1}{2} - 1$ | $W^{(2)}_{2i_{1,1},2i_{1,1},0,0,0}$ | $W^{(2)}_{2i_{1,1},2i_{1,1},0,0,1}$ |
| $\frac{N_1O_1}{2}, \ldots, N_1O_1 - 1$ | $W^{(2)}_{2i_{1,1},2i_{1,1}+O_1,0,0,0}$ | $W^{(2)}_{2i_{1,1},2i_{1,1}+O_1,0,0,1}$ |

| $i_{1,1}$ | $i_2$ | |
|---|---|---|
| | 4 | 5 |
| $0, \ldots, \frac{N_1O_1}{2} - 1$ | $W^{(2)}_{2i_{1,1}+2,2i_{1,1}+2,0,0,0}$ | $W^{(2)}_{2i_{1,1}+2,2i_{1,1}+2,0,0,1}$ |
| $\frac{N_1O_1}{2}, \ldots, N_1O_1 - 1$ | $W^{(2)}_{2i_{1,1}+2,2i_{1,1}+2+O_1,0,0,0}$ | $W^{(2)}_{2i_{1,1}+2,2i_{1,1}+2+O_1,0,0,1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$ TABLE 9-continued Codebook for 2-layer CSI reporting using antenna ports [15 to 14 + $P_{CSI-RS}$]

Codebook-Config = 2, $N_1 = 2$, $N_2 = 1$
$i_{1,2} = 0$

| $i_{1,1}$ | $i_2$ | |
|---|---|---|
| | 2 | 3 |
| $0, \ldots, \frac{N_1 O_1}{2} - 1$ | $W^{(2)}_{2i_{1,1}+1, 2i_{1,1}+1, 0, 0, 0}$ | $W^{(2)}_{2i_{1,1}+1, 2i_{1,1}+1, 0, 0, 1}$ |
| $\frac{N_1 O_1}{2}, \ldots, N_1 O_1 - 1$ | $W^{(2)}_{2i_{1,1}+1, 2i_{1,1}+1+O_1, 0, 0, 0}$ | $W^{(2)}_{2i_{1,1}+1, 2i_{1,1}+1+O_1, 0, 0, 1}$ |

| $i_{1,1}$ | $i_2$ | |
|---|---|---|
| | 6 | 7 |
| $0, \ldots, \frac{N_1 O_1}{2} - 1$ | $W^{(2)}_{2i_{1,1}+3, 2i_{1,1}+3, 0, 0, 0}$ | $W^{(2)}_{2i_{1,1}+3, 2i_{1,1}+3, 0, 0, 1}$ |
| $\frac{N_1 O_1}{2}, \ldots, N_1 O_1 - 1$ | $W^{(2)}_{2i_{1,1}+3, 2i_{1,1}+3+O_1, 0, 0, 0}$ | $W^{(2)}_{2i_{1,1}+3, 2i_{1,1}+3+O_1, 0, 0, 1}$ | where $W^{(2)}_{l,l',m,m',n} = \frac{1}{\sqrt{2 P_{CSI-RS}}} \begin{bmatrix} v_{l,m} & v_{l',m'} \\ \varphi_n v_{l,m} & -\varphi_n v_{l',m'} \end{bmatrix}$ Codebook-Config = 2, $N_1 > 2$, $N_2 = 1$
$i_{1,2} = 0$

| $i_{1,1}$ | $i_2$ | |
|---|---|---|
| | 0 | 1 |
| $0, \ldots, \frac{N_1 O_1}{2} - 1$ | $W^{(2)}_{2i_{1,1}, 2i_{1,1}, 0, 0, 0}$ | $W^{(2)}_{2i_{1,1}, 2i_{1,1}, 0, 0, 1}$ |
| $\frac{N_1 O_1}{2}, \ldots, N_1 O_1 - 1$ | $W^{(2)}_{2i_{1,1}, 2i_{1,1}+O_1, 0, 0, 0}$ | $W^{(2)}_{2i_{1,1}, 2i_{1,1}+O_1, 0, 0, 1}$ |
| $N_1 O_1, \ldots, \frac{3 N_1 O_1}{2} - 1$ | $W^{(2)}_{2i_{1,1}, 2i_{1,1}+2O_1, 0, 0, 0}$ | $W^{(2)}_{2i_{1,1}, 2i_{1,1}+2O_1, 0, 0, 1}$ |
| $\frac{3 N_1 O_1}{2}, \ldots, 2 N_1 O_1 - 1$ | $W^{(2)}_{2i_{1,1}, 2i_{1,1}+3O_1, 0, 0, 0}$ | $W^{(2)}_{2i_{1,1}, 2i_{1,1}+3O_1, 0, 0, 1}$ |

| $i_{1,1}$ | $i_2$ | |
|---|---|---|
| | 4 | 5 |
| $0, \ldots, \frac{N_1 O_1}{2} - 1$ | $W^{(2)}_{2i_{1,1}+2, 2i_{1,1}+2, 0, 0, 0}$ | $W^{(2)}_{2i_{1,1}+2, 2i_{1,1}+2, 0, 0, 1}$ |
| $\frac{N_1 O_1}{2}, \ldots, N_1 O_1 - 1$ | $W^{(2)}_{2i_{1,1}+2, 2i_{1,1}+2+O_1, 0, 0, 0}$ | $W^{(2)}_{2i_{1,1}+2, 2i_{1,1}+2+O_1, 0, 0, 1}$ |
| $N_1 O_1, \ldots, \frac{3 N_1 O_1}{2} - 1$ | $W^{(2)}_{2i_{1,1}+2, 2i_{1,1}+2+2O_1, 0, 0, 0}$ | $W^{(2)}_{2i_{1,1}+2, 2i_{1,1}+2+2O_1, 0, 0, 1}$ |
| $\frac{3 N_1 O_1}{2}, \ldots, 2 N_1 O_1 - 1$ | $W^{(2)}_{2i_{1,1}+2, 2i_{1,1}+2+3O_1, 0, 0, 0}$ | $W^{(2)}_{2i_{1,1}+2, 2i_{1,1}+2+3O_1, 0, 0, 1}$ | where $W^{(2)}_{l,l',m,m',n} = \frac{1}{\sqrt{2 P_{CSI-RS}}} \begin{bmatrix} v_{l,m} & v_{l',m'} \\ \varphi_n v_{l,m} & -\varphi_n v_{l',m'} \end{bmatrix}$ TABLE 9-continued Codebook for 2-layer CSI reporting using antenna ports [15 to 14 + $P_{CSI-RS}$]

Codebook-Config = 2, $N_1 > 2$, $N_2 = 1$
$i_{1,2} = 0$

| $i_{1,1}$ | $i_2$ | |
|---|---|---|
| | 2 | 3 |
| $0, \ldots, \frac{N_1 O_1}{2} - 1$ | $W^{(2)}_{2i_{1,1}+1, 2i_{1,1}+1, 0, 0, 0}$ | $W^{(2)}_{2i_{1,1}+1, 2i_{1,1}+1, 0, 0, 1}$ |
| $\frac{N_1 O_1}{2}, \ldots, N_1 O_1 - 1$ | $W^{(2)}_{2i_{1,1}+1, 2i_{1,1}+1+O_1, 0, 0, 0}$ | $W^{(2)}_{2i_{1,1}+1, 2i_{1,1}+1+O_1, 0, 0, 1}$ |
| $N_1 O_1, \ldots, \frac{3N_1 O_1}{2} - 1$ | $W^{(2)}_{2i_{1,1}+1, 2i_{1,1}+1+2O_1, 0, 0, 0}$ | $W^{(2)}_{2i_{1,1}+1, 2i_{1,1}+1+2O_1, 0, 0, 1}$ |
| $\frac{3N_1 O_1}{2}, \ldots, 2N_1 O_1 - 1$ | $W^{(2)}_{2i_{1,1}+1, 2i_{1,1}+1+3O_1, 0, 0, 0}$ | $W^{(2)}_{2i_{1,1}+1, 2i_{1,1}+1+3O_1, 0, 0, 1}$ |

| $i_{1,1}$ | $i_2$ | |
|---|---|---|
| | 6 | 7 |
| $0, \ldots, \frac{N_1 O_1}{2} - 1$ | $W^{(2)}_{2i_{1,1}+3, 2i_{1,1}+3, 0, 0, 0}$ | $W^{(2)}_{2i_{1,1}+3, 2i_{1,1}+3, 0, 0, 1}$ |
| $\frac{N_1 O_1}{2}, \ldots, N_1 O_1 - 1$ | $W^{(2)}_{2i_{1,1}+3, 2i_{1,1}+3+O_1, 0, 0, 0}$ | $W^{(2)}_{2i_{1,1}+3, 2i_{1,1}+3+O_1, 0, 0, 1}$ |
| $N_1 O_1, \ldots, \frac{3N_1 O_1}{2} - 1$ | $W^{(2)}_{2i_{1,1}+3, 2i_{1,1}+3+2O_1, 0, 0, 0}$ | $W^{(2)}_{2i_{1,1}+3, 2i_{1,1}+3+2O_1, 0, 0, 1}$ |
| $\frac{3N_1 O_1}{2}, \ldots, 2N_1 O_1 - 1$ | $W^{(2)}_{2i_{1,1}+3, 2i_{1,1}+3+3O_1, 0, 0, 0}$ | $W^{(2)}_{2i_{1,1}+3, 2i_{1,1}+3+3O_1, 0, 0, 1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$ In one sub-embodiment 10B, a UE is configured with a 1 layer and a 2 layer codebooks for rank 1 and rank 2 PMI reporting as follows. For 2 antenna ports (e.g. {15, 16}), each PMI value corresponds to a codebook index given in TABLE 6. For 4 antenna ports (e.g. {15, 16, 17, 18}), 8 antenna ports (e.g. {15, 16, . . . , 22}), 12 antenna ports (e.g. {15, 16, . . . , 26}), 16 antenna ports (e.g. {15, 16, . . . , 30}), 24 antenna ports (e.g. {15, 16, . . . , 38}), 32 antenna ports (e.g. {15, 16, . . . 46}), each PMI value corresponds to three codebook indices $i_{1,1}$, $i_{1,2}$, $i_2$ given in TABLE 8 for 1-layer and corresponds to four codebook indices $i_{1,1}$, $i_{1,2}$, $i_{1,3}$, $i_2$ given in TABLE 11 for 2-layers. The quantities $\varphi_n$, $\theta_p$, $u_m$, and $v_{l,m}$ are given by $$\varphi_n = e^{j\pi n/2}$$

$$\theta_p = e^{j\pi p/4}$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

-continued $$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

The mapping of $i_{1,3}$ to $k_1$ and $k_2$ is given in TABLE 10.

TABLE 10

Mapping of $i_{1,3}$ field to $k_1$ and $k_2$

| Value of $i_{1,3}$ | $N_1 > N_2 > 1$ | | $N_1 = N_2$ | | $N_1 = 2, N_2 = 1$ | | $N_1 > 2, N_2 = 1$ | |
|---|---|---|---|---|---|---|---|---|
| | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ | | | $2O_1$ | 0 |
| 3 | $2O_1$ | 0 | $O_1$ | $O_2$ | | | $3O_1$ | 0 |

| Codebook for 2-Layer CSI reporting using antenna ports [15 to 14 + $P_{CSI-RS}$] | |
|---|---|
| Codebook-Config = 1 | |
| $i_{1,2} = 0, \ldots, N_2 O_2 - 1$ | |

| $i_{1,1}$ | $i_2$ | |
|---|---|---|
| | 0 | 1 |
| $0, \ldots, N_1 O_1 - 1$ | $W_{i_{1,1},i_{1,1}+k_1,i_{1,2},i_{1,2}+k_2,0}^{(2)}$ | $W_{i_{1,1},i_{1,1}+k_1,i_{1,2},i_{1,2}+k_2,1}^{(2)}$ | where $W_{l,l',m,m',n}^{(2)} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$

| Codebook-Config = 2, $N_2 > 1$ | |
|---|---|
| $i_{1,2} = 0, \ldots, N_2 O_2/2 - 1$ | |

| $i_{1,1}$ | $i_2$ | |
|---|---|---|
| | 0 | 1 |
| $0, \ldots, \dfrac{N_1 O_1}{2} - 1$ | $W_{2i_{1,1},2i_{1,1}+k_1,2i_{1,2},2i_{1,2}+k_2,0}^{(2)}$ | $W_{2i_{1,1},2i_{1,1}+k_1,2i_{1,2},2i_{1,2}+k_2,1}^{(2)}$ |

| $i_{1,1}$ | $i_2$ | |
|---|---|---|
| | 3 | 4 |
| $0, \ldots, \dfrac{N_1 O_1}{2} - 1$ | $W_{2i_{1,1}+1,2i_{1,1}+1+k_1,2i_{1,2},2i_{1,2}+k_2,1}^{(2)}$ | $W_{2i_{1,1},2i_{1,1}+k_1,2i_{1,2}+1,2i_{1,2}+1+k_2,0}^{(2)}$ |

| $i_{1,1}$ | $i_2$ | |
|---|---|---|
| | 6 | 7 |
| $0, \ldots, \dfrac{N_1 O_1}{2} - 1$ | $W_{2i_{1,1}+1,2i_{1,1}+1+k_1,2i_{1,2}+1,2i_{1,2}+1+k_2,0}^{(2)}$ | $W_{2i_{1,1}+1,2i_{1,1}+1+k_1,2i_{1,2}+1,2i_{1,2}+1+k_2,1}^{(2)}$ | where $W_{l,l',m,m',n}^{(2)} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$

| Codebook-Config = 2, $N_2 > 1$ | |
|---|---|
| $i_{1,2} = 0, \ldots, N_2 O_2/2 - 1$ | |

| $i_{1,1}$ | $\dfrac{i_2}{2}$ |
|---|---|
| $0, \ldots, \dfrac{N_1 O_1}{2} - 1$ | $W_{2i_{1,1}+1,2i_{1,1}+1+k_1,2i_{1,2},2i_{1,2}+k_2,0}^{(2)}$ |

| $i_{1,1}$ | $\dfrac{i_2}{5}$ |
|---|---|
| $0, \ldots, \dfrac{N_1 O_1}{2} - 1$ | $W_{2i_{1,1},2i_{1,1}+k_1,2i_{1,2}+1,2i_{1,2}+1+k_2,1}^{(2)}$ | where $W_{l,l',m,m',n}^{(2)} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$

| Codebook-Config = 2, $N_2 = 1$ | | |
|---|---|---|
| $i_{1,2} = 0$ | | |

| $i_{1,1}$ | $i_2$ | | |
|---|---|---|---|
| | 0 | 1 | 2 |
| $0, \ldots, \dfrac{N_1 O_1}{2} - 1$ | $W_{2i_{1,1},2i_{1,1}+k_1,0,0,0}^{(2)}$ | $W_{2i_{1,1},2i_{1,1}+k_1,0,0,1}^{(2)}$ | $W_{2i_{1,1}+1,2i_{1,1}+1+k_1,0,0,0}^{(2)}$ |

| $i_{1,1}$ | $i_2$ | | |
|---|---|---|---|
| | 3 | 4 | 5 |
| $0, \ldots, \dfrac{N_1 O_1}{2} - 1$ | $W_{2i_{1,1}+1,2i_{1,1}+1+k_1,0,0,1}^{(2)}$ | $W_{2i_{1,1}+2,2i_{1,1}+2+k_1,0,0,0}^{(2)}$ | $W_{2i_{1,1}+2,2i_{1,1}+2+k_1,0,0,1}^{(2)}$ |

-continued

| $i_{1,1}$ | $i_2$ | |
|---|---|---|
| | 6 | 7 |
| $0, \ldots, \frac{N_1 O_1}{2} - 1$ | $W^{(2)}_{2i_{1,1}+3, 2i_{1,1}+3+k_1, 0, 0, 0}$ | $W^{(2)}_{2i_{1,1}+3, 2i_{1,1}+3+k_1, 0, 0, 1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$ In one sub-embodiment 10C, a UE is configured with a 1 layer and a 2 layer codebooks for rank 1 and rank 2 PMI reporting as follows. For 2 antenna ports (e.g. {15, 16}), each PMI value corresponds to a codebook index given in TABLE 6. For 4 antenna ports (e.g. {15, 16, 17, 18}), 8 antenna ports (e.g. {15, 16, . . . , 22}), 12 antenna ports (e.g. {15, 16, . . . , 26}), 16 antenna ports (e.g. {15, 16, . . . , 30}), 24 antenna ports (e.g. {15, 16, . . . , 38}), 32 antenna ports (e.g. {15, 16, . . . 46}), each PMI value corresponds to three codebook indices $i_{1,1}$, $i_{1,2}$, $i_2$ given in TABLE 8 for 1-layer and corresponds to five codebook indices $i_{1,1}$, $i_{1,2}$, $i_{1,3}$, $i_{1,4}$, $i_2$ given in TABLE 11 for 2-layers. The quantities $\varphi_n$, $\theta_p$, $u_m$, and $v_{l,m}$, are given by as in Sub-embodiment 10B. The mapping of $i_{1,3}$ and $i_{1,4}$ to $k_1$ and $k_2$, respectively is given in TABLE 12 where for $N_1 > N_2 > 1$, the UE can report only four values for $(i_{1,3}, i_{1,4}) = \{(0,0), (0,1), (1,0), (2,0)\}$.

TABLE 12

Mapping of $i_{1,3}$ and $i_{1,4}$ field to $k_1$ and $k_2$

| Value of $i_{1,3}$ | $N_1 > N_2 > 1$ $k_1$ | $N_1 = N_2$ $k_1$ | $N_1 = 2, N_2 = 1$ $k_1$ | $N_1 > 2, N_2 = 1$ $k_1$ |
|---|---|---|---|---|
| 0 | 0 | 0 | 0 | 0 |
| 1 | $O_1$ | $O_1$ | $O_1$ | $O_1$ |
| 2 | $2O_1$ | | | $2O_1$ |
| 3 | | | | $3O_1$ |

| Value of $i_{1,4}$ | $N_1 > N_2 > 1$ $k_2$ | $N_1 = N_2$ $k_2$ | $N_1 = 2, N_2 = 1$ $k_2$ | $N_1 > 2, N_2 = 1$ $k_2$ |
|---|---|---|---|---|
| 0 | 0 | 0 | 0 | 0 |
| 1 | $O_2$ | $O_2$ | | |

In one embodiment 11, for CSI reporting, a subband (SB) is defined as N contiguous PRBs, where the value of N depends on the bandwidth of the (carrier) active bandwidth part. At least one of the following alternatives is used to determine the value of N. In one example of Alt 11-0, the value of N is fixed for a certain bandwidth. For example, the value of N belongs to the set of even numbers, e.g., {2, 4, 6, 8, 10, 12,1 4, 16}. An example table is shown in TABLE 13. In another example of Alt 11-1, the value of N is configured from a set of M values. In one example, for a given bandwidth of the active bandwidth part, a UE is configured with one out of M=2 SB sizes via higher layer (e.g. RRC) signaling (or, alternatively, via MAC CE based signaling or via dynamic DCI based signaling). At least one of the following sub-alternatives is used to select two values.

In one example of Alt 11-1-0, the first (smaller) of the two values belongs to the set of even numbers, e.g., {2, 4, 6, 8, 10, 12, 14, 16}, and the second (larger) of the two values is a sum of the first value and an even number, e.g. 2 or 4. A few example tables are shown in TABLE 14 and TABLE 15, TABLE 16, and TABLE 17.

In one example of Alt 11-1-1, the first (smaller) of the two values belongs to the set of even numbers, e.g., {2, 4, 6, 8, 10, 12, 14, 16}, and the second (larger) of the two values is an integer multiple of the first value, where the integer multiple is either the same for all bandwidth parts or different for different bandwidth parts. An example table is shown in TABLE 18.

In one example of Alt 11-1-2, the same as Alt 11-1-1 except that the two values are chosen such that they are integer multiples of all PRG sizes, e.g. 2 and 4 (which is defined as the number of contiguous PRBs with the same pre-coding used at the DMRS ports). For example, assuming PRG sizes 2 and 4, a few example SB size tables are shown in TABLE 19, TABLE 20, TABLE 21, and TABLE 22.

In one example of Alt 11-2, a combination of Alt 11-0 and Alt 11-1/Alt 11-2. In one example, the value of N is fixed for smaller value(s) of carrier bandwidth parts, and the value of N is configured from a set of M values for larger value(s) of carrier bandwidth parts. For example for carrier bandwidth parts 24-60 and 61-100, the value of N is according to TABLE 13, and for the rest of carrier bandwidth parts, the value of N is according to at least one of TABLE 14 through TABLE 22.

In another example, the value of N is fixed for larger value(s) of carrier bandwidth parts, and the value of N is configured from a set of M values for smaller value(s) of carrier bandwidth parts. For example for carrier bandwidth parts 24-60 and 61-100, the value of N is according to at least one of TABLE 14 through TABLE 22, and for the rest of carrier bandwidth parts, the value of N is according to TABLE 13.

TABLE 13

SB size

| Carrier bandwidth part $N_{RB, DL}^u$ | Subband Size (N) |
|---|---|
| 24-60 | 4 or 6 or 8 |
| 61-100 | 8 |
| 101-150 | 8 or 10 or 12 |
| 151-200 | 12 |
| 201-275 | 16 |

TABLE 14

SB size

| Carrier bandwidth part $N_{RB, DL}^u$ | Subband Size (N) |
|---|---|
| 24-60 | 8, 12 |
| 61-100 | 8, 12 |
| 101-150 | 12, 16 |

TABLE 14-continued

SB size

| Carrier bandwidth part $N_{RB,DL}^{\mu}$ | Subband Size (N) |
|---|---|
| 151-200 | 12, 16 |
| 201-275 | 16, 20 |

TABLE 15

SB size

| Carrier bandwidth part $N_{RB,DL}^{\mu}$ | Subband Size (N) |
|---|---|
| 24-60 | 4, 8 |
| 61-100 | 8, 12 |
| 101-150 | 8, 12 |
| 151-200 | 12, 16 |
| 201-275 | 16, 20 |

TABLE 16

SB size

| Carrier bandwidth part $N_{RB,DL}^{\mu}$ | Subband Size (N) |
|---|---|
| 24-60 | 4, 8 |
| 61-100 | 8, 12 |
| 101-150 | 12, 16 |
| 151-200 | 12, 16 |
| 201-275 | 16, 20 |

TABLE 17

SB size

| Carrier bandwidth part $N_{RB,DL}^{\mu}$ | Subband Size (N) |
|---|---|
| 24-60 | 8, 12 |
| 61-100 | 8, 12 |
| 101-150 | 8, 12 |
| 151-200 | 12, 16 |
| 201-275 | 16, 20 |

TABLE 18

SB size

| Carrier bandwidth part $N_{RB,DL}^{\mu}$ | Subband Size (N) |
|---|---|
| 24-60 | 6, 12 |
| 61-100 | 8, 16 |
| 101-150 | 10, 20 |
| 151-200 | 12, 24 |
| 201-275 | 16, 32 |

TABLE 19

SB size

| Carrier bandwidth part $N_{RB,DL}^{\mu}$ | Subband Size (N) |
|---|---|
| 24-60 | 8, 16 |
| 61-100 | 8, 16 |
| 101-150 | 12, 24 |
| 151-200 | 12, 24 |
| 201-275 | 16, 32 |

TABLE 20

SB size

| Carrier bandwidth part $N_{RB,DL}^{\mu}$ | Subband Size (N) |
|---|---|
| 24-60 | 4, 8 |
| 61-100 | 8, 16 |
| 101-150 | 12, 24 |
| 151-200 | 12, 24 |
| 201-275 | 16, 32 |

TABLE 21

SB size

| Carrier bandwidth part $N_{RB,DL}^{\mu}$ | Subband Size (N) |
|---|---|
| 24-60 | 4, 8 |
| 61-100 | 8, 16 |
| 101-150 | 8, 16 |
| 151-200 | 12, 24 |
| 201-275 | 16, 32 |

TABLE 22

SB size

| Carrier bandwidth part $N_{RB,DL}^{\mu}$ | Subband Size (N) |
|---|---|
| 24-60 | 8, 16 |
| 61-100 | 8, 16 |
| 101-150 | 8, 16 |
| 151-200 | 12, 24 |
| 201-275 | 16, 32 |

Similar to LTE specification, the codebook for the dual-stage CSI reporting is a dual-stage codebook: $W=W_1W_2$, where the first stage $W_1$ codebook is used to report a beam group for both Type I and Type II CSI using the first PMI (PMI1), and the second stage $W_2$ codebook is used to report beam selection for implicit feedback (Type I CSI) and beam combination for explicit feedback (Type II CSI) using the second PMI (PMI2). The focus of the present disclosure is on the high-resolution (Type II) CSI reporting.

In one embodiment, the dual-stage $W=W_1W_2$ codebook for high-resolution (Type II) CSI reporting is as follows. In one example, $W_1$ codebook is used to select: an orthogonal basis set comprising of uniformly spaced $(L_1,L_2)$ DFT beams; $L \in \{2,3,4,6,8\}$ beams freely out of the $L_1L_2$ DFT beams in a basis set; and per layer strongest beam out of L beams and two polarizations, where L is either (e.g. RRC) configurable or UE reports a preferred L value. This selection is WB or partial band (e.g. a set of SBs). Two examples of basis set sizes are restricted orthogonal basis set in which $L_1L_2$=min(8, $N_1N_2$) and full orthogonal basis set in which $L_1L_2$=$N_1N_2$, one of the two is either supported in the specification or configured via RRC signalling.

In another example, $W_2$ codebook is used to combine L beams independently per layer with a common $W_1$ beam group, i.e., the selected L beams are the same for all layers and two polarizations, but strongest beam selection is per layer. The amplitude and phase of the combining coefficients are reported separately where phase is reported per SB and amplitude is reported WB or SB or both WB and SB.

In one embodiment 20, a UE is configured with a high-resolution (Type II) CSI codebook in which the rank R pre-coding matrix is given by:

$$W = \frac{1}{\sqrt{R}}[W^{(0)} \quad W^{(1)} \quad \ldots \quad W^{(R-1)}]$$

where the pre-coding vector for layer l is given by $$W^{(l)} = \frac{w_1^{(l)} w_2^{(l)}}{\|w_1^{(l)} w_2^{(l)}\|}, \text{ where } W_1^{(l)} = \begin{bmatrix} B_l & 0 \\ 0 & B_l \end{bmatrix} P_{1,l}$$

if the strongest beam corresponds to one polarization, e.g. polarization 0 (or +45), $$W_1^{(l)} = \begin{bmatrix} 0 & B_l \\ B_l & 0 \end{bmatrix} P_{1,l}$$

if the strongest beam corresponds to other polarization, e.g. polarization 1 (or −45); and $W_2^{(l)}$=$P_{2,l}c_l$.

The matrices $B_l$, $P_{1,l}$, $P_{2,l}$, and vector $c_l$ are defined as follows. In one example, $B_l$ is a $N_1N_2 \times L$ basis matrix $[b_{k_{l,1}^{(0)},k_{l,2}^{(0)}}, \ldots, b_{k_{l,1}^{(L-1)},k_{l,2}^{si(L-1)}}]$ common to both polarizations, where $b_{k_{l,1}^{(i)},k_{l,2}^{(i)}}$ is one of the L orthogonal DFT beams selected from the selected ($L_1$,$L_2$) basis set, $\{(k_{l,1}^{(i)}, k_{l,2}^{(i)}): i=0,1\ldots, L-1\}$ are corresponding indices of L beams where $(k_{l,1}^{(0)}, k_{l,2}^{(0)})$ is the strongest beam for layer l. Note that for rank R>1, the strongest beam can be different for different layers, hence the index of the strongest beam is indicated per layer and this indication is WB.

In another example, $P_{1,l}$ is a 2L×2L diagonal matrix with diagonal elements $[1 \ p_{1,l,1} \ldots p_{1,l,L-1} \ p_{1,l,L} \ p_{1,l,L+1} \ldots p_{1,l,2L-1}]$, each belonging to [0,1], to indicate WB component of the relative beam power levels across L beams and two polarizations. In yet another example, $P_{2,l}$ is a 2L×2L diagonal matrix with diagonal elements $[1 \ p_{2,l,1} \ldots p_{2,l,L-1} \ p_{2,l,L} \ p_{2,l,L+1} \ldots p_{2,l,2L-1}]$, each belonging to [0,1], to indicate SB component of the relative beam power levels across L beams and two polarizations. In yet another example, $c_l$ is a 2L×1 vector $[1 \ c_{l,1} \ldots c_{l,L-1} \ c_{l,L} \ c_{l,L+1} \ldots c_{l,2L-1}]^T$, where $$\exp\left(\frac{j2\pi n}{2^N}\right) \forall i;$$

$n \in \{0,1,\ldots, 2^N-1\}$, $N \in \{2,3,4\}$, to indicate SB relative phase of coefficients across L beams and two polarizations.

In one embodiment 21, a UE is configured with a high-resolution (Type II) CSI codebook in which the rank R pre-coding matrix is given by $$W = \frac{1}{\sqrt{R}}[W^{(0)} \quad W^{(1)} \quad \ldots \quad W^{(R-1)}],$$

where the pre-coding vector for layer l is given by $$W^{(l)} = \frac{w_1^{(l)} w_2^{(l)}}{\|w_1^{(l)} w_2^{(l)}\|}, \text{ where } W_1^{(l)} = \begin{bmatrix} B_l & 0 \\ 0 & B_l \end{bmatrix} P_{1,l} \text{ and } W_2^{(l)} = P_{2,l}c_l.$$

The matrices $B_l$, $P_{1,l}$, $P_{2,l}$, and vector $c_l$ are defined as follows. In one example, $B_l$ is the same as defined in embodiment 20; and if the strongest beam corresponds to polarization 0 (or +45), then the diagonal elements of $P_{1,l}$ are $[1 \ p_{1,l,1} \ldots p_{1,l,L-1} \ p_{1,l,L} \ p_{1,l,L+1} \ldots p_{1,l,2L-1}]$; the diagonal elements of $P_{2,l}$ are $[1 \ p_{2,l,1} \ldots p_{2,l,L-1} \ p_{2,l,L} \ p_{2,l,L+1} \ldots p_{2,l,2L-1}]$; and $c_l$ is $[1 \ c_{l,1} \ldots c_{l,L-1} \ c_{l,L} \ c_{l,L+1} \ldots c_{l,2L-1}]^T$. In such example, else if the strongest beam corresponds to polarization 1 (or −45), then the diagonal elements of $P_{1,l}$ are $[p_{1,l,0} \ p_{1,l,1} \ldots p_{1,l,L-1} \ 1 \ p_{1,l,L+1} \ldots p_{1,l,2L-1}]$; the diagonal elements of $P_{2,l}$ are $[p_{2,l,0} \ p_{2,l,1} \ldots p_{2,l,L-1} \ 1 \ p_{2,l,L+1} \ldots p_{2,l,2L-1}]$; and $c_l$ is $[c_{l,0} \ c_{l,1} \ldots c_{l,L-1} \ 1 \ c_{l,L+1} \ldots c_{l,2L-1}]^T$, where the strongest beam is reported WB. The other details about $P_{1,l}$, $P_{2,l}$, and $c_l$ are the same as in Embodiment 0.

Note that one of the diagonal elements of $P_{1,l}$, $P_{2,l}$, and elements of $c_l$ is exactly one which corresponds to the strongest beam whose coefficient (both power and phase) can be assumed to be one in general. Also, if only WB components of relative beam power levels are reported, then $P_{2,l}$ is an identity matrix (hence not reported). Likewise, if only SB components of relative beam power levels are reported, then $P_{1,l}$ is an identity matrix (hence not reported).

In one embodiment 22, the index of the i-th beam $(k_1^{(i)}, k_2^{(i)})$ in the orthogobal basis set of size $(L_1,L_2)$ is given by $k_1^{(i)}$=$q_1$+$O_1d_1$ and $k_2^{(i)}$=$q_2$+$O_2d_2$ where $O_1$ and $O_2$ are over-sampling factors in $1^{st}$ and $2^{nd}$ dimensions, respectively; an example of $(O_1,O_2)$ is (4,4); $(q_1, q_2)$, where $q_1$=0,1, ..., $O_1$−1 and $q_2$=0,1, ..., $O_2$−1 is the index of the leading beam of the orthogobal basis set and $(d_1, d_2)$ satisfies the following for the restricted orthogonal basis set in which $L_1L_2$=min(8, $N_1N_2$), $d_1 \in \{0,1, \ldots, \min(N_1, L_1)-1\}$ and $d_2 \in \{0,1, \ldots, \min(N_2, L_2)-1\}$ and satisfies the following for the full orthogonal basis set in which $L_1L_2$=$N_1N_2$, $d_1 \in \{0,1, \ldots, N_1-1\}$ and $d_2 \in \{0,1, \ldots, N_2-1\}$.

For L out of $L_1L_2$ beam selection, there are two schemes for beam numbering. In one example of numbering scheme 1, starting from the leading beam, $L_1L_2$ beams are numbered sequentially 0 to $L_1L_2$−1 first in the 1st dimension and then in the 2nd dimension. In one example of numbering scheme 2, starting from the leading beam, $L_1L_2$ beams are numbered sequentially 0 to $L_1L_2$−1 first in the 2nd dimension and then in the 1st dimension.

Figure 26:
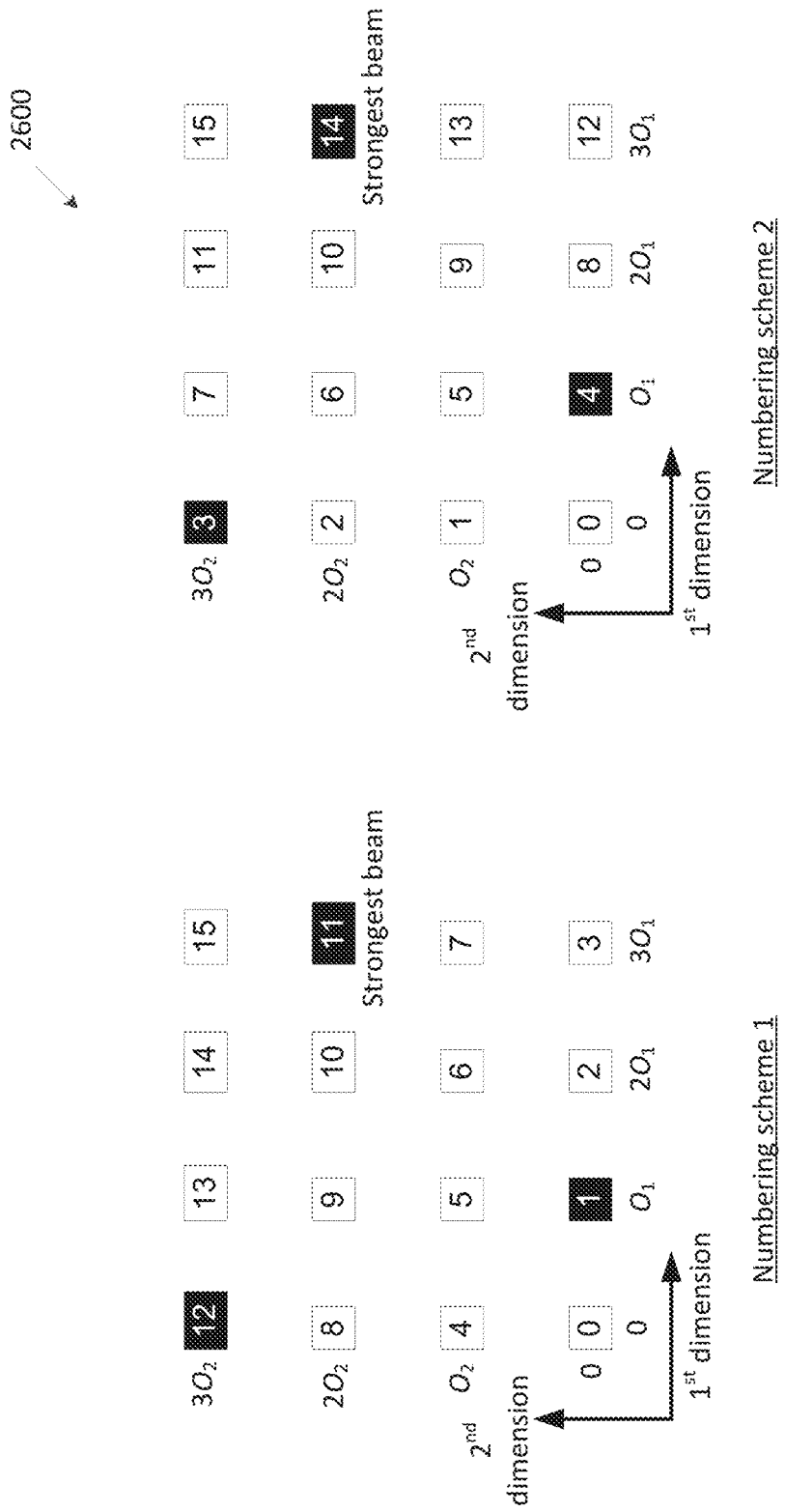
FIG. 26 illustrates an example beam numbering scheme according to embodiments of the present disclosure.

FIG. 26 illustrates an example beam numbering scheme 2600 according to embodiments of the present disclosure. An embodiment of the beam numbering scheme 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

An illustration of two beam numbering schemes is shown in FIG. 26 for $(L_1,L_2)$=(4,4) and $(q_1,q_2)$=(0,0), and corresponding beam indices are tabulated in TABLE 23. As shown, according to numbering scheme 1, beams are numbered sequentially row-wise (row corresponds to $1^{st}$ dimension), i.e., beams 0-3 correspond to four beams in row 0, beams 4-7 correspond to four beams in row 1 and so on Likewise, according to numbering scheme 2, beams are numbered sequentially column-wise (column corresponds to $2^{nd}$ dimension), i.e., beams 0-3 correspond to four beams in column 0, beams 4-7 correspond to four beams in column 1 and so on.

To construct basis matrix $B_l$ for layer l, L beams are selected as follows. In one example, 1st selected beam is the strongest beam and corresponds to the 1st column of $B_l$. In another example, remaining L−1 beams correspond to columns 2 to L−1 of $B_l$ and are selected in increasing order of beam number according to one of the two beam numbering schemes. Note that the remaining L−1 beams are selected without any ordering.

An example of L=3 beam selection is also shown in FIG. 26. According to numbering scheme 1, the strongest beam index is 11 and the remaining 2 beams are 1 and 12. And according to numbering scheme 2, the strongest beam index is 14 and the remaining 2 beams are 3 and 4. The selected beams are shown as black squares in FIG. 26. As shown in the last row of TABLE 23, the beam indices of the three columns of the basis matrix $B_l$ are $(k_{l,1}^{(0)}, k_{l,2}^{(0)})=(3O_1, 2O_2)$, $(k_{l,1}^{(1)}, k_{l,2}^{(1)})=(O_1, 0)$, and $(k_{l,1}^{(2)}, k_{l,2}^{(2)})=(0, 3O_2)$ according to numbering scheme 1, and are $(k_{l,1}^{(0)}, k_{l,2}^{(0)})=(3O_1, 2O_2)$, $(k_{l,1}^{(1)}, k_{l,2}^{(1)})=(0, 3O_2)$, and $(k_{l,1}^{(2)}, k_{l,2}^{(2)})=(O_1, 0)$ according to numbering scheme 2. Note that the $1^{st}$ beam index is the same for both numbering schemes, but $2^{nd}$ and $3^{rd}$ beam indices are different.

Only one of beam numbering scheme 1 and 2 may be used to construct the columns of basis matrix $B_l$ in the specification.

TABLE 23

Example of L = 3 selected beams

| Numbering scheme 1 | | Numbering scheme 2 | |
|---|---|---|---|
| Beam number | Beam index | Beam number | Beam index |
| 0 | (0, 0) | 0 | (0, 0) |
| 1 | ($O_1$, 0) | 1 | (0, $O_2$) |
| 2 | ($2O_1$, 0) | 2 | (0, $2O_2$) |
| 3 | ($3O_1$, 0) | 3 | (0, $3O_2$) |
| 4 | (0, $O_2$) | 4 | ($O_1$, 0) |
| 5 | ($O_1$, $O_2$) | 5 | ($O_1$, $O_2$) |
| 6 | ($2O_1$, $O_2$) | 6 | ($O_1$, $2O_2$) |
| 7 | ($3O_1$, $O_2$) | 7 | ($O_1$, $3O_2$) |
| 8 | (0, $2O_2$) | 8 | ($2O_1$, 0) |
| 9 | ($O_1$, $2O_2$) | 9 | ($2O_1$, $O_2$) |
| 10 | ($2O_1$, $2O_2$) | 10 | ($2O_1$, $2O_2$) |
| 11 | ($3O_1$, $2O_2$) | 11 | ($2O_1$, $3O_2$) |
| 12 | (0, $3O_2$) | 12 | ($3O_1$, 0) |
| 13 | ($O_1$, $3O_2$) | 13 | ($3O_1$, $O_2$) |
| 14 | ($2O_1$, $3O_2$) | 14 | ($3O_1$, $2O_2$) |
| 15 | ($3O_1$, $3O_2$) | 15 | ($3O_1$, $3O_2$) |
| L = 3 selected beams: | | L = 3 selected beams: | |
| $1^{st}$ (strongest) beam: | | $1^{st}$ (strongest) beam: | |
| $(k_{l,1}^{(0)}, k_{l,2}^{(0)}) = (3O_1, 2O_2)$ | | $(k_{l,1}^{(0)}, k_{l,2}^{(0)}) = (3O_1, 2O_2)$ | |
| $2^{nd}$ beam: | | $2^{nd}$ beam: | |
| $(k_{l,1}^{(1)}, k_{l,2}^{(1)}) = (O_1, 0)$ | | $(k_{l,1}^{(1)}, k_{l,2}^{(1)}) = (0, 3O_2)$ | |
| $3^{rd}$ beam: | | $3^{rd}$ beam: | |
| $(k_{l,1}^{(2)}, k_{l,2}^{(2)}) = (0, 3O_2)$ | | $(k_{l,1}^{(2)}, k_{l,2}^{(2)}) = (O_1, 0)$ | |

Assuming the full orthogonal basis set of size $(L_1, L_2)=(N_1, N_2)$, the number of bits to report a basis set is $B_{1,1}=\log_2(O_1 O_2)$, that to report the strongest beam is either $B_{1,2}=\log_2(L_1 L_2)$ if the strongest beam is selected common for all R layers or $B_{1,2}=\log_2(RL_1 L_2)$ if the strongest beam is selected per layer, and that to report the remaining L−1 beams is $B_{1,3}=\log_2(_{L-1}{}^{L_1 L_2-1})$. So, the total number of bits to report the first PMI (PMI1) is $B_1=B_{1,1}+B_{1,2}+B_{1,3}=[\log_2(O_1 O_2)+\log_2(L_1 L_2)+\log_2(_{L-1}{}^{L_1 L_2-1})]$ or $[\log_2(O_1 O_2)+\log_2(RL_1 L_2)+\log_2(_{L-1}{}^{L_1 L_2-1})]$.

Alternatively, the number of bits to report a basis set is $B_{1,1}=\log_2(O_1 O_2)$, that to report L beams from the selected basis set is $B_{1,2}=\log_2(_L{}^{L_1 L_2})$, and that to report the strongest beam is either $B_{1,3}=[\log_2 L]$ if the strongest beam is selected common for all R layers or $B_{1,3}=\log_2 (RL)$ if the strongest beam is selected per layer. So, the total number of bits to report the first PMI (PMI1) is $B_1=B_{1,1}+B_{1,2}+B_{1,3}=[\log_2(O_1 O_2)+\log_2(_L{}^{L_1 L_2})+\log_2(L)]$ or $[\log_2 (O_1 O_2)+\log_2(_L{}^{L_1 L_2})+\log_2(RL)]$.

The number of bits to report amplitude or power level and phase for coefficients are $(2L-1)N_A R$ and $(2L-1)N_P R$, respectively, where $N_A$ and $N_P$, respectively are the number of bits to report each quantized amplitude and phase. Assuming amplitude and phase are reported SB, the number of bits to report the second PMI (PMI2) is $(2L-1)N_A R+(2L-1)N_P R$.

In one embodiment 23, a UE is configured with a high-resolution (Type II) CSI codebook in which amplitudes or beam power levels $p_{1,l,i}$ or $p_{2,l,i}$ for layer l and coefficient i is quantized according to at least one of the following alternatives. In one example of Alt 23-0, beam power levels are quantized independent, and either $p_{1,l,i}$ or $1-p_{1,l,i}$ (likewise either $p_{2,l,i}$ or $1-p_{2,l,i}$) are quantized. In one example of Alt 23-1, beam power levels are quantized dependently as follows. In such example, 2L−1 beam power levels $p_{1,l,i}$ or $p_{2,l,i}$ are sorted in decreasing order. This sorting is either WB or SB. Let $\tilde{p}_{1,l,i}$ and $\tilde{p}_{2,l,i}$ denote the sorted beam power levels. Note that after sorting, $\tilde{p}_{1,l,0}=1$ and $\tilde{p}_{2,l,0}=1$, hence not quantized. In such example, to report the i-th sorted power level (where i>0), one of the following two methods is used: method 23-0: the difference between (i−1)-th and i-th sorted power levels, $\tilde{p}_{1,l,i-1}-\tilde{p}_{1,l,i}$, is quantized. Let $\hat{p}_{1,l,i}$ denote the quantized power level. To reconstruct the i-th sorted power level, the difference $\hat{p}_{1,l,i}-\hat{p}_{1,l,i}$ is considered, where $\hat{p}_{1,l,0}=1$; and method 23-1: the ratio between i-th and (i−1)-th power levels, $$\frac{\tilde{p}_{1,l,i}}{\tilde{p}_{1,l,i-1}},$$

is quantized. To reconstruct the i-th sorted power level, the ratio $$\frac{\hat{p}_{1,l,i-1}}{\hat{p}_{1,l,i}}$$

is considered, where $\hat{p}_{1,l,0}=1$.

In one embodiment 24, a UE is configured with a high-resolution (Type II) CSI codebook in which quantization resolution of different layers are different, and hence the number of bits to report the $1^{st}$ and $2^{nd}$ PMIs (PMI1 and PMI2) are different for different layers. In particular, the quantization resolution decreases from layer 0 to layer R−1 in an R layer CSI reporting (hence number of bits to report PMI also reduces from layer 0 to layer R−1) according to at least one of the following alternatives.

In one example of Alt 24-0, the number of beams (L $W_1$ beams) decreases from layer 0 to layer R−1. Two examples are as follows. In example 24-0-0, if beam combination based high-resolution (Type II) CSI is supported for up to maximum rank 2 (i.e. R=2), then L belongs to {2, 3, 4, 6, 8} for layer 0 and L belongs to {2, 3, 4} for layer 1. In example 24-0-1, if beam combination based high-resolution (Type II) CSI is supported for up to maximum rank 4 (i.e. R=4), then L belongs to {2, 3, 4, 6, 8} for layer 0-1 and L belongs to {2, 3, 4} for layer 2-3.

In another example of Alt 24-1, the resolution of the phase quantization codebook decreases from layer 0 to layer R−1. Two examples are as follows. In example 24-1-0, if beam combination based high-resolution (Type II) CSI is supported for up to maximum rank 2 (i.e. R=2), then the phase quantization codebook is 8PSK for layer 0 and QPSK for layer 1. In example 24-1-1, if beam combination based high-resolution (Type II) CSI is supported for up to maximum rank 4 (i.e. R=4), then the phase quantization codebook is 8PSK for layer 0-1 and QPSK for layer 2-3.

In yet another example of Alt 24-2, the resolution of the amplitude or beam power level quantization codebook decreases from layer 0 to layer R−1. Two examples are as follows. In example 24-2-0, if beam combination based high-resolution (Type II) CSI is supported for up to maximum rank 2 (i.e. R=2), then the amplitude quantization codebook is 3-bit in [0, 1] for layer 0 and 2-bit in [0, 1] for layer 1. In example 24-2-1, if beam combination based high-resolution (Type II) CSI is supported for up to maximum rank 4 (i.e. R=4), then the amplitude quantization codebook is 3-bit in [0, 1] for layer 0-1 and 2-bit in [0,1] for layer 2-3.

In yet another example of Alt 24-3, a combination of at least two of Alt 24-0, Alt 24-1, and 24-2 is considered.

In one embodiment 25, the rank or number of layers (RI) for high-resolution (Type II) CSI reporting is determined/configured/reported according to at least one of the following alternatives. In one alternative Alt 5-0, the rank or number of layers (RI) for high-resolution CSI reporting is fixed, hence need not be reported as part of CSI. At least one of the following examples, either fixed or configured, is used to fix RI. In one example 25-0-0, RI equals the number of receive antennas or ports ($N_{Rx}$) at the UE. In one example 25-0-1, RI=min(1, $N_{Rx}$). In one example 25-0-2, RI=min(2, $N_{Rx}$). In one example 25-0-3, RI=min(4, $N_{Rx}$).

In another alternative Alt 5-1, the rank or number of layers (RI) for high-resolution CSI reporting is configured either via higher-layer RRC or more dynamic DCI signaling. In yet another alternative Alt 5-2, a UE reports RI to indicate the rank or number of layers in at least one of CSI reporting instance(s) associated with a CSI report.

In one embodiment 26, a UE is configured with high-resolution (Type II) CSI reporting in which rank R>1 CSI is reported according to at least one of the following alternatives. In one alternative Alt 26-0, the PMI (derived using proposed codebook) for all layers are reported together in a single CSI reporting instance either as a single PMI or as per layer ($PMI_0$, $PMI_1$, ..., $PMI_{R-1}$). In one alternative Alt 26-1, the PMI for all layers are reported separately (i.e. per layer) in multiple CSI reporting instances. For example, for rank=2, two layers (two PMIs) are reported in two different reporting instances. In general, UE reports $PMI_0$, $PMI_1$, ..., $PMI_{R-1}$ for layer 0 to layer R−1 in R reporting instances. The layer number of each reporting instance is either reported by the UE as part of the CSI or is configured via higher layer RRC or dynamic DCI signaling.

Figure 27:
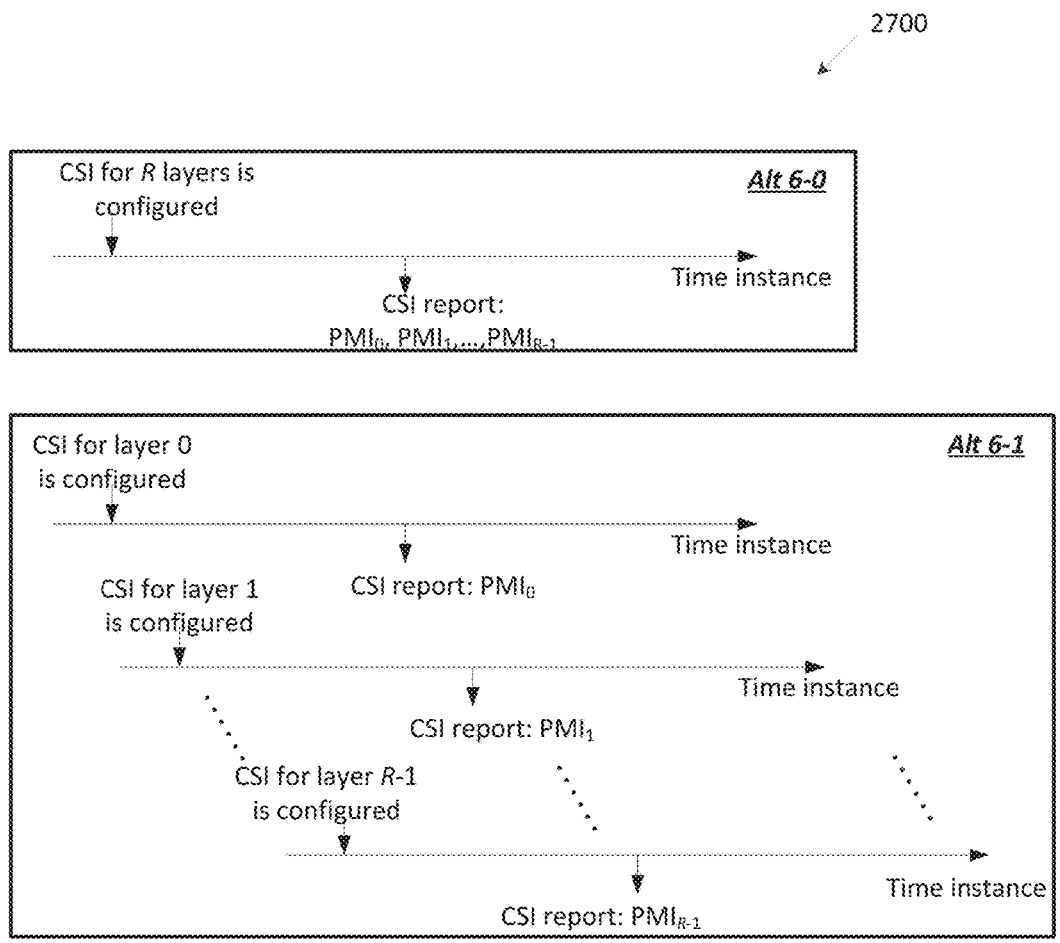
FIG. 27 illustrates another example higher rank CSI reporting according to embodiments of the present disclosure.

FIG. 27 illustrates another example higher rank CSI reporting 2700 according to embodiments of the present disclosure. An embodiment of the higher rank CSI reporting 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

The rank of the reported CSI is either fixed/configured according to the aforementioned embodiment 25. An example is shown in FIG. 27 in which the UE is configured with either all layer (Alt 26-0) or per layer with the layer number (Alt 26-1) CSI reporting. TABLE 24 shows W2 phase quantization payload.

TABLE 24

W2 phase quantization payload (8PSK phase quantization)

| Number of beams (L) | Rank 1 (number of bits) | Rank 2 (number of bits) |
| --- | --- | --- |
| 2 | 9 | 9 × 2 = 18 |
| 3 | 15 | 15 × 2 = 30 |
| 4 | 21 | 21 × 2 = 42 |
| 6 | 33 | 33 × 2 = 66 |
| 8 | 45 | 45 2 = 90 |

A summary of $W_2$ phase quantization payload bits for 8PSK phase quantization codebook and varying number of beams (L values) is shown in TABLE 24. It can be observed the phase reporting payload increases significantly for rank 2 CSI reporting as the number of beams increases (e.g. L=4, 6, and 8). Such large phase reporting payload may not be supported in a single reporting instance because phase reporting is per SB. In one embodiment, the $W_2$ payload is reduced by breaking it into T>1 CSI reporting instances using differential CSI approach in which T>1 coarse or low-resolution CSIs are reported in T CSI reporting instances, where each CSI is self-decodable (independent of other CSIs) and the aggregate (linear sum) of T low-resolution CSIs results in a high-resolution CSI.

Figure 28:
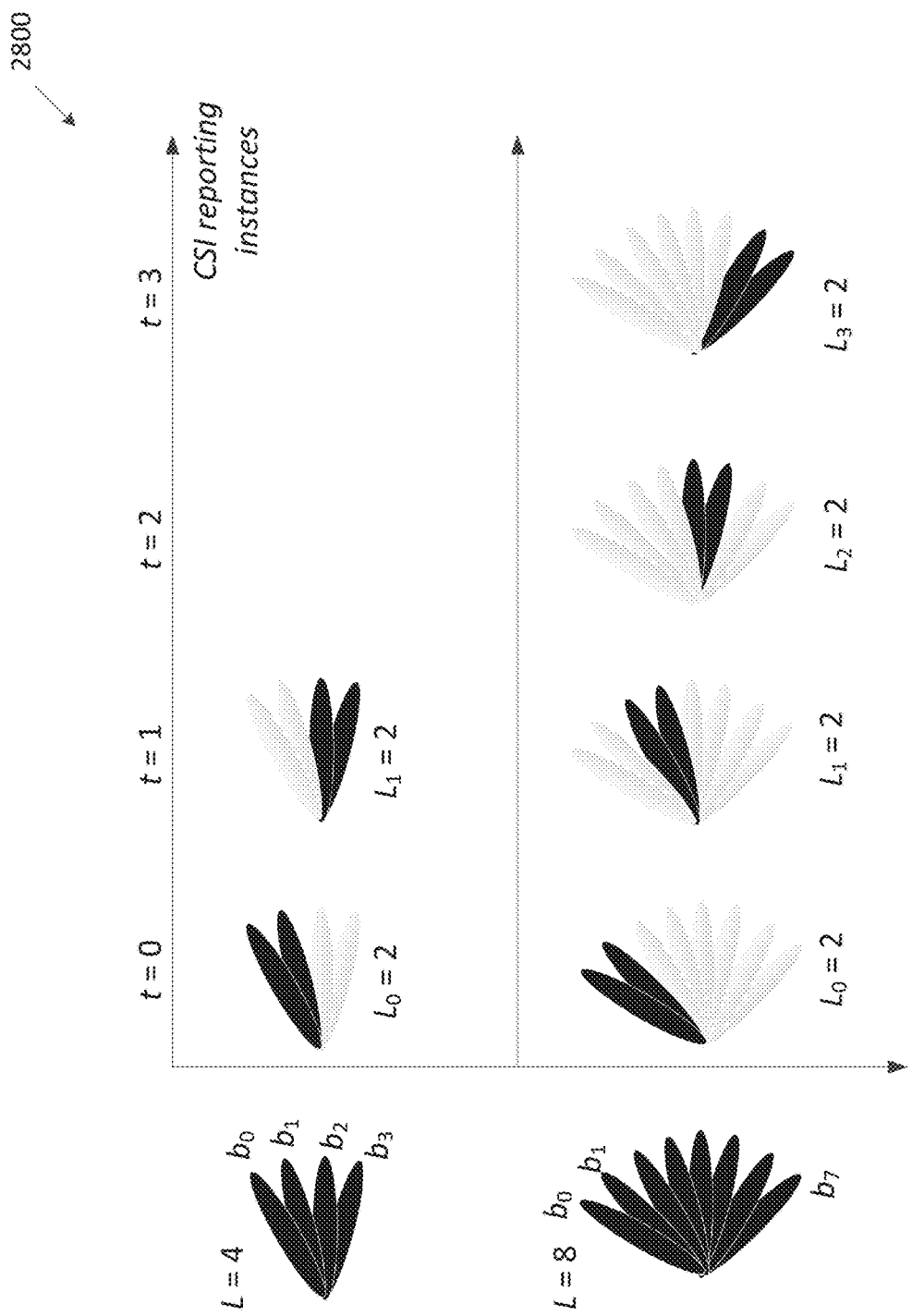
FIG. 28 illustrates an example differential CSI in number of beams according to embodiments of the present disclosure.

FIG. 28 illustrates an example differential CSI 2800 in number of beams according to embodiments of the present disclosure. An embodiment of the differential CSI 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

An example is shown in FIG. 28 in which, the CSI corresponding to $L_t$=2<L beams (a subset of L $W_1$ beams) is reported in the t-th CSI reporting instances of T=L/2 reporting instances. Two examples (for L=4 and 8) are shown in FIG. 28. Note that the CSI reporting overhead is approximately the same in each CSI reporting instance. Note also that the CSI reported in each reporting instance in itself is "coarse" or "low-resolution" Type II CSI (corresponding to $L_t$=2 beams) and the aggregate of CSIs reported in T reporting instances is 'refined' or 'high-resolution' Type II CSI (corresponding to L=4 or 8 beams). Each CSI reporting instance is self-decodable and comprises a valid (lower-resolution) pre-coder which can be used by the gNB without other CSI reporting instances.

In one embodiment 27, a UE is configured with differential CSI reporting in which rank R>1 CSI is reported according to at least one of the following alternatives. In one alternative Alt 27-0, the low-resolution PMI (derived using proposed differential codebook) for all layers are reported together in the t-th reporting instance of the T CSI reporting instances either as a single $PMI_t$ or as per layer ($PMI_{0,t}$, $PMI_{1,t}$, ..., $PMI_{R-1,t}$). In another alternative Alt 27-1, the low-resolution PMI for all layers are reported separately (i.e. per layer) in multiple CSI reporting instances. In particular, UE reports $PMI_{0,t}$, $PMI_{1,t}$, ..., $PMI_{R-1,t}$ for layer 0 to layer R-1 in R different reporting instances.

The rank of the reported CSI is either fixed/configured according to Embodiment 5. An example is shown in FIG. 29.

Figure 29:
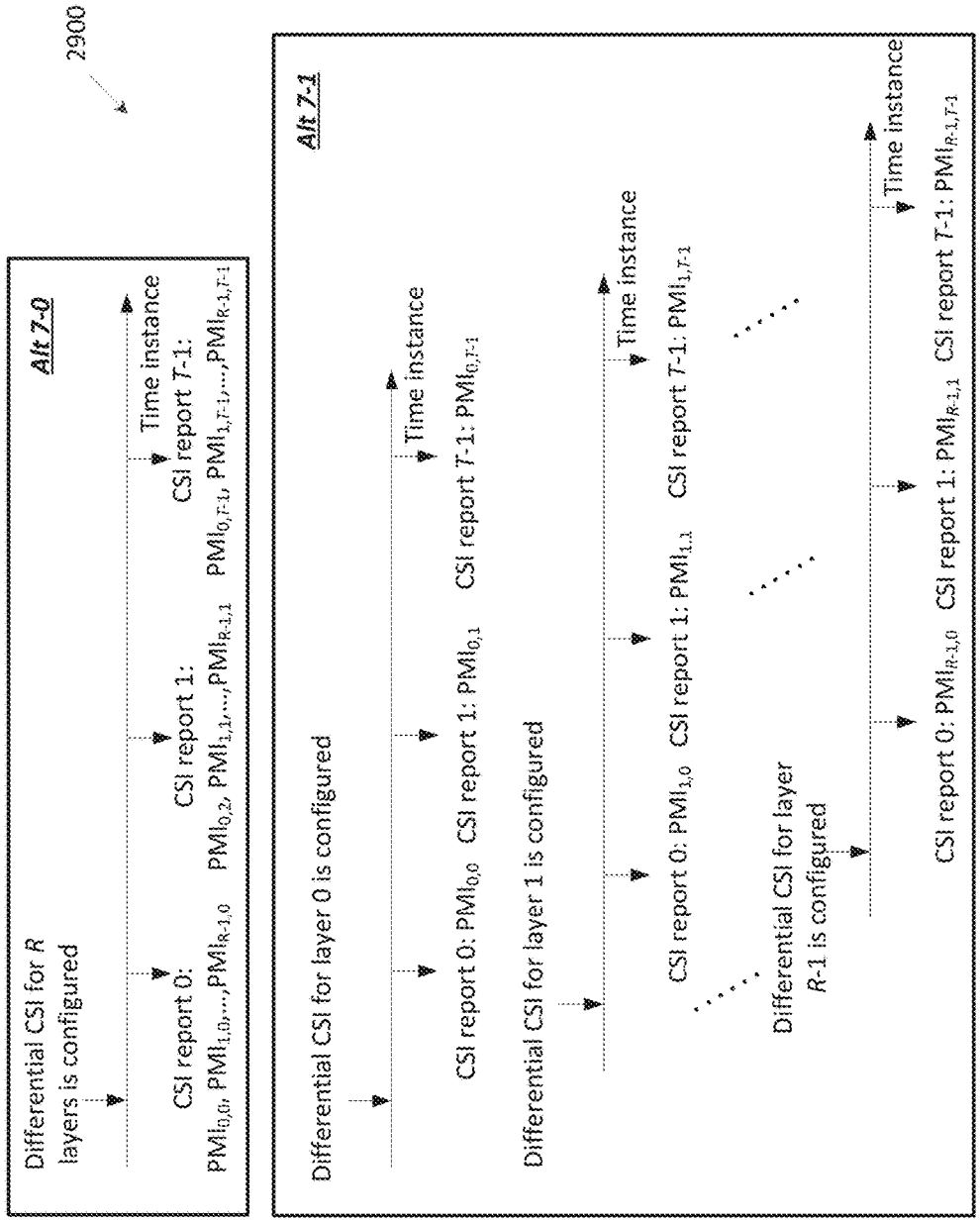
FIG. 29 illustrates an example higher rank differential CSI reporting according to embodiments of the present disclosure.

FIG. 29 illustrates an example higher rank differential CSI reporting 2900 according to embodiments of the present disclosure. An embodiment of the higher rank differential CSI reporting 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

In one embodiment, differential CSI assume $L_t=2$ beams, and T=L/2 reporting instances. The embodiments, however, are general and are applicable to other $L_t$ values such as $L_t=1$ and 3.

In one embodiment 28, a UE is configured to report T=L/2 differential CSIs, where L is an even number such as 4, 6, and 8, each of which are derived using 2 beams selected from the basis matrix $B_l$ for layer l, the construction of which is explained in Embodiment 2. For brevity, L columns of the basis matrix $[b_{k_{l,1}^{(0)},k_{l,2}^{(0)}}, \ldots, b_{k_{l,1}^{(L-1)},k_{l,2}^{(L-1)}}]$ are denoted as $[b_0, \ldots, b_{L-1}]$ in the rest of the present disclosure. In particular, the pairs of selected beams correspond to 2 adjacent beams or columns of the basis matrix starting from the left or beam $b_0$, i.e., beam pairs ($b_0$, $b_1$), ($b_2$, $b_3$), and so on. An illustration of the beam pairs are shown in FIG. 30 for L=4, 6, and 8.

Figure 30:
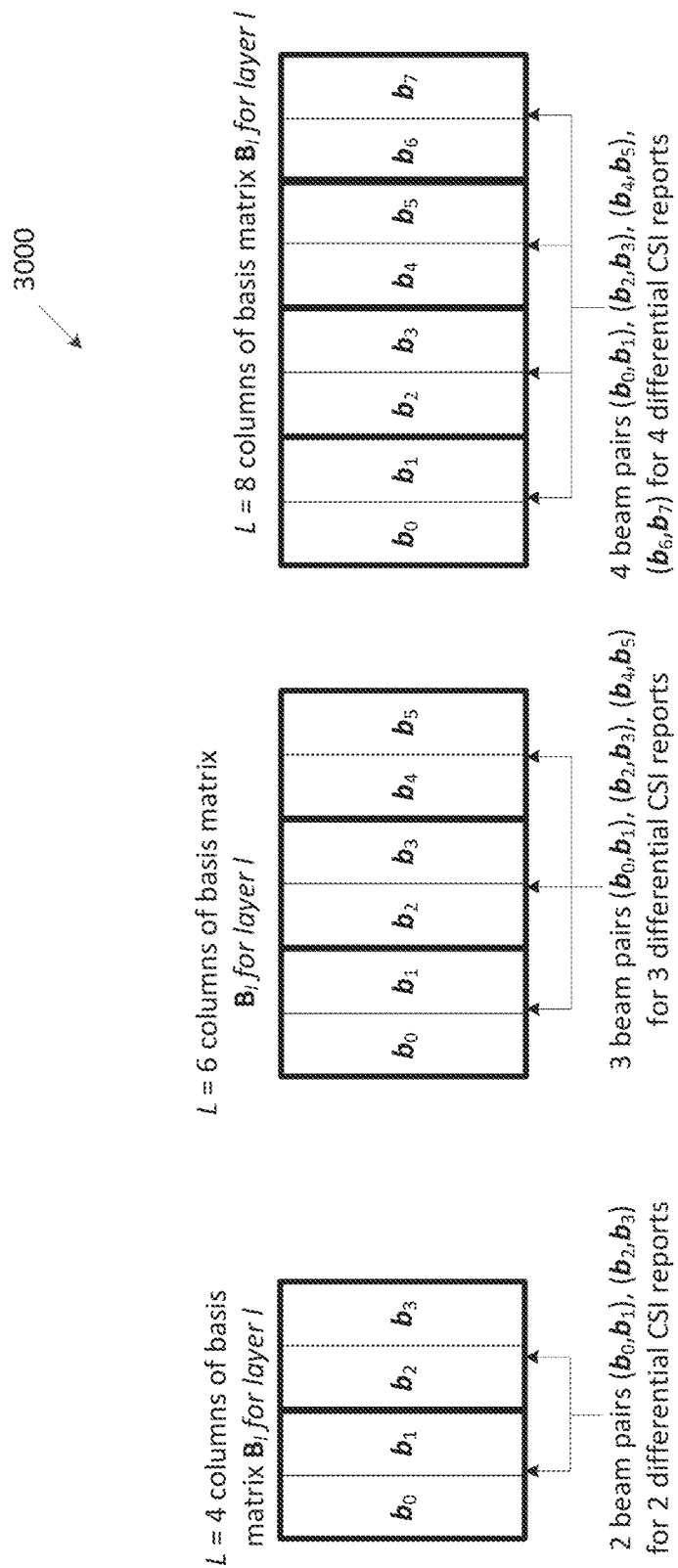
FIG. 30 illustrates an example beam pairs according to embodiments of the present disclosure.

FIG. 30 illustrates an example beam pairs 3000 according to embodiments of the present disclosure. An embodiment of the beam pairs 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

In one embodiment 29a, a UE is configured with T=L/2 differential CSI reports comprising of the following components. In one example of the component, $1^{st}$ CSI report (t=0) comprises of the following two reports. In one instance, WB report is used to indicate, orthogonal basis set, L selected beams, and the strongest beam (per layer) using $W_1$ codebook (these three together determines the basis matrix $B_l$ for layer l), and RI if UE reports rank or number of layers (RI). In one instance, SB report is used to indicate amplitude and phase of coefficients using $W_2$ codebook for $L_0=2$ beams ($b_0$, $b_1$) which are the first two columns (from left) of the basis matrix $B_l$ for layer l (e.g., embodiment 22 and FIG. 30). Since the first column of $B_l$ corresponds to the strongest beam (corresponding amplitude and phase are fixed to 1), the number of coefficients (amplitude and phase) to be reported in $1^{st}$ CSI report is $2L_0-1=3$.

In another example, remaining CSI reports (t=1, 2, ..., T-1) comprise of SB reports to indicate amplitude and phase of coefficients using $W_2$ codebook for $L_t=2$ beams (where t>1) which are the (2t+1)-th and (2t+2)-th columns (from left) of the basis matrix $B_l$ for layer l (e.g., embodiment 22 and FIG. 30). The number of coefficients (amplitude and phase) to be reported in each of the remaining CSI reports is $2L_t=4$. The UE assumes the last reported $1^{st}$ CSI report (which includes $B_l$) to select 2 beams in remaining CSI reports (as explained in Embodiment 28).

In a variation of this embodiment, the UE selects and reports one of the T beam pairs in each of the T differential CSI reports, where this reporting is WB using $[\log_2 T]$ bits. This reporting can be joint with the $1^{st}$ PMI (PMI1) or as a separate WB CSI component. Also, if the UE is configured to report RI, the RI is reported according to at least one of the following alternatives. In one alternative Alt 29-0, RI is reported only in the $1^{st}$ CSI report, the UE assumes a fixed RI, for example RI=1, to report remaining CSI reports (hence RI is not reported in the remaining CSI reports). In one alternative Alt 29-1, RI is reported only in the $1^{st}$ CSI report, the UE assumes the last reported RI in the $1^{st}$ CSI report to report remaining CSI reports (hence RI is not reported in the remaining CSI reports). In one alternative Alt 29-2, RI is reported in all CSI reports and hence reported as a WB CSI component in the remaining CSI reports.

The configuration about one of the T CSI reports is either via higher-layer RRC or dynamic DCI signaling. For example, for L=8 and low-resolution differential CSI reporting for $L_t=2$ beams in L/2 reporting instances (as explained above), the 2-bit binary state "00" is used to configure the $1^{st}$ CSI report, and remaining three states "01," "10," and "11" are used to configure the remaining three CSI reports.

In one embodiment 29b, a UE is configured with a WB CSI report comprising of: orthogonal basis set, L selected beams, and the strongest beam (per layer) using $W_1$ codebook (these three together determines the basis matrix $B_l$ for layer l); and RI if UE reports rank or number of layers (RI). In one example, T=L/2 differential CSI reports comprises the following components: $1^{st}$ CSI report (t=0) comprises of the SB report to indicate amplitude and phase of coefficients using $W_2$ codebook for $L_0=2$ beams which are the first two columns (from left) of the basis matrix $B_l$ for layer l (e.g., embodiment 29 and FIG. 30); and remaining CSI reports (t=1, ..., T-1): remains the same as in embodiment 29a.

Similar to the aforementioned embodiment 29a, the variation about UE reporting of a preferred beam pair in each of the T CSI reports is applicable here. Also, if the UE is configured to report RI, the RI is reported according to one of the three alternative 29-0, 29-1, and 29-2 for all SB CSI reports including t=0 (i.e., t=0, 1, ..., T-1). The remaining details of the aforementioned embodiment 29a are applicable to this embodiment too.

In this case, the configuration about one WB report and T SB CSI reports is either via higher-layer RRC or dynamic DCI signaling. For example, for L=8 and low-resolution differential CSI reporting for $L_t=2$ beams in L/2 reporting instances (as explained above), the 3-bit binary state "000" is used to configured WB CSI report, the state "001" is used to configure the 1st CSI report, and remaining states "010," "011," and "100" are used to configure the remaining three CSI reports. The remaining states "101," "110," and "111" are reserved.

In one embodiment 29c, a UE is configured with a WB CSI report comprising of orthogonal basis set and L selected beams using $W_1$ codebook and T=L/2 differential CSI reports comprising of the following components. In one example, $1^{st}$ CSI report (t=0) comprises of: WB report to indicate the strongest beam (per layer) using $W_1$ codebook (this determines the basis matrix $B_l$ for layer l) and RI if UE reports rank or number of layers (RI); and SB report to indicate amplitude and phase of coefficients using $W_2$ codebook for $L_0$=2 beams which are the first two columns (from left) of the basis matrix $B_l$ for layer l (e.g., embodiment 22 and FIG. 30). In one example, remaining CSI reports (t= 1, . . . , T−1): remains the same as in the aforementioned embodiment 29a.

If the UE is configured to report RI, the RI is reported according to one of the three alternative 29-0, 29-1, and 29-2 for remaining SB CSI reports (t=1, . . . , T−1). The remaining details of the aforementioned embodiment 29a and 29b are applicable to this embodiment too.

In one embodiment 29d, a UE is configured with a CSI reporting setting in which a single CSI-RS resource is configured and is associated with the configured T or T+1 CSI reports (according to embodiments 29a-29c). Alternatively, multiple CSI-RS resources are configured for T or T+1 differential CSI reports.

In one embodiment 30, the strongest beam ($1^{st}$ column of basis matrix $B_l$) can be paired with any one of the remaining L−1 beams (or columns of $B_l$). This requires $[\log_2(L-1)]$ bits to configure (via RRC or DCI) or report a beam pair including the strongest beam. The beam pair including the strongest beam is reported in the $1^{st}$ CSI report (as in embodiment 29). The beam pairs for the remaining reporting instance can be constructed by taking two adjacent beams from the remaining L−2 columns of $B_l$ similar to FIG. 30.

In one embodiment 31, the CSI derived using the strongest beam, e.g. derived using ($b_0$, $b_1$), can be reported in remaining reporting instances (other than the $1^{st}$ reporting instance). For example, the UE can be configured explicitly whether to report CSI using the beam pair ($b_0$, $b_1$) or other beam pairs. Alternatively, UE can report it explicitly in each of the T CSI reports.

In one embodiment 32, a UE is configured to report T=L/2 differential CSIs using any one of ($_2^L$) beam pairs (from L column basis matrix $B_l$), where beam pairs are either configured or UE reports them as a part of CSI.

In one embodiment 33, a UE is configured to report CQI according to at least one of the following alternatives. In one alternative Alt 33-0, the UE is configured to report a single CQI which is derived using the last reported T CSI reports, the aggregation of which corresponds to the high-resolution CSI using L beams. A few examples are as follows. In one example 33-0-0, aA single CQI is reported in the $1^{st}$ (t=0) reporting instance. In one example 33-0-1, a single CQI is reported in the last (t=T−1) reporting instance. In one example 33-0-2, one of the T CSI reporting instance is configured for CQI reporting.

In one alternative Alt 33-1, the UE is configured to report multiple CQIs. For example, in each of T reporting instances, a CQI is reported according to one of the following examples. In one example 33-1-0, the CQI corresponding to low-resolution CSI using $L_t$=2 beams (in reporting instance t) is reported. The gNB can approximate the high-resolution CQI (for L beams) using T CQIs, e.g., by performing some kind of averaging. In one example 33-1-1, the CQI corresponding to intermediate resolution CSI using 2(t+1) beams is reported. The reported CQI can be used directly by gNB. In one example 33-1-2, the CQI corresponding to 2 beams (assuming it includes the strongest beam) is reported in the $1^{st}$ (t=0) reporting instance and the differential CQI w.r.t. CQI reported in the $1^{st}$ reporting instance is reported in later (t>0) reporting instances. In one example 33-1-3, one of Example 33-1-0, 33-1-1, and 33-1-2 is configured.

In one alternative Alt 33-2, the CQI reporting according to one of Alt 23-0 and Alt 33-1 or examples therein is configured.

In one embodiment 34, a UE is configured to report a hybrid CSI comprising of T+1 CSI reports which are derived as follows. In one example, the $1^{st}$ CSI report (t=0) is linked with a non-precoded CSI-RS resource and the CSI is derived using the proposed $W_1$ codebook. The reported CSI contents therefore are the orthogonal basis set, L selected beams, the strongest beam (per layer), and RI (if reported by the UE). In another example, each of the remaining T CSI reports is linked with a 4-port beamformed CSI-RS resource which are beamformed using beam pairs as shown FIG. 30, and the CSI is derived using the proposed $W_2$ codebook for 2 beams. The reported CSI contents therefore are amplitude and phase of coefficients. A single CQI or multiple CQI can also be reported as explained in the aforementioned embodiment 33. In addition, RI can also be reported. This scheme is analogous to the hybrid CSI mechanism 1 supported in LTE specification.

In one embodiment 35, a UE is configured with T differential CSI reports in which the stronger of the two beams is reported (WB reporting) in each report which are derived using 2 beams (as shown in FIG. 30). Therefore, in each reporting instance, $2L_t-1=3$ coefficients (3 amplitudes and 3 phases) are reported. In addition, a coefficient scaling factor (amplitude and phase) w.r.t. a reference, i.e., one of the T (e.g. t=0) CSI reports is also reported in the respective T−1 reporting instances (except the reference).

In one embodiment 36, a UE is configured with differential CSI reporting according to one of the following alternatives. In one alternative Alt 36-0, the differential CSI is ON if the configured L≥l, for example l=4, 6, or 8. In one alternative Alt 36-1, the differential CSI can be configured (via RRC or DCI signaling) if the configured L≥l, for example l=4, 6, or 8. In one example, one-shot CSI (L beams) is reported if L belongs to {2, 3} and the differential CSI ($L_t$=2 beams) is reported if L belongs to {4, 6, 8}. In another example, one-shot CSI (L beams) is reported if L belongs to {2, 3, 4} and the differential CSI ($L_t$=2 beams) is reported if L belongs to {6,8}.

In one embodiment 37, a UE is configured with a high-resolution (Type II) CSI codebook in which the strongest beam, either common or different for all layers, is not reported. In this case, the $W_1$ and $W_2$ codebooks are as follows. In one example, $W_1$ codebook is used to select: an orthogonal basis set comprising of uniformly spaced ($L_1,L_2$) DFT beams; and $L \in \{2,3,4,6,8\}$ beams freely out of the $L_1L_2$ DFT beams in a basis set, where L is either (e.g. RRC) configurable or UE reports a preferred L value. This selection is WB or partial band (e.g. a set of SBs). Two examples of basis set sizes are restricted orthogonal basis set in which $L_1L_2=\min(8, N_1N_2)$ and full orthogonal basis set in which $L_1L_2=N_1N_2$, one of the two is either supported in the specification or configured via RRC signalling.

In another example, $W_2$ codebook is used to combine L beams independently per layer per polarization with a common $W_1$ beam group, i.e., the selected L beams are the same for all layers and two polarizations. The amplitude and phase of the combining (2L) coefficients are reported separately where phase is reported per SB and amplitude is reported WB or SB or both WB and SB. In such case, gNB doesn't know which of the 2L coefficients corresponds to the strongest beam, and one extra coefficient (amplitude and phase) needs to be reported when compared with the codebook proposed earlier in the present disclosure.

In a variation of the aforementioned embodiment(s), the strongest beam(s), either common or different for all layers, is (are) configured via higher layer RRC or dynamic DCI signaling. The coefficient corresponding to the configured strongest beam is set to 1, and hence need not be reported, i.e., in total, 2L−1 coefficients (amplitude and phase) are report as before.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) capable of channel state information (CSI) reporting, the UE comprising:
a transceiver configured to receive, from a base station (BS), CSI configuration information including a number (L) of beams and a number (T) of CSI reports, wherein L and T are positive integers; and
at least one processor operably connected to the transceiver and configured to generate the T CSI reports, wherein if T equals 1, a single CSI report is generated based on the L beams; else if T is greater than 1, each of the T CSI reports is generated based on a subset of the L beams and each of the T CSI reports is independently decodable;
wherein the transceiver is further configured to transmit, to the BS, the T CSI reports in T CSI reporting instances, respectively.

2. The UE of claim 1, wherein the at least one processor is further configured to determine whether to perform a single CSI reporting (T=1) or multiple CSI reportings (T>1) based on whether L≤v or L>v, respectively, where v is a fixed value greater or equal to 4.

3. The UE of claim 1, wherein:
the at least one processor is further configured to generate one or more precoding matrix indicators (PMIs) and one or more rank indicators (RIs) for the T CSI reports, and
each of the T CSI reports includes at least one of the PMIs and only a first in time of the T CSI reports includes at least one of the RIs.

4. The UE of claim 1, wherein:
the at least one processor is further configured to generate one or more precoding matrix indicators (PMIs) and one or more channel quality indicators (CQIs) for the T CSI reports, and
each of the T CSI reports includes at least one of the PMIs and only one of the T CSI reports includes at least one of the CQIs.

5. The UE of claim 1, wherein:
the at least one processor is further configured to generate one or more precoding matrix indicators (PMIs) and multiple channel quality indicator (CQIs) for the T CSI reports, and each of the T CSI reports includes at least one of the PMIs and multiple of the T CSI reports include at least one of the CQIs.

6. The UE of claim 1, wherein:
the CSI configuration information includes a value of T=1;
the at least one processor is further configured to generate, for the T=1 CSI report, a rank indicator (RI)=2 and a corresponding PMI that includes ($i_{1,1}$, $i_{1,2}$) indicating the L beams for a first layer CSI reporting and ($i_{1,3}$) indicating an index pair ($k_1$, $k_2$) associated with the L beams for a second layer CSI reporting,
the index pair ($k_1$, $k_2$) is identified based on $i_{1,3}$ and higher layer signaled parameters $N_1$ and $N_2$ according to:

| $i_{1,3}$ | $N_1 > N_2 > 1$ | | $N_1 = N_2$ | | $N_1 = 2, N_2 = 1$ | | $N_1 > 2, N_2 = 1$ | |
|---|---|---|---|---|---|---|---|---|
| | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ | | | $2O_1$ | 0 |
| 3 | $2O_1$ | 0 | $O_1$ | $O_2$ | | | $3O_1$ | 0, |

$O_1$ and $O_2$ are oversampling factors in first and second dimensions, respectively, the PMI codebook for RI=2 is given by:

$$L = 1 \text{ or Codebook-Config} = 1$$
$$i_{1,2} = 0, \ldots, N_2 O_2 - 1$$

| $i_{1,1}$ | $i_2$ | |
|---|---|---|
| | 0 | 1 |
| $0, \ldots, N_1 O_1 - 1$ | $W^{(2)}_{i_{1,1}, i_{1,1}+k_1, i_{1,2}, i_{1,2}+k_2, 0}$ | $W^{(2)}_{i_{1,1}, i_{1,1}+k_1, i_{1,2}, i_{1,2}+k_2, 1}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

$$L = 4 \text{ or Codebook-Config} = 2, N_2 > 1$$
$$i_{1,2} = 0, \ldots, N_2 O_2/2 - 1$$

| $i_{1,1}$ | $i_2$ | | |
|---|---|---|---|
| | 0 | 1 | 2 |
| $0, \ldots, \dfrac{N_1 O_1}{2} - 1$ | $W^{(2)}_{2i_{1,1}, 2i_{1,1}+k_1, 2i_{1,2}, 2i_{1,2}+k_2, 0}$ | $W^{(2)}_{2i_{1,1}, 2i_{1,1}+k_1, 2i_{1,2}, 2i_{1,2}+k_2, 1}$ | $W^{(2)}_{2i_{1,1}+1, 2i_{1,1}+1+k_1, 2i_{1,2}, 2i_{1,2}+k_2, 0}$ |

-continued

| $i_{1,1}$ | $i_2$ | | |
|---|---|---|---|
| | 3 | 4 | 5 |
| $0, \ldots, \frac{N_1 O_1}{2} - 1$ | $W^{(2)}_{2i_{1,1}+1, 2i_{1,1}+1+k_1, 2i_{1,2}, 2i_{1,2}+k_2, 1}$ | $W^{(2)}_{2i_{1,1}, 2i_{1,1}+k_1, 2i_{1,2}+1, 2i_{1,2}+1+k_2, 0}$ | $W^{(2)}_{2i_{1,1}, 2i_{1,1}+k_1, 2i_{1,2}+1, 2i_{1,2}+1+k_2, 1}$ |

| $i_{1,1}$ | $i_2$ | |
|---|---|---|
| | 6 | 7 |
| $0, \ldots, \frac{N_1 O_1}{2} - 1$ | $W^{(2)}_{2i_{1,1}+1, 2i_{1,1}+1+k_1, 2i_{1,2}+1, 2i_{1,2}+1+k_2, 0}$ | $W^{(2)}_{2i_{1,1}+1, 2i_{1,1}+1+k_1, 2i_{1,2}+1, 2i_{1,2}+1+k_2, 1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

$L = 4$ or Codebook-Config = 2, $N_2 = 1$
$i_{1,2} = 0$

| $i_{1,1}$ | $i_2$ | | |
|---|---|---|---|
| | 0 | 1 | 2 |
| $0, \ldots, \frac{N_1 O_1}{2} - 1$ | $W^{(2)}_{2i_{1,1}, 2i_{1,1}+k_1, 0, 0, 0}$ | $W^{(2)}_{2i_{1,1}, 2i_{1,1}+k_1, 0, 0, 1}$ | $W^{(2)}_{2i_{1,1}+1, 2i_{1,1}+1+k_1, 0, 0, 0}$ |

| $i_{1,1}$ | $i_2$ | | |
|---|---|---|---|
| | 3 | 4 | 5 |
| $0, \ldots, \frac{N_1 O_1}{2} - 1$ | $W^{(2)}_{2i_{1,1}+1, 2i_{1,1}+1+k_1, 0, 0, 1}$ | $W^{(2)}_{2i_{1,1}+2, 2i_{1,1}+2+k_1, 0, 0, 0}$ | $W^{(2)}_{2i_{1,1}+2, 2i_{1,1}+2+k_1, 0, 0, 1}$ |

| $i_{1,1}$ | $i_2$ | |
|---|---|---|
| | 6 | 7 |
| $0, \ldots, \frac{N_1 O_1}{2} - 1$ | $W^{(2)}_{2i_{1,1}+3, 2i_{1,1}+3+k_1, 0, 0, 0}$ | $W^{(2)}_{2i_{1,1}+3, 2i_{1,1}+3+k_1, 0, 0, 1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$., and $\varphi_n = e^{j\pi n/2}$ $u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$.

$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$ 7. The UE of claim 1, wherein:
the at least one processor is further configured to identify one of two subband sizes configured via higher layer signaling for the UE for the CSI reporting per subband based in part on a number of physical resource blocks (PRBs) included in a carrier bandwidth part according to:

| Carrier bandwidth part (PRBs) | Subband Size (PRBs) |
|---|---|
| 24-60 | 4, 8 |
| 61-100 | 8, 16 |
| 101-200 | 12, 24 |
| 201-275 | 16, 32, | and
the subband size=N which corresponds to N contiguous PRBs in the carrier bandwidth part.

8. A base station (BS) capable of configuring channel state information (CSI) reporting, the BS comprising:
at least one processor; and
a transceiver operably connected to the at least one processor and configured to:
transmit, to a user equipment (UE), CSI configuration information including a number (L) of beams and a number (T) of CSI reports, wherein L and T are positive integers; and
receive the T CSI reports in T CSI reporting instances, respectively;
wherein if T equals 1, a single CSI report is generated based on the L beams and else if T is greater than 1, each of the T CSI reports is generated based on a subset of the L beams and each of the T CSI reports is independently decodable.

9. The BS of claim 8, wherein the BS is configured to indicate to the UE whether to perform a single CSI reporting (T=1) or multiple CSI reportings (T>1) based on whether L≤v or L>v, respectively, where v is a fixed value greater or equal to 4.

10. The BS of claim 8, wherein each of the T CSI reports includes a precoding matrix indicators (PMI) and only a first in time of the T CSI reports includes a rank indicator (RI).

11. The BS of claim 8, wherein each of the T CSI reports includes a precoding matrix indicators (PMI) and only one of the T CSI reports includes a channel quality indicator (CQI).

12. The BS of claim 8, wherein each of the T CSI reports includes a precoding matrix indicator (PMI) and multiple of the T CSI reports include a channel quality indicator (CQI).

13. The BS of claim 8, wherein:
the CSI configuration information includes a value of T=1;
the transceiver is configured to receive, in the T=1 CSI report, a rank indicator (RI)=2 and a corresponding PMI that includes $(i_{1,1}, i_{1,2})$ indicating the L beams for a first layer CSI reporting and $(i_{1,3})$ indicating an index pair $(k_1, k_2)$ associated with the L beams for a second layer CSI reporting,
the index pair $(k_1, k_2)$ is identified based on $i_{1,3}$ and higher layer signaled parameters $N_1$ and $N_2$ according to:

| $i_{1,3}$ | $N_1 > N_2 > 1$ | | $N_1 = N_2$ | | $N_1 = 2, N_2 = 1$ | | $N_1 > 2, N_2 = 1$ | |
|---|---|---|---|---|---|---|---|---|
|  | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ |  |  | $2O_1$ | 0 |
| 3 | $2O_1$ | 0 | $O_1$ | $O_2$ |  |  | $3O_1$ | 0, |

$O_1$ and $O_2$ are oversampling factors in first and second dimensions, respectively, the PMI codebook for RI=2 is given by:

---

L = 1 or Codebook-Config = 1
$i_{1,2} = 0, \ldots, N_2 O_2 - 1$

| $i_{1,1}$ | $i_2$ | |
|---|---|---|
|  | 0 | 1 |
| $0, \ldots, N_1 O_1 - 1$ | $W^{(2)}_{i_{1,1}, i_{1,1}+k_1, i_{1,2}, i_{1,2}+k_2, 0}$ | $W^{(2)}_{i_{1,1}, i_{1,1}+k_1, i_{1,2}, i_{1,2}+k_2, 1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

---

L = 4 or Codebook-Config = 2, $N_2 > 1$
$i_{1,2} = 0, \ldots, N_2 O_2 / 2 - 1$

| $i_{1,1}$ | $i_2$ | | |
|---|---|---|---|
|  | 0 | 1 | 2 |
| $0, \ldots, \frac{N_1 O_1}{2} - 1$ | $W^{(2)}_{2i_{1,1}, 2i_{1,1}+k_1, 2i_{1,2}, 2i_{1,2}+k_2, 0}$ | $W^{(2)}_{2i_{1,1}, 2i_{1,1}+k_1, 2i_{1,2}, 2i_{1,2}+k_2, 1}$ | $W^{(2)}_{2i_{1,1}+1, 2i_{1,1}+1+k_1, 2i_{1,2}, 2i_{1,2}+k_2, 0}$ |

| $i_{1,1}$ | $i_2$ | | |
|---|---|---|---|
|  | 3 | 4 | 5 |
| $0, \ldots, \frac{N_1 O_1}{2} - 1$ | $W^{(2)}_{2i_{1,1}+1, 2i_{1,1}+1+k_1, 2i_{1,2}, 2i_{1,2}+k_2, 1}$ | $W^{(2)}_{2i_{1,1}, 2i_{1,1}+k_1, 2i_{1,2}+1, 2i_{1,2}+1+k_2, 0}$ | $W^{(2)}_{2i_{1,1}, 2i_{1,1}+k_1, 2i_{1,2}+1, 2i_{1,2}+1+k_2, 1}$ |

| $i_{1,1}$ | $i_2$ | |
|---|---|---|
|  | 6 | 7 |
| $0, \ldots, \frac{N_1 O_1}{2} - 1$ | $W^{(2)}_{2i_{1,1}+1, 2i_{1,1}+1+k_1, 2i_{1,2}+1, 2i_{1,2}+1+k_2, 0}$ | $W^{(2)}_{2i_{1,1}+1, 2i_{1,1}+1+k_1, 2i_{1,2}+1, 2i_{1,2}+1+k_2, 1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

---

L = 4 or Codebook-Config = 2, $N_2 = 1$
$i_{1,2} = 0$

| $i_{1,1}$ | $i_2$ | | |
|---|---|---|---|
|  | 0 | 1 | 2 |
| $0, \ldots, \frac{N_1 O_1}{2} - 1$ | $W^{(2)}_{2i_{1,1}, 2i_{1,1}+k_1, 0, 0, 0}$ | $W^{(2)}_{2i_{1,1}, 2i_{1,1}+k_1, 0, 0, 1}$ | $W^{(2)}_{2i_{1,1}+1, 2i_{1,1}+1+k_1, 0, 0, 0}$ |

| $i_{1,1}$ | | $i_2$ | |
|---|---|---|---|
| | 3 | 4 | 5 |
| $0, \ldots, \frac{N_1 O_1}{2} - 1$ | $W^{(2)}_{2i_{1,1}+1, 2i_{1,1}+1+k_1, 0, 0, 1}$ | $W^{(2)}_{2i_{1,1}+2, 2i_{1,1}+2+k_1, 0, 0, 0}$ | $W^{(2)}_{2i_{1,1}+2, 2i_{1,1}+2+k_1, 0, 0, 1}$ |

| $i_{1,1}$ | | $i_2$ |
|---|---|---|
| | 6 | 7 |
| $0, \ldots, \frac{N_1 O_1}{2} - 1$ | $W^{(2)}_{2i_{1,1}+3, 2i_{1,1}+3+k_1, 0, 0, 0}$ | $W^{(2)}_{2i_{1,1}+3, 2i_{1,1}+3+k_1, 0, 0, 1}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$, and $\varphi_n = e^{j\pi n/2}$ $$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}.$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

14. The BS of claim 8, wherein the UE identifies one of two subband sizes configured via higher layer signaling for the UE for the CSI reporting per subband based in part on a number of physical resource blocks (PRBs) included in a carrier bandwidth part according to:

| Carrier bandwidth part (PRBs) | Subband Size (PRBs) |
|---|---|
| 24-60 | 4, 8 |
| 61-100 | 8, 16 |
| 101-200 | 12, 24 |
| 201-275 | 16, 32, | and
the subband size=N which corresponds to N contiguous PRBs in the carrier bandwidth part.

15. A method for channel state information (CSI) reporting by a user equipment (UE), the method comprising:
receiving, from a base station (BS), CSI configuration information including a number (L) of beams and a number (T) of CSI reports, wherein L and T are positive integers;
generating the T CSI reports, wherein if T equals 1, a single CSI report is generated based on the L beams else if T is greater than 1, each of the T CSI reports is generated based on a subset of the L beams and each of the T CSI reports is independently decodable; and
transmitting, to the BS, the T CSI reports in T CSI reporting instances, respectively.

16. The method of claim 15, further comprising determining whether to perform a single CSI reporting (T=1) or multiple CSI reportings (T>1) based on whether L≤v or L>v, respectively, where v is a fixed value greater or equal to 4.

17. The method of claim 15, wherein:
generating the T CSI reports comprises generating one or more precoding matrix indicators (PMIs) and one or more rank indicators (RIs), and
each of the T CSI reports includes at least one of the PMIs and only a first in time of the T CSI reports includes at least one of the RIs.

18. The method of claim 15, wherein:
generating the T CSI reports comprises generating one or more precoding matrix indicators (PMIs) and one or more channel quality indicators (CQIs), and
each of the T CSI reports includes at least one of the PMIs and only one of the T CSI reports includes at least one of the CQIs.

19. The method of claim 15, wherein:
generating the T CSI reports comprises generating one or more precoding matrix indicators (PMIs) and multiple channel quality indicators (CQI), and
each of the T CSI reports includes at least one of the PMIs and multiple of the T CSI reports include at least one of the CQIs.

20. The method of claim 15, wherein:
the CSI configuration information includes a value of T=1,
generating the T=1 CSI report comprises generating a rank indicator (RI)=2 and a corresponding PMI that includes ($i_{1,1}$, $i_{1,2}$) indicating an index pair ($k_1$, $k_2$) associated with the L beams for a first layer CSI reporting and ($i_{1,3}$) indicating the L beams for a second layer CSI reporting,
the index pair ($k_1$, $k_2$) is identified based on $i_{1,3}$ and higher layer signaled parameters $N_1$ and $N_2$ according to:

| | $N_1 > N_2 > 1$ | | $N_1 = N_2$ | | $N_1 = 2, N_2 = 1$ | | $N_1 > 2, N_2 = 1$ | |
|---|---|---|---|---|---|---|---|---|
| $i_{1,3}$ | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ | | | $2O_1$ | 0 |
| 3 | $2O_1$ | 0 | $O_1$ | $O_2$ | | | $3O_1$ | 0, |

$O_1$ and $O_2$ are oversampling factors in first and second dimensions, respectively, the PMI codebook for RI=2 is given by:

| | L = 1 or Codebook-Config = 1 |  |
|---|---|---|
| | $i_{1,2} = 0, \ldots, N_2O_2 - 1$ | |
| $i_{1,1}$ | $i_2$ | |
| | 0 | 1 |
| $0, \ldots, N_1O_1 - 1$ | $W^{(2)}_{i_{1,1},i_{1,1}+k_1,i_{1,2},i_{1,2}+k_2,0}$ | $W^{(2)}_{i_{1,1},i_{1,1}+k_1,i_{1,2},i_{1,2}+k_2,1}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

| | L = 4 or Codebook-Config = 2, $N_2 > 1$ | | |
|---|---|---|---|
| | $i_{1,2} = 0, \ldots, N_2O_2/2 - 1$ | | |
| $i_{1,1}$ | $i_2$ | | |
| | 0 | 1 | 2 |
| $0, \ldots, \dfrac{N_1O_1}{2} - 1$ | $W^{(2)}_{2i_{1,1},2i_{1,1}+k_1,2i_{1,2},2i_{1,2}+k_2,0}$ | $W^{(2)}_{2i_{1,1},2i_{1,1}+k_1,2i_{1,2},2i_{1,2}+k_2,1}$ | $W^{(2)}_{2i_{1,1}+1,2i_{1,1}+1+k_1,2i_{1,2},2i_{1,2}+k_2,0}$ |

| $i_{1,1}$ | $i_2$ | | |
|---|---|---|---|
| | 3 | 4 | 5 |
| $0, \ldots, \dfrac{N_1O_1}{2} - 1$ | $W^{(2)}_{2i_{1,1}+1,2i_{1,1}+1+k_1,2i_{1,2},2i_{1,2}+k_2,1}$ | $W^{(2)}_{2i_{1,1},2i_{1,1}+k_1,2i_{1,2}+1,2i_{1,2}+1+k_2,0}$ | $W^{(2)}_{2i_{1,1},2i_{1,1}+k_1,2i_{1,2}+1,2i_{1,2}+1+k_2,1}$ |

| $i_{1,1}$ | $i_2$ | |
|---|---|---|
| | 6 | 7 |
| $0, \ldots, \dfrac{N_1O_1}{2} - 1$ | $W^{(2)}_{2i_{1,1}+1,2i_{1,1}+1+k_1,2i_{1,2}+1,2i_{1,2}+1+k_2,0}$ | $W^{(2)}_{2i_{1,1}+1,2i_{1,1}+1+k_1,2i_{1,2}+1,2i_{1,2}+1+k_2,1}$ | where $W^{(2)}_{l,l',m,m',n} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

| | L = 4 or Codebook-Config = 2, $N_2 = 1$ | | |
|---|---|---|---|
| | $i_{1,2} = 0$ | | |
| $i_{1,1}$ | $i_2$ | | |
| | 0 | 1 | 2 |
| $0, \ldots, \dfrac{N_1O_1}{2} - 1$ | $W^{(2)}_{2i_{1,1},2i_{1,1}+k_1,0,0,0}$ | $W^{(2)}_{2i_{1,1},2i_{1,1}+k_1,0,0,1}$ | $W^{(2)}_{2i_{1,1}+1,2i_{1,1}+1+k_1,0,0,0}$ |

| $i_{1,1}$ | $i_2$ | | |
|---|---|---|---|
| | 3 | 4 | 5 |
| $0, \ldots, \dfrac{N_1O_1}{2} - 1$ | $W^{(2)}_{2i_{1,1}+1,2i_{1,1}+1+k_1,0,0,1}$ | $W^{(2)}_{2i_{1,1}+2,2i_{1,1}+2+k_1,0,0,0}$ | $W^{(2)}_{2i_{1,1}+2,2i_{1,1}+2+k_1,0,0,1}$ |

| $i_{1,1}$ | $i_2$ | |
|---|---|---|
| | 6 | 7 |
| $0, \ldots, \dfrac{N_1O_1}{2} - 1$ | $W^{(2)}_{2i_{1,1}+3,2i_{1,1}+3+k_1,0,0,0}$ | $W^{(2)}_{2i_{1,1}+3,2i_{1,1}+3+k_1,0,0,1}$ |

-continued where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$, and $\varphi_n = e^{j\pi n/2}$ $u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$.

$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$

\* \* \* \* \*